US011334438B2

(12) United States Patent
Mazumdar

(10) Patent No.: US 11,334,438 B2
(45) Date of Patent: May 17, 2022

(54) INCREMENTAL FILE SYSTEM BACKUP USING A PSEUDO-VIRTUAL DISK

(71) Applicant: RUBRIK, INC., Palo Alto, CA (US)

(72) Inventor: Soham Mazumdar, San Francisco, CA (US)

(73) Assignee: Rubrik, Inc., Palo Alto, CA (US)

( * ) Notice: Subject to any disclaimer, the term of this patent is extended or adjusted under 35 U.S.C. 154(b) by 22 days.

(21) Appl. No.: 16/155,537

(22) Filed: Oct. 9, 2018

(65) Prior Publication Data
US 2019/0108098 A1 Apr. 11, 2019

Related U.S. Application Data

(60) Provisional application No. 62/570,436, filed on Oct. 10, 2017.

(51) Int. Cl.
G06F 11/14 (2006.01)
G06F 9/455 (2018.01)
(Continued)

(52) U.S. Cl.
CPC ...... *G06F 11/1448* (2013.01); *G06F 9/45533* (2013.01); *G06F 11/1415* (2013.01);
(Continued)

(58) Field of Classification Search
CPC ............. G06F 11/1448; G06F 11/1415; G06F 11/1451; G06F 16/188; G06F 16/128; G06F 9/45533; G06F 21/00; G06F 21/6218; G06F 2009/45583; G06F 2201/84; H04L 9/0643; H04L 9/3239
See application file for complete search history.

(56) References Cited

U.S. PATENT DOCUMENTS 7,124,171 B1  10/2006 McCann
7,797,279 B1   9/2010 Starling et al.
(Continued)

FOREIGN PATENT DOCUMENTS

EP       3215940 B1    7/2019
EP       3567482 A1   11/2019
WO  WO-2016073625 A2   5/2016

OTHER PUBLICATIONS

"U.S. Appl. No. 16/155,533, Notice of Allowance dated Aug. 11, 2021", 11 pgs.
(Continued)

*Primary Examiner* — William E. Baughman
(74) *Attorney, Agent, or Firm* — Holland & Hart LLP

(57) ABSTRACT

Methods and systems for backing up and restoring sets of electronic files using sets of pseudo-virtual disks are described. The sets of electronic files may be sourced from or be stored using one or more different data sources including one or more real machines and/or one or more virtual machines. A first snapshot of the sets of electronic files may be aggregated from the different data sources and stored using a first pseudo-virtual disk. A second snapshot of the sets of electronic files may be aggregated from the different data sources subsequent to the generation of the first pseudo-virtual disk and stored using the first pseudo-virtual disk or a second pseudo-virtual disk different from the first pseudo-virtual disk.

20 Claims, 26 Drawing Sheets

(51) Int. Cl.
  *G06F 16/11* (2019.01)
  *G06F 16/188* (2019.01)
  *G06F 21/00* (2013.01)
  *G06F 21/62* (2013.01)
  *H04L 9/32* (2006.01)
  *H04L 9/06* (2006.01)

(52) U.S. Cl.
  CPC ...... *G06F 11/1451* (2013.01); *G06F 11/1464* (2013.01); *G06F 16/128* (2019.01); *G06F 16/188* (2019.01); *G06F 21/00* (2013.01); *G06F 21/6218* (2013.01); *H04L 9/0643* (2013.01); *H04L 9/3239* (2013.01); *G06F 2009/45583* (2013.01); *G06F 2201/84* (2013.01)

(56) References Cited

U.S. PATENT DOCUMENTS

| | | |
|---|---|---|
| 8,046,547 B1 | 10/2011 | Chatterjee et al. |
| 8,060,476 B1 | 11/2011 | Afonso et al. |
| 8,135,930 B1 | 3/2012 | Mattox et al. |
| 8,234,469 B2 | 7/2012 | Ranade |
| 8,315,985 B1 | 11/2012 | Ohr et al. |
| 8,332,689 B2 | 12/2012 | Timashev et al. |
| 8,341,365 B2 | 12/2012 | Murase et al. |
| 8,359,594 B1 | 1/2013 | Davidson et al. |
| 8,375,003 B1 | 2/2013 | Afonso et al. |
| 8,402,309 B2 | 3/2013 | Timashev et al. |
| 8,566,326 B2 | 10/2013 | Hu et al. |
| 8,589,350 B1 | 11/2013 | Lalonde et al. |
| 8,645,950 B2 | 2/2014 | Fries et al. |
| 8,712,978 B1 | 4/2014 | Shilane et al. |
| 8,725,871 B2 | 5/2014 | Ding et al. |
| 8,732,411 B1 | 5/2014 | Chatterjee et al. |
| 8,756,197 B1 | 6/2014 | Wilde et al. |
| 8,910,156 B1 | 12/2014 | Kenchammana-Hosekote et al. |
| 8,984,221 B2 * | 3/2015 | Satoyama ............. G06F 3/0605 711/114 |
| 9,047,238 B2 | 6/2015 | Zaslavsky et al. |
| 9,116,846 B2 | 8/2015 | Vasilyev et al. |
| 9,213,572 B2 | 12/2015 | Farkas et al. |
| 9,311,318 B1 | 4/2016 | Afonso et al. |
| 9,372,825 B1 | 6/2016 | Shee |
| 9,465,518 B1 | 10/2016 | Koryakina et al. |
| 9,521,198 B1 | 12/2016 | Agarwala et al. |
| 9,536,546 B2 | 1/2017 | Motta et al. |
| 9,569,124 B2 | 2/2017 | Jain et al. |
| 9,715,346 B2 | 7/2017 | Jain et al. |
| 10,007,445 B2 | 6/2018 | Nithrakashyap et al. |
| 10,114,564 B2 | 10/2018 | Jain et al. |
| 10,114,565 B2 | 10/2018 | Nithrakashyap et al. |
| 10,133,495 B2 | 11/2018 | Jain et al. |
| 10,241,691 B2 | 3/2019 | Jain et al. |
| 10,282,112 B2 | 5/2019 | Jain et al. |
| 10,303,555 B1 | 5/2019 | Lee |
| 10,346,354 B2 | 7/2019 | Kushwah et al. |
| 10,423,342 B1 * | 9/2019 | Chheda ............... G06F 3/0619 |
| 10,678,448 B2 | 6/2020 | Jain et al. |
| 10,824,589 B2 | 11/2020 | Jain et al. |
| 11,079,941 B2 | 8/2021 | Jain et al. |
| 2001/0044807 A1 | 11/2001 | Kleiman et al. |
| 2002/0176193 A1 | 11/2002 | Coonen |
| 2003/0115433 A1 | 6/2003 | Kodama |
| 2003/0131278 A1 | 7/2003 | Fujibayashi |
| 2003/0182313 A1 | 9/2003 | Federwisch et al. |
| 2004/0085965 A1 | 5/2004 | Fotedar |
| 2004/0139128 A1 | 7/2004 | Becker et al. |
| 2004/0210885 A1 | 10/2004 | Wang et al. |
| 2005/0108486 A1 | 5/2005 | Sandorfi |
| 2005/0187992 A1 | 8/2005 | Prahlad et al. |
| 2007/0136395 A1 * | 6/2007 | Fries ................. G06F 11/1464 |
| 2007/0156794 A1 | 7/2007 | Kisley et al. |
| 2007/0294563 A1 | 12/2007 | Bose |
| 2008/0013830 A1 | 1/2008 | Patterson et al. |
| 2008/0256311 A1 | 10/2008 | Lee |
| 2009/0043873 A1 | 2/2009 | Barsness et al. |
| 2009/0150879 A1 | 6/2009 | Raghunath |
| 2010/0049929 A1 | 2/2010 | Nagarkar et al. |
| 2010/0070726 A1 | 3/2010 | Ngo et al. |
| 2010/0077165 A1 | 3/2010 | Lu et al. |
| 2010/0138827 A1 | 6/2010 | Frank et al. |
| 2010/0223428 A1 | 9/2010 | Wayda et al. |
| 2010/0306484 A1 | 12/2010 | Obr et al. |
| 2011/0154331 A1 | 6/2011 | Ciano et al. |
| 2011/0191356 A1 | 8/2011 | Gazula |
| 2011/0191559 A1 | 8/2011 | Li et al. |
| 2011/0265085 A1 | 10/2011 | Kedem et al. |
| 2011/0307886 A1 | 12/2011 | Thanga et al. |
| 2011/0320882 A1 | 12/2011 | Beaty et al. |
| 2012/0072393 A1 | 3/2012 | Kumar et al. |
| 2012/0130956 A1 | 5/2012 | Caputo |
| 2012/0131480 A1 | 5/2012 | Kalmbach et al. |
| 2012/0144391 A1 | 6/2012 | Ueda |
| 2012/0158709 A1 | 6/2012 | Gaonkar et al. |
| 2012/0191931 A1 | 7/2012 | Bricker et al. |
| 2012/0192175 A1 | 7/2012 | Dorai et al. |
| 2012/0246645 A1 | 9/2012 | Iikura et al. |
| 2012/0254131 A1 | 10/2012 | Al Kiswany et al. |
| 2012/0265732 A1 | 10/2012 | Gokhale et al. |
| 2012/0284233 A1 | 11/2012 | Otani |
| 2012/0324446 A1 | 12/2012 | Fries et al. |
| 2013/0080397 A1 | 3/2013 | Payne et al. |
| 2013/0132954 A1 | 5/2013 | Bolte et al. |
| 2013/0145105 A1 | 6/2013 | Sawicki et al. |
| 2013/0191347 A1 | 7/2013 | Bensinger |
| 2013/0262387 A1 | 10/2013 | Varadharajan et al. |
| 2013/0305344 A1 | 11/2013 | Alicherry et al. |
| 2013/0346976 A1 | 12/2013 | Robinson et al. |
| 2014/0047268 A1 | 2/2014 | Timashev et al. |
| 2014/0052698 A1 | 2/2014 | Chen et al. |
| 2014/0095817 A1 * | 4/2014 | Hsu .................... G06F 11/1438 711/162 |
| 2014/0115579 A1 | 4/2014 | Kong |
| 2014/0130040 A1 | 5/2014 | Lemanski |
| 2014/0188807 A1 | 7/2014 | Al-Kiswany et al. |
| 2014/0201163 A1 | 7/2014 | Tipton et al. |
| 2014/0229440 A1 | 8/2014 | Venkatesh et al. |
| 2014/0244935 A1 | 8/2014 | Ezra et al. |
| 2014/0258238 A1 | 9/2014 | Jin et al. |
| 2014/0279909 A1 | 9/2014 | Sudarsanam et al. |
| 2014/0297603 A1 | 10/2014 | Kim et al. |
| 2014/0325182 A1 | 10/2014 | Varakur et al. |
| 2015/0012920 A1 | 1/2015 | De Santis et al. |
| 2015/0067283 A1 | 3/2015 | Basu et al. |
| 2015/0067390 A1 | 3/2015 | Blake |
| 2015/0242283 A1 | 8/2015 | Simoncelli et al. |
| 2015/0244775 A1 | 8/2015 | Vibhor et al. |
| 2015/0277802 A1 | 10/2015 | Oikarinen et al. |
| 2015/0277952 A1 | 10/2015 | Lin et al. |
| 2015/0301903 A1 | 10/2015 | Mutha et al. |
| 2015/0324215 A1 | 11/2015 | Borthakur |
| 2015/0331744 A1 | 11/2015 | Slik |
| 2016/0026485 A1 | 1/2016 | Araujo |
| 2016/0026492 A1 | 1/2016 | Son et al. |
| 2016/0042761 A1 | 2/2016 | Motta et al. |
| 2016/0048408 A1 | 2/2016 | Madhu et al. |
| 2016/0124665 A1 * | 5/2016 | Jain .................... G06F 3/0685 711/162 |
| 2016/0124676 A1 | 5/2016 | Jain et al. |
| 2016/0124764 A1 | 5/2016 | Nithrakashyap |
| 2016/0124972 A1 | 5/2016 | Jain et al. |
| 2016/0124977 A1 | 5/2016 | Jain et al. |
| 2016/0124978 A1 | 5/2016 | Nithrakashyap |
| 2016/0125058 A1 | 5/2016 | Jain et al. |
| 2016/0125059 A1 | 5/2016 | Jain et al. |
| 2016/0127307 A1 | 5/2016 | Jain et al. |
| 2016/0139836 A1 * | 5/2016 | Nallathambi ......... G06F 3/0619 711/114 |
| 2016/0142483 A1 * | 5/2016 | Nallathambi ......... G06F 3/0619 707/639 |
| 2017/0139729 A1 | 5/2017 | Cropper et al. |
| 2018/0059973 A1 | 3/2018 | Jain et al. |

(56) References Cited

U.S. PATENT DOCUMENTS

| | | |
|---|---|---|
| 2018/0121453 A1 | 5/2018 | Jain et al. |
| 2018/0121454 A1 | 5/2018 | Kushwah et al. |
| 2018/0232278 A1* | 8/2018 | Kumarasamy ...... G06F 11/1458 |
| 2018/0302439 A1 | 10/2018 | Hoffmann |
| 2018/0373879 A1 | 12/2018 | Lango et al. |
| 2019/0108099 A1 | 4/2019 | Mazumdar |
| 2019/0163580 A1 | 5/2019 | Pandey et al. |
| 2019/0171374 A1 | 6/2019 | Jain et al. |
| 2020/0210075 A1 | 7/2020 | Jain et al. |

OTHER PUBLICATIONS

"U.S. Appl. No. 16/155,533, Non Final Office Action dated May 27, 2021", 14 pages.

"U.S. Appl. No. 16/155,533, Response filed Jul. 28, 2021 to Non Final Office Action dated May 27, 2021", 10 pages.

PCT Application No. PCT/US2015/059063, International Search Report and Written Opinion, ISA/EPO, dated Apr. 22, 2016, 14 pages.

Baier et al., Security Aspects of Piecewise Hasing in Computer Forensics, IT Security Incident Management and IT Forensics (IMF), 2011 Sixth International Conference on IEEE (May 10, 2011), 16 pages.

\* cited by examiner

```
Virtual Machine A, Version V7 {
    pBase2,              ⟶  /snapshots/VM_A/s7/s7.full
}
```

```
Virtual Machine A, Version V2 {
    pBase2,              ⟶  /snapshots/VM_A/s7/s7.full
    pR11,                ⟶  /snapshots/VM_A/s6/s6.delta
    pR12,                ⟶  /snapshots/VM_A/s5/s5.delta
    pR1,                 ⟶  /snapshots/VM_A/s4/s4.delta
    pR2,                 ⟶  /snapshots/VM_A/s3/s3.delta
    pR3                  ⟶  /snapshots/VM_A/s2/s2.delta
}
```

Virtual Machine B, Version V1 {
    pBase,
    pR1,
    pR2,
    pF3
}

Virtual Machine C, Version V2 {
    pBase,
    pF1,
    pF5,
    pF6
}

FIG. 2H       FIG. 2I

Virtual Machine B, Version V1 {
    pBase2,
    pR11,
    pR12,
    pR1,
    pR2,
    pF3
}

Virtual Machine C, Version V2 {
    pBase2,
    pR11,
    pF5,
    pF6
}

```
Virtual Machine A, Version VS {
    pBaseA,
    pR4,
}
```

```
Virtual Machine A, Version VU {
    pBaseB,
    pR1,
    pR2,
    pR3
}
```

Virtual Machine A, Version VU {
    pBaseA,
    pF9
}

Versions of File X on Virtual Machine A

Version X1 of File X saved at Time T1 ⟶ Version A23 of Virtual Machine A
Version X2 of File X saved at Time T2 ⟶ Version A45 of Virtual Machine A
Version X3 of File X saved at Time T3 ⟶ Version A58 of Virtual Machine A
Version X4 of File X saved at Time T4 ⟶ Version A72 of Virtual Machine A Versions of File Y on Virtual Machine A Version Y1 of File Y saved at Time T2 ⟶ Version A45 of Virtual Machine A
Version Y2 of File Y saved at Time T8 ⟶ Version A95 of Virtual Machine A

FIG. 3E

```
Virtual Machine A, Version A45 {
    pBase,              ⟶  /snapshots/VM_A/s100/s100.full
    pR1,                ⟶  /snapshots/VM_A/s99/s99.delta
    pR2,                ⟶  /snapshots/VM_A/s98/s98.delta
     .
     .
     .
    pR54,               ⟶  /snapshots/VM_A/s46/s46.delta
    pR55                ⟶  /snapshots/VM_A/s45/s45.delta
}
```

FIG. 3F

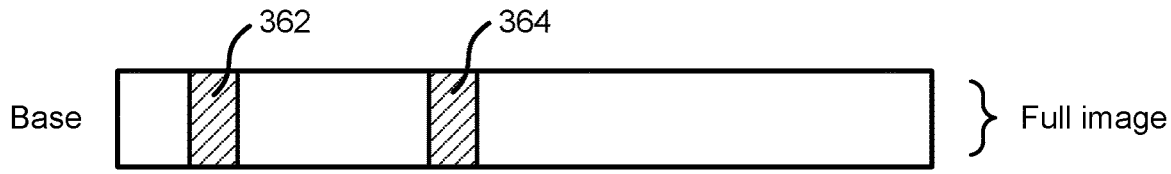

FIG. 3G

Versions of File SD1/document1.txt

Version 1 ⟶ Full copy on Pseudo-Virtual Disk A
Version 2 ⟶ First set of forward incrementals on Pseudo-Virtual Disk B
Version 3 ⟶ Second set of forward incrementals on Pseudo-Virtual Disk C Versions of File SD1/image1.jpg Version 1 ⟶ Full copy on Pseudo-Virtual Disk A
Version 2 ⟶ First set of forward incrementals on Pseudo-Virtual Disk C Versions of File SD2/virtualdisk1.vmdk Version 1 ⟶ Full copy on Pseudo-Virtual Disk A
Version 2 ⟶ First set of forward incrementals on Pseudo-Virtual Disk A
Version 3 ⟶ Second set of forward incrementals on Pseudo-Virtual Disk B
Version 4 ⟶ Third set of forward incrementals on Pseudo-Virtual Disk C Versions of File SD2/virtualdisk2.vmdk Version 1 ⟶ Full copy on Pseudo-Virtual Disk A
Version 2 ⟶ First set of forward incrementals on Pseudo-Virtual Disk A
Version 3 ⟶ Second set of forward incrementals on Pseudo-Virtual Disk B Versions of File SD3/virtualdisk3.vmdk Version 1 ⟶ Full copy on Pseudo-Virtual Disk B
Version 2 ⟶ First set of forward incrementals on Pseudo-Virtual Disk C

FIG. 4D

INCREMENTAL FILE SYSTEM BACKUP USING A PSEUDO-VIRTUAL DISK

CLAIM OF PRIORITY

The present application claims priority to U.S. Provisional Application No. 62/570,436, entitled "Incremental File System Backup Using a Pseudo-Virtual Disk," filed Oct. 10, 2017, which is herein incorporated by reference in its entirety.

BACKGROUND

Virtualization allows virtual hardware to be created and decoupled from the underlying physical hardware. For example, a hypervisor running on a host machine or server may be used to create one or more virtual machines that may each run the same operating system or different operating systems (e.g., a first virtual machine may run a Windows® operating system and a second virtual machine may run a Unix-like operating system such as OS X®. A virtual machine may comprise a software implementation of a physical machine. The virtual machine may include one or more virtual hardware devices, such as a virtual processor, a virtual memory, a virtual disk, or a virtual network interface card. The virtual machine may load and execute an operating system and applications from the virtual memory. The operating system and applications executed by the virtual machine may be stored using the virtual disk. The virtual machine may be stored (e.g., using a datastore comprising one or more physical storage devices) as a set of files including a virtual disk file for storing the contents of the virtual disk and a virtual machine configuration file for storing configuration settings for the virtual machine. The configuration settings may include the number of virtual processors (e.g., four virtual CPUs), the size of a virtual memory, and the size of a virtual disk (e.g., a 10 GB virtual disk) for the virtual machine.

BRIEF DESCRIPTION OF THE DRAWINGS

FIG. 3E depicts one embodiment of a virtual machine search index.
FIG. 3F depicts one embodiment of a merged file for the version A45 of Virtual Machine A referred to in FIG. 3E.
FIG. 3G depicts one embodiment of a first portion of a base image and a second portion of the base image.
FIG. 4D depicts one embodiment of a file version index for mapping versions of electronic files to locations within one or more pseudo-virtual disks.

DETAILED DESCRIPTION

Figure 1A:
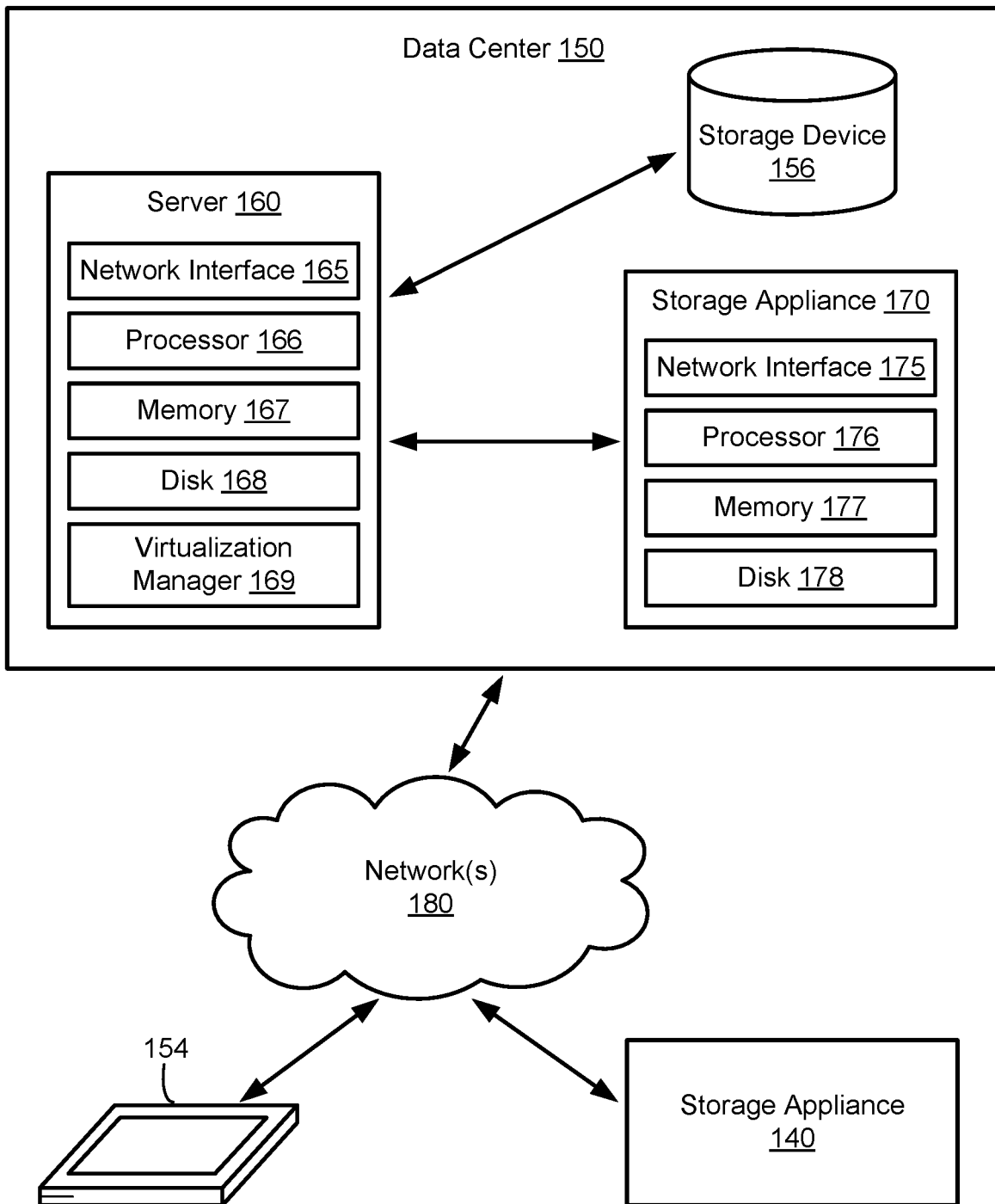
FIG. 1A depicts one embodiment of a networked computing environment.

Technology is described for backing up and restoring sets of electronic files using sets of pseudo-virtual disks. The sets of electronic files may be sourced from or be stored using one or more different data sources including one or more real machines (e.g., a laptop, tablet computer, smartphone, hardware server, or a network-attached storage device) and/or one or more virtual machines. A first snapshot of the sets of electronic files may be aggregated from the different data sources and stored using a first pseudo-virtual disk. The first pseudo-virtual disk may comprise a virtual disk that uses a first file system that may be the same as or different from the file systems used to store the sets of electronic files using the one or more real machines or the one or more virtual machines. For example, the file system for the first pseudo-virtual disk may comprise a journaling file system such as ext4 while a different file system storing a first set of the electronic files may utilize a File Allocation Table (FAT) or New Technology File System (NTFS) file system. A second snapshot of the sets of electronic files may be aggregated from the different data sources subsequent to the generation of the first pseudo-virtual disk and stored using the first pseudo-virtual disk or a second pseudo-virtual disk different from the first pseudo-virtual disk. In some cases, the second pseudo-virtual disk may use a second file system different from the first file system used by the first pseudo-virtual disk.

The sets of electronic files may include a first set of electronic files (e.g., database files sourced from a hardware server) and a second set of electronic files (e.g., sourced from a virtual machine). The first snapshot of the sets of electronic files may be stored using the first pseudo-virtual disk as full images of the files or as exact copies of the sets of electronic files at a first point in time corresponding with the first snapshot. In some cases, the second snapshot of the sets of electronic files may be stored as incremental files (e.g., forward incremental files) using the first pseudo-virtual disk if disk space is available. In other cases, the second snapshot of the sets of electronic files may be stored using the second pseudo-virtual disk as incremental files or files containing data changes that have occurred to the sets of electronic files between the first point in time and a second point in time corresponding with the second snapshot. In one embodiment, the data changes that have occurred to the sets of electronic files between the first point in time corresponding with the first snapshot and the second point in time corresponding with the second snapshot may be determined by partitioning each file in the sets of electronic files at the second point in time into a number of data chunks, generating a signature for each of the data chunks, and comparing the signature with a previously generated signature for the data chunk at the first point in time. In one example, the sets of electronic files may include a first electronic file and a version of the first electronic file at the second point in time corresponding with the second snapshot may be partitioned into five data chunks and five signatures may be generated for the five data chunks; after the five signatures have been generated, the five signatures may be compared with five previously generated signatures for the first electronic file at the first point in time corresponding with the first snapshot. If a signature for a first data chunk of the five data chunks matches a previously generated signature, then it may be deemed that no data changes have occurred to the first data chunk. However, if a signature for the first data chunk does not match the previously generated signature, then it may be deemed that data changes have occurred to the first data chunk and the first data chunk or the data changes that have occurred to the first data chunk may be stored using the first pseudo-virtual disk or the second pseudo-virtual disk.

In one embodiment, the type of fingerprinting algorithm applied to generate a signature for a data chunk of an electronic file may depend on the overall file size of the electronic file, a file type associated with the electronic file (e.g., whether the electronic file comprises a database file, a word processing file, a spreadsheet file, an image, a text file, a virtual disk, or a file associated with a virtual machine), a size of the data chunk, a number of bits comprising the data chunk, and/or an estimated time to generate, store, or transmit the data changes. In some cases, an estimate of network bandwidth and file size may be used to determine an estimated time to transmit the data changes from a first data source storing the electronic file (or from a backup agent running on the data source) to a storage device storing the second pseudo-virtual disk. In one example, if the file size of the electronic file is less than a first threshold file size, then no signature may be generated and the entire electronic file may be transmitted and stored within the second pseudo-virtual disk. In this case, the time to generate a signature and identify data changes using the signature may be greater than the time to simply transmit the entire electronic file. If the file size of electronic file is greater than the first threshold file size but less than a second threshold file size, then a first signature may be generated using a first type of fingerprinting (e.g., a fast fingerprinting algorithm such as the Rabin fingerprinting algorithm or SHA1) and the data changes identified using the first signature may be transmitted and stored within the second pseudo-virtual disk. If the file size of electronic file is greater than the second threshold file size, then a second signature may be generated using a second type of fingerprinting different from the first type of fingerprinting (e.g., a slower and relatively more precise fingerprinting algorithm such as MD5) and the data changes identified using the second signature may be transmitted and stored within the second pseudo-virtual disk. In another example, a first estimated time to generate and transmit data changes using a first type of fingerprinting and a second estimated time greater than the first estimated time to generate and transmit data changes using a second type of fingerprinting may be acquired. Based on the file size of the electronic file, available network bandwidth, and history of prior data transmissions, a current estimate for generating and transmitting data changes for the electronic file may be compared with the first estimated time and the second estimated time. If the current estimate is greater than the second estimated time, then the second type of fingerprinting may be used to determine the data changes to be transmitted. If the current estimate is less than the second estimated time but greater than the first estimated time, then the first type of fingerprinting may be used to determine the data changes to be transmitted.

In some cases, a pseudo-virtual disk may comprise an artificial virtual disk that does not map to or is different from any of the disks used to store the sets of electronic files using the one or more real machines or the one or more virtual machines. The file system for the pseudo-virtual disk may manage access to the contents of each file stored within the pseudo-virtual disk and any metadata corresponding with each file. Each file may be associated with a filename that identifies a storage location within the file system. In one embodiment, the pseudo-virtual disk may be created by concatenating the sets of electronic files and then wrapping or building a file system (e.g., NTFS or ext4) around the concatenated set of files. In another embodiment, a memory size may be determined for the aggregated sets of electronic files, a virtual disk may be created of the memory size, and then the sets of electronic files may be written to the virtual disk of the memory size. In some cases, the memory size may be set such that the sets of electronic files exactly fit within the virtual disk. In other cases, the memory size may be set such that exact copies of the sets of electronic files and an additional amount of disk space (e.g., an additional amount of 500 MB of disk space for storing a set of future incremental files) exactly fit within the virtual disk.

In one embodiment, the sets of electronic files that are aggregated and backed up using a pseudo-virtual disk may comprise 10K files from a laptop computer, 20K files from a hardware server, and 15K files from a virtual machine. The sets of electronic files may be identified using various search criteria. The search criteria may utilize wildcard characters or regular expressions to find files with matching filenames or other attributes. For example, the 10K files from the laptop computer may comprise all electronic files on the laptop that pattern match C:\ST*\*.pdf or C:\images\*jpg, wherein the asterisk (*) matches any number of characters. Thus, the sets of electronic files may not necessarily correspond with all files stored within a particular folder or directory, and may instead comprise subsets of files stored within the folders or directories that match a specified pattern. The sets of electronic files may be acquired from multiple storage devices, each running the same or different file systems, and/or multiple computing devices, each running the same or different operation systems.

In some embodiments, an integrated data management and storage system or an agent running on a hardware server or other data source that is in communication with the integrated data management and storage system may dynamically adjust the type of fingerprinting applied to generate signatures for identifying data changes in different versions of an electronic file from a faster or less precise algorithm to a slower or relatively more precise algorithm if the additional compute time for using the slower algorithm leads to improved system performance. In some cases, the integrated data management and storage system may be implemented using hardware components or using virtual components (e.g., virtual machines and virtual disks). The type of fingerprinting algorithm applied may be determined based on a file size of the electronic file, a file type of the electronic file (e.g., an image file compared with a database file), network bandwidth, an estimated data transfer time between the agent and the integrated data management and storage system, link speed, CPU usage, and/or memory usage. The fingerprinting algorithm may comprise a method for mapping an electronic file or a portion of the electronic file to a smaller bit string (or fingerprint) that uniquely or substantially identifies the electronic file or the portion thereof. In one embodiment, the fingerprinting algorithm may comprise the Rabin fingerprint algorithm or a cryptographic hashing algorithm (e.g., MD5 or one of the SHA-family of algorithms).

An integrated data management and storage system may be configured to manage the automated storage, backup, deduplication, replication, recovery, and archival of data within and across physical and virtual computing environments. The integrated data management and storage system may provide a unified primary and secondary storage system with built-in data management that may be used as both a backup storage system and a "live" primary storage system for primary workloads. In some cases, the integrated data management and storage system may manage the extraction and storage of historical snapshots associated with different point in time versions of virtual machines and/or real machines (e.g., a hardware server or a mobile computing device) and provide near instantaneous recovery of a backed-up version of a virtual machine, a real machine, or one or more files residing on the virtual machine or the real machine. The integrated data management and storage system may allow backed-up versions of real or virtual machines to be directly mounted or made accessible to primary workloads in order to enable the near instantaneous recovery of the backed-up versions and allow secondary workloads (e.g., workloads for experimental or analytics purposes) to directly use the integrated data management and storage system as a primary storage target to read or modify past versions of data.

The integrated data management and storage system may include a distributed cluster of storage nodes that presents itself as a unified storage system even though numerous storage nodes may be connected together and the number of connected storage nodes may change over time as storage nodes are added to or removed from the cluster. The integrated data management and storage system may utilize a scale-out node based architecture in which a plurality of data storage appliances comprising one or more nodes each are in communication with each other via one or more networks.

Each storage node may include two or more different types of storage devices and control circuitry configured to store, deduplicate, compress, and/or encrypt data stored using the two or more different types of storage devices. In one example, a storage node may include two solid-state drives (SSDs), three hard disk drives (HDDs), and one or more processors configured to concurrently read data from and/or write data to the storage devices. The integrated data management and storage system may replicate and distribute versioned data, metadata, and task execution across the distributed cluster to increase tolerance to node and disk failures (e.g., snapshots of a virtual machine may be triply mirrored across the cluster). Data management tasks may be assigned and executed across the distributed cluster in a fault tolerant manner based on the location of data within the cluster (e.g., assigning tasks to nodes that store data related to the task) and node resource availability (e.g., assigning tasks to nodes with sufficient compute or memory capacity for the task).

The integrated data management and storage system may apply a data backup and archiving schedule to backed-up real and virtual machines to enforce various backup service level agreements (SLAs), recovery point objectives (RPOs), recovery time objectives (RTOs), data retention requirements, and other data backup, replication, and archival policies across the entire data lifecycle. For example, the data backup and archiving schedule may require that snapshots of a virtual machine are captured and stored every four hours for the past week, every day for the past six months, and every week for the past five years. In one embodiment, the integrated data management and storage system may assign a virtual machine to a backup class (e.g., an SLA class) associated with a backup schedule (e.g., specifying backup frequency and retention), acquire snapshots of the virtual machine over time based on the backup schedule, determine how to store the snapshots over time (e.g., as full image snapshots or as incremental snapshots) and store the snapshots (e.g., using a SSD or HDD), determine when to archive the snapshots (e.g., moving a snapshot from a local cluster to a private or public cloud service), and subsequently consolidate or delete the snapshots. Selectively transferring snapshots as they age from a local cluster to archived storage in the cloud may increase the cluster's effective capacity for storing additional snapshots and improve the overall performance of the cluster.

The integrated data management and storage system may generate and maintain a global index of backed-up files and machines (real and virtual) across local data storage and cloud storage. The global index may be used to provide granular file search and recovery of one or more individual files stored on a particular point in time version of a backed-up machine that has been stored in a distributed cluster and/or in the cloud. The integrated data management and storage system may access the global index to quickly locate requested versions of the individual files regardless of whether the files are located on a local cluster and/or in the cloud. In some cases, to restore the individual files from a particular snapshot of a backed-up machine, the integrated data management and storage system may only need to download a small portion of the backed-up machine from the cloud, thereby significantly reducing network congestion and the associated download costs for transferring the backed-up machine from the cloud to the local cluster. In one example, the integrated data management and storage system may download 50 KB of a 10 TB virtual machine from the cloud in order to restore three individual files (e.g., a word processing file, a spreadsheet, and a database).

As virtualization technologies are adopted into information technology (IT) infrastructures, there is a growing need for recovery mechanisms to support mission critical application deployment within a virtualized infrastructure. However, a virtualized infrastructure may present a new set of challenges to the traditional methods of data management due to the higher workload consolidation and the need for instant, granular recovery. An integrated data management and storage system may enable substantially instantaneous recovery of applications running on the virtual infrastructure without requiring the applications to be restored first to a primary storage platform. The integrated data management and storage system may provide a unified primary and secondary storage system that allows virtual machine snapshots to be directly mounted and used by secondary workloads, thereby providing a non-passive data storage for backups and supporting secondary workloads that require access to production data stored on a primary storage platform used within a production environment. The benefits of using an integrated data management and storage system include the ability to reduce the amount of data storage required to backup real and virtual machines, the ability to reduce the amount of data storage required to support secondary or non-production workloads, the ability to provide a non-passive storage target in which backup data may be directly accessed and modified, and the ability to quickly restore earlier versions of virtual machines and files stored locally or in the cloud.

FIG. 1A depicts one embodiment of a networked computing environment 100 in which the disclosed technology may be practiced. As depicted, the networked computing environment 100 includes a data center 150, a storage appliance 140, and a computing device 154 in communication with each other via one or more networks 180. The networked computing environment 100 may include a plurality of computing devices interconnected through one or more networks 180. The one or more networks 180 may allow computing devices and/or storage devices to connect to and communicate with other computing devices and/or other storage devices. In some cases, the networked computing environment may include other computing devices and/or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system.

The data center 150 may include one or more servers, such as server 160, in communication with one or more storage devices, such as storage device 156. The one or more servers may also be in communication with one or more storage appliances, such as storage appliance 170. The server 160, storage device 156, and storage appliance 170 may be in communication with each other via a networking fabric connecting servers and data storage units within the data center to each other. The server 160 may comprise a production hardware server. The storage appliance 170 may include a data management system for backing up virtual machines, real machines, virtual disks, real disks, and/or electronic files within the data center 150. The server 160 may be used to create and manage one or more virtual machines associated with a virtualized infrastructure. The one or more virtual machines may run various applications, such as a database application or a web server. The storage device 156 may include one or more hardware storage devices for storing data, such as a hard disk drive (HDD), a magnetic tape drive, a solid-state drive (SSD), a storage area network (SAN) storage device, or a networked-attached storage (NAS) device. In some cases, a data center, such as data center 150, may include thousands of servers and/or data storage devices in communication with each other. The data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 180 may include a secure network such as an enterprise private network, an unsecure network such as a wireless open network, a local area network (LAN), a wide area network (WAN), and the Internet. The one or more networks 180 may include a cellular network, a mobile network, a wireless network, or a wired network. Each network of the one or more networks 180 may include hubs, bridges, routers, switches, and wired transmission media such as a direct-wired connection. The one or more networks 180 may include an extranet or other private network for securely sharing information or providing controlled access to applications or files.

A server, such as server 160, may allow a client to download information or files (e.g., executable, text, application, audio, image, or video files) from the server or to perform a search query related to particular information stored on the server. In some cases, a server may act as an application server or a file server. In general, a server may refer to a hardware device that acts as the host in a client-server relationship or a software process that shares a resource with or performs work for one or more clients. One embodiment of server 160 includes a network interface 165, processor 166, memory 167, disk 168, and virtualization manager 169 all in communication with each other. Network interface 165 allows server 160 to connect to one or more networks 180. Network interface 165 may include a wireless network interface and/or a wired network interface. Processor 166 allows server 160 to execute computer readable instructions stored in memory 167 in order to perform processes described herein. Processor 166 may include one or more processing units, such as one or more CPUs and/or one or more GPUs. Memory 167 may comprise one or more types of memory (e.g., RAM, SRAM, DRAM, ROM, EEPROM, Flash, etc.). Disk 168 may include a hard disk drive and/or a solid-state drive. Memory 167 and disk 168 may comprise hardware storage devices.

The virtualization manager 169 may manage a virtualized infrastructure and perform management operations associated with the virtualized infrastructure. The virtualization manager 169 may manage the provisioning of virtual machines running within the virtualized infrastructure and provide an interface to computing devices interacting with the virtualized infrastructure. In one example, the virtualization manager 169 may set a virtual machine into a frozen state in response to a snapshot request made via an application programming interface (API) by a storage appliance, such as storage appliance 170. Setting the virtual machine into a frozen state may allow a point in time snapshot of the virtual machine to be stored or transferred. In one example, updates made to a virtual machine that has been set into a frozen state may be written to a separate file (e.g., an update file) while the virtual disk file associated with the state of the virtual disk at the point in time is frozen. The virtual disk file may be set into a read-only state to prevent modifications to the virtual disk file while the virtual machine is in the frozen state. The virtualization manager 169 may then transfer data associated with the virtual machine (e.g., an image of the virtual machine or a portion of the image of the virtual machine) to a storage appliance in response to a request made by the storage appliance. After the data associated with the point in time snapshot of the virtual machine has been transferred to the storage appliance, the virtual machine may be released from the frozen state (i.e., unfrozen) and the updates made to the virtual machine and stored in the separate file may be merged into the virtual disk file. The virtualization manager 169 may perform various virtual machine related tasks, such as cloning virtual machines, creating new virtual machines, monitoring the state of virtual machines, moving virtual machines between physical hosts for load balancing purposes, and facilitating backups of virtual machines.

One embodiment of storage appliance 170 includes a network interface 175, processor 176, memory 177, and disk 178 all in communication with each other. Network interface 175 allows storage appliance 170 to connect to one or more networks 180. Network interface 175 may include a wireless network interface and/or a wired network interface. Processor 176 allows storage appliance 170 to execute computer readable instructions stored in memory 177 in order to perform processes described herein. Processor 176 may include one or more processing units, such as one or more CPUs and/or one or more GPUs. Memory 177 may comprise one or more types of memory (e.g., RAM, SRAM, DRAM, ROM, EEPROM, NOR Flash, NAND Flash, etc.). Disk 178 may include a hard disk drive and/or a solid-state drive. Memory 177 and disk 178 may comprise hardware storage devices.

In one embodiment, the storage appliance 170 may include four machines. Each of the four machines may include a multi-core CPU, 64 GB of RAM, a 400 GB SSD, three 4 TB HDDs, and a network interface controller. In this case, the four machines may be in communication with the one or more networks 180 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point in time versions of one or more virtual machines.

In another embodiment, the storage appliance 170 may comprise a virtual appliance that comprises four virtual machines. Each of the virtual machines in the virtual appliance may have 64 GB of virtual memory, a 12 TB virtual disk, and a virtual network interface controller. In this case, the four virtual machines may be in communication with the one or more networks 180 via the four virtual network interface controllers. The four virtual machines may comprise four nodes of a virtual cluster.

The networked computing environment 100 may provide a cloud computing environment for one or more computing devices. Cloud computing may refer to Internet-based computing, wherein shared resources, software, and/or information may be provided to one or more computing devices on-demand via the Internet. The networked computing environment 100 may comprise a cloud computing environment providing Software-as-a-Service (SaaS) or Infrastructure-as-a-Service (IaaS) services. SaaS may refer to a software distribution model in which applications are hosted by a service provider and made available to end users over the Internet. In one embodiment, the networked computing environment 100 may include a virtualized infrastructure that provides software, data processing, and/or data storage services to end users accessing the services via the networked computing environment. In one example, networked computing environment 100 may provide cloud-based work productivity or business related applications to a computing device, such as computing device 154. The computing device 154 may comprise a mobile computing device or a tablet computer. The storage appliance 140 may comprise a cloud-based data management system for backing up virtual machines and/or files within a virtualized infrastructure, such as virtual machines running on server 160 or files stored on server 160.

In some embodiments, the storage appliance 170 may manage the extraction and storage of virtual machine snapshots associated with different point in time versions of one or more virtual machines running within the data center 150. A snapshot of a virtual machine may correspond with a state of the virtual machine at a particular point in time. In response to a restore command from the server 160, the storage appliance 170 may restore a point in time version of a virtual machine or restore point in time versions of one or more files located on the virtual machine and transmit the restored data to the server 160. In response to a mount command from the server 160, the storage appliance 170 may allow a point in time version of a virtual machine to be mounted and allow the server 160 to read and/or modify data associated with the point in time version of the virtual machine. To improve storage density, the storage appliance 170 may deduplicate and compress data associated with different versions of a virtual machine and/or deduplicate and compress data associated with different virtual machines. To improve system performance, the storage appliance 170 may first store virtual machine snapshots received from a virtualized environment in a cache, such as a flash-based cache. The cache may also store popular data or frequently accessed data (e.g., based on a history of virtual machine restorations), incremental files associated with commonly restored virtual machine versions, and current day incremental files or incremental files corresponding with snapshots captured within the past 24 hours.

An incremental file may comprise a forward incremental file or a reverse incremental file. A forward incremental file may include a set of data representing changes that have occurred since an earlier point in time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental was captured and any other forward incremental files that were captured subsequent to the last full image and prior to the forward incremental file). A reverse incremental file may include a set of data representing changes from a later point in time snapshot of a virtual machine. To generate a snapshot of the virtual machine corresponding with a reverse incremental file, the reverse incremental file may be combined with a later point in time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 170 may provide a user interface (e.g., a web-based interface or a graphical user interface) that displays virtual machine information, such as identifications of the virtual machines protected and the historical versions or time machine views for each of the virtual machines protected, and allows an end user to search, select, and control virtual machines managed by the storage appliance. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 a virtual machine may correspond with the state of the virtual machine at a first point in time and Version 2 of the virtual machine may correspond with the state of the virtual machine at a second point in time subsequent to the first point in time).

The user interface may enable an end user of the storage appliance 170 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5/Version23). In one example, the storage appliance 170 may run an NFS server and make the particular version (or a copy of the particular version) of the virtual machine accessible for reading and/or writing. The end user of the storage appliance 170 may then select the particular version to be mounted and run an application (e.g., a data analytics application) using the mounted version of the virtual machine. In another example, the particular version may be mounted as an iSCSI target.

Figure 1B:
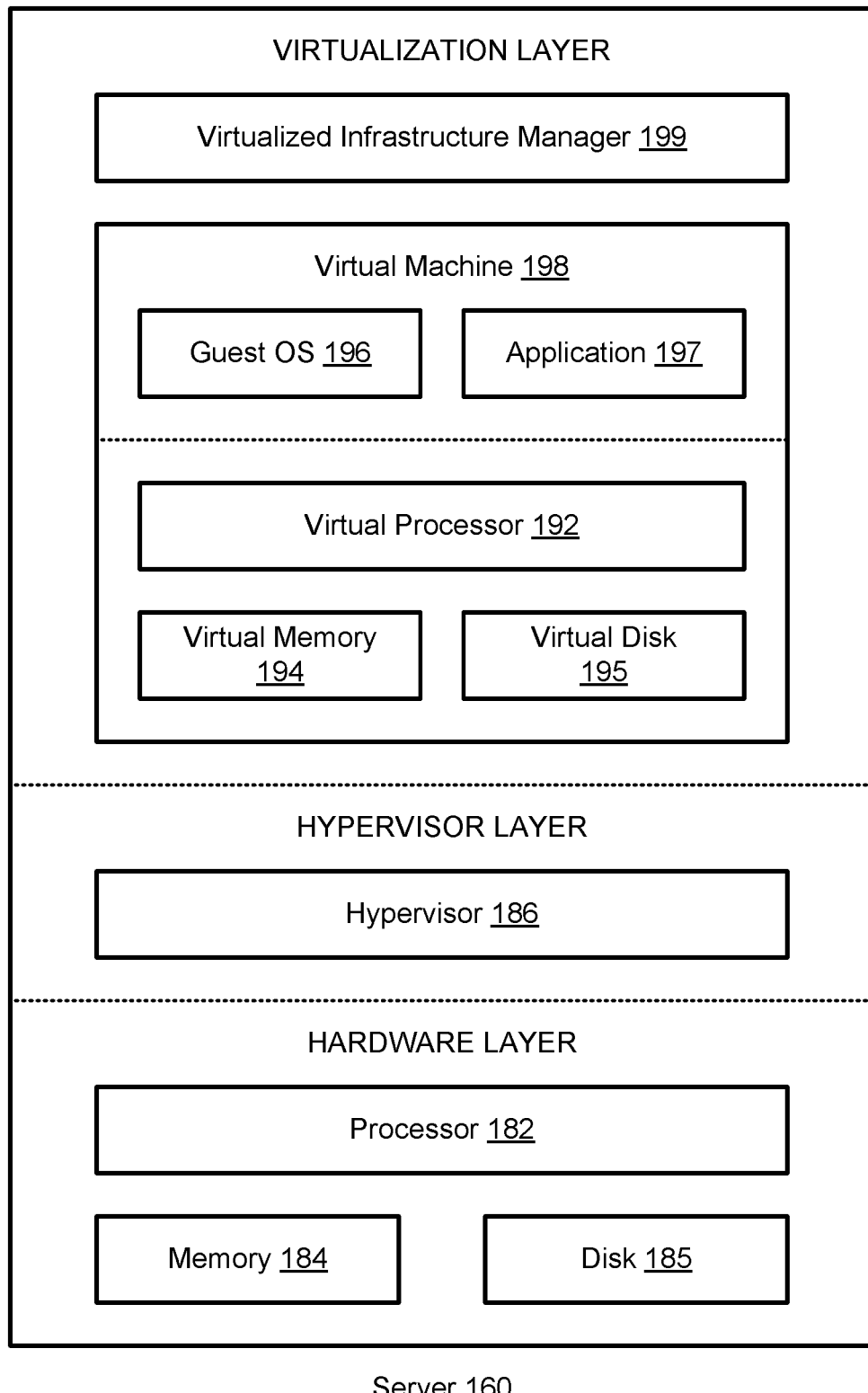
FIG. 1B depicts one embodiment of a server.

FIG. 1B depicts one embodiment of server 160 in FIG. 1A. The server 160 may comprise one server out of a plurality of servers that are networked together within a data center. In one example, the plurality of servers may be positioned within one or more server racks within the data center. As depicted, the server 160 includes hardware-level components and software-level components. The hardware-level components include one or more processors 182, one or more memory 184, and one or more disks 185. The software-level components include a hypervisor 186, a virtualized infrastructure manager 199, and one or more virtual machines, such as virtual machine 198. The hypervisor 186 may comprise a native hypervisor or a hosted hypervisor. The hypervisor 186 may provide a virtual operating platform for running one or more virtual machines, such as virtual machine 198. Virtual machine 198 includes a plurality of virtual hardware devices including a virtual processor 192, a virtual memory 194, and a virtual disk 195. The virtual disk 195 may comprise a file stored within the one or more disks 185. In one example, a virtual machine may include a plurality of virtual disks, with each virtual disk of the plurality of virtual disks associated with a different file stored on the one or more disks 185. Virtual machine 198 may include a guest operating system 196 that runs one or more applications, such as application 197.

The virtualized infrastructure manager 199, which may correspond with the virtualization manager 169 in FIG. 1A, may run on a virtual machine or natively on the server 160. The virtualized infrastructure manager 199 may provide a centralized platform for managing a virtualized infrastructure that includes a plurality of virtual machines. The virtualized infrastructure manager 199 may manage the provisioning of virtual machines running within the virtualized infrastructure and provide an interface to computing devices interacting with the virtualized infrastructure. The virtualized infrastructure manager 199 may perform various virtualized infrastructure related tasks, such as cloning virtual machines, creating new virtual machines, monitoring the state of virtual machines, and facilitating backups of virtual machines.

In one embodiment, the server 160 may use the virtualized infrastructure manager 199 to facilitate backups for a plurality of virtual machines (e.g., eight different virtual machines) running on the server 160. Each virtual machine running on the server 160 may run its own guest operating system and its own set of applications. Each virtual machine running on the server 160 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 140 in FIG. 1A or storage appliance 170 in FIG. 1A, may request a snapshot of a virtual machine running on server 160. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time (e.g., 6:30 p.m. on Jun. 29, 2017) and a second snapshot of the virtual machine may correspond with a second state of the virtual machine at a second point in time subsequent to the first point in time (e.g., 6:30 p.m. on Jun. 30, 2017).

In response to a request for a snapshot of a virtual machine at a particular point in time, the virtualized infrastructure manager 199 may set the virtual machine into a frozen state or store a copy of the virtual machine at the particular point in time. The virtualized infrastructure manager 199 may then transfer data associated with the virtual machine (e.g., an image of the virtual machine or a portion of the image of the virtual machine) to the storage appliance. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 199 may transfer a full image of the virtual machine to the storage appliance or a plurality of data blocks corresponding with the full image (e.g., to enable a full image-level backup of the virtual machine to be stored on the storage appliance). In other cases, the virtualized infrastructure manager 199 may transfer a portion of an image of the virtual machine associated with data that has changed since an earlier point in time prior to the particular point in time or since a last snapshot of the virtual machine was taken. In one example, the virtualized infrastructure manager 199 may transfer only data associated with virtual blocks stored on a virtual disk of the virtual machine that have changed since the last snapshot of the virtual machine was taken. In one embodiment, the data management application may specify a first point in time and a second point in time and the virtualized infrastructure manager 199 may output one or more virtual data blocks associated with the virtual machine that have been modified between the first point in time and the second point in time.

In some embodiments, the server 160 or the hypervisor 186 may communicate with a storage appliance, such as storage appliance 140 in FIG. 1A or storage appliance 170 in FIG. 1A, using a distributed file system protocol such as Network File System (NFS) Version 3. The distributed file system protocol may allow the server 160 or the hypervisor 186 to access, read, write, or modify files stored on the storage appliance as if the files were locally stored on the server. The distributed file system protocol may allow the server 160 or the hypervisor 186 to mount a directory or a portion of a file system located within the storage appliance.

Figure 1C:
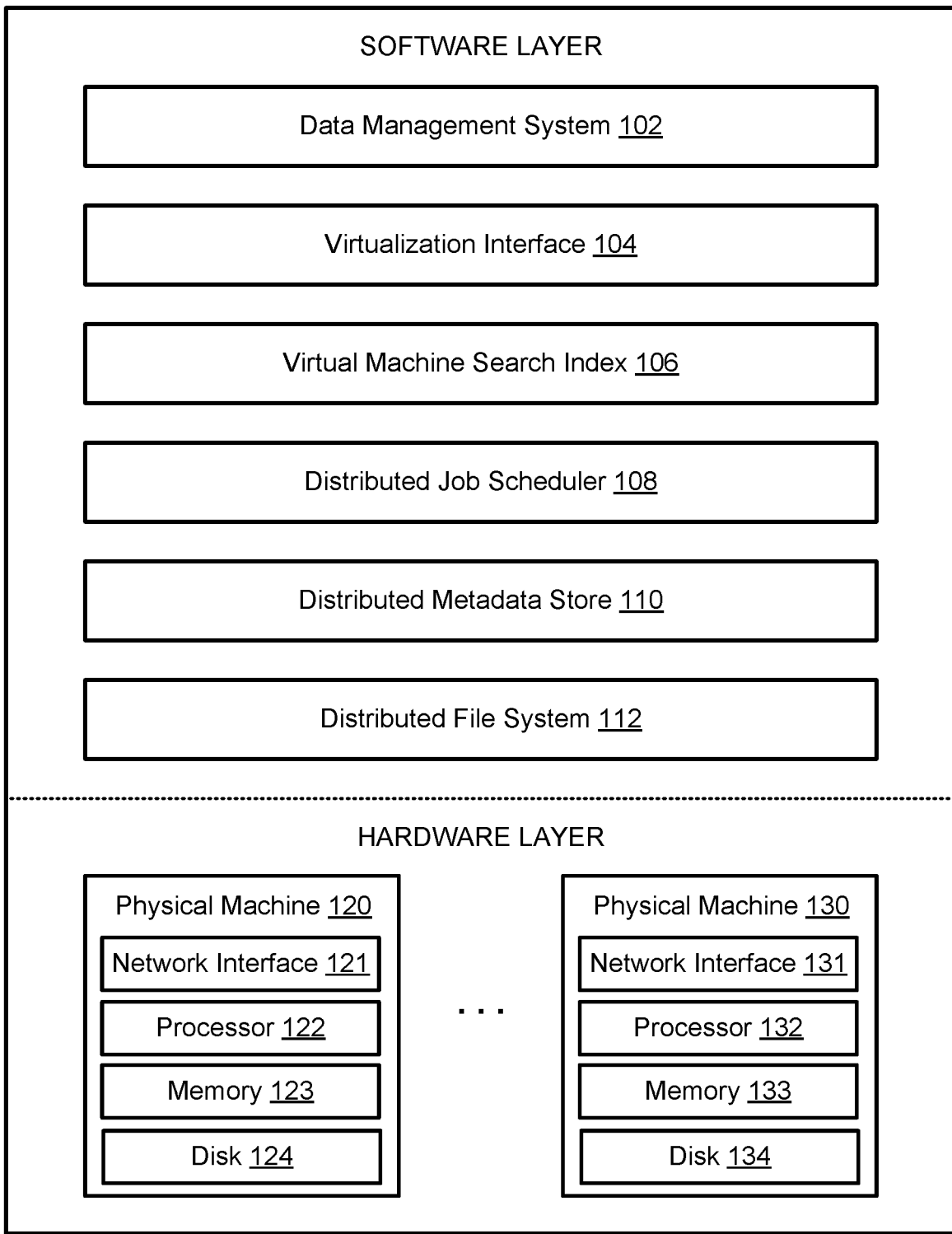
FIG. 1C depicts one embodiment of a storage appliance.

FIG. 1C depicts one embodiment of a storage appliance, such as storage appliance 170 in FIG. 1A. The storage appliance may include a plurality of physical machines that may be grouped together and presented as a single computing system. Each physical machine of the plurality of physical machines may comprise a node in a cluster (e.g., a failover cluster). In one example, the storage appliance may be positioned within a server rack within a data center. As depicted, the storage appliance 170 includes hardware-level components and software-level components. The hardware-level components include one or more physical machines, such as physical machine 120 and physical machine 130. The physical machine 120 includes a network interface 121, processor 122, memory 123, and disk 124 all in communication with each other. Processor 122 allows physical machine 120 to execute computer readable instructions stored in memory 123 to perform processes described herein. Disk 124 may include a hard disk drive and/or a solid-state drive. The physical machine 130 includes a network interface 131, processor 132, memory 133, and disk 134 all in communication with each other. Processor 132 allows physical machine 130 to execute computer readable instructions stored in memory 133 to perform processes described herein. Disk 134 may include a hard disk drive and/or a solid-state drive. In some cases, disk 134 may include a flash-based SSD or a hybrid HDD/SSD drive. In one embodiment, the storage appliance 170 may include a plurality of physical machines arranged in a cluster (e.g., eight machines in a cluster). Each of the plurality of physical machines may include a plurality of multi-core CPUs, 128 GB of RAM, a 500 GB SSD, four 4 TB HDDs, and a network interface controller.

As depicted in FIG. 1C, the software-level components of the storage appliance 170 may include data management system 102, a virtualization interface 104, a distributed job scheduler 108, a distributed metadata store 110, a distributed file system 112, and one or more virtual machine search indexes, such as virtual machine search index 106. In one embodiment, the software-level components of the storage appliance 170 may be run using a dedicated hardware-based appliance. In another embodiment, the software-level components of the storage appliance 170 may be run from the cloud (e.g., the software-level components may be installed on a cloud service provider).

In some cases, the data storage across a plurality of nodes in a cluster (e.g., the data storage available from the one or more physical machines) may be aggregated and made available over a single file system namespace (e.g., /snapshots/). A directory for each virtual machine protected using the storage appliance 170 may be created (e.g., the directory for Virtual Machine A may be /snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/ and a second snapshot of Virtual Machine A may reside in /snapshots/VM_A/s2/).

The distributed file system 112 may present itself as a single file system, in which as new physical machines or nodes are added to the storage appliance 170, the cluster may automatically discover the additional nodes and automatically increase the available capacity of the file system for storing files and other data. Each file stored in the distributed file system 112 may be partitioned into one or more chunks. Each of the one or more chunks may be stored within the distributed file system 112 as a separate file. The files stored within the distributed file system 112 may be replicated or mirrored over a plurality of physical machines, thereby creating a load-balanced and fault tolerant distributed file system. In one example, storage appliance 170 may include ten physical machines arranged as a failover cluster and a first file corresponding with a full-image snapshot of a virtual machine (e.g., /snapshots/VM_A/s1/s1.full) may be replicated and stored on three of the ten machines.

In some cases, the data chunks associated with a file stored in the distributed file system 112 may include replicated data (e.g., due to n-way mirroring) or parity data (e.g., due to erasure coding). When a disk storing one of the data chunks fails, then the distributed file system may regenerate the lost data and store the lost data using a new disk.

In one embodiment, the distributed file system 112 may be used to store a set of versioned files corresponding with a virtual machine. The set of versioned files may include a first file comprising a full image of the virtual machine at a first point in time and a second file comprising an incremental file relative to the full image. The set of versioned files may correspond with a snapshot chain for the virtual machine. The distributed file system 112 may determine a first set of data chunks that includes redundant information for the first file (e.g., via application of erasure code techniques) and store the first set of data chunks across a plurality of nodes within a cluster. The placement of the first set of data chunks may be determined based on the locations of other data related to the first set of data chunks (e.g., the locations of other chunks corresponding with the second file or other files within the snapshot chain for the virtual machine). In some embodiments, the distributed file system 112 may also co-locate data chunks or replicas of virtual machines discovered to be similar to each other in order to allow for cross virtual machine deduplication. In this case, the placement of the first set of data chunks may be determined based on the locations of other data corresponding with a different virtual machine that has been determined to be sufficiently similar to the virtual machine.

The distributed metadata store 110 may comprise a distributed database management system that provides high availability without a single point of failure. The distributed metadata store 110 may act as a quick-access database for various components in the software stack of the storage appliance 170 and may store metadata corresponding with stored snapshots using a SSD or a Flash-based storage device. In one embodiment, the distributed metadata store 110 may comprise a database, such as a distributed document oriented database. The distributed metadata store 110 may be used as a distributed key value storage system. In one example, the distributed metadata store 110 may comprise a distributed NoSQL key value store database. In some cases, the distributed metadata store 110 may include a partitioned row store, in which rows are organized into tables or other collections of related data held within a structured format within the key value store database. A table (or a set of tables) may be used to store metadata information associated with one or more files stored within the distributed file system 112. The metadata information may include the name of a file, a size of the file, file permissions associated with the file, when the file was last modified, and file mapping information associated with an identification of the location of the file stored within a cluster of physical machines. In one embodiment, a new file corresponding with a snapshot of a virtual machine may be stored within the distributed file system 112 and metadata associated with the new file may be stored within the distributed metadata store 110. The distributed metadata store 110 may also be used to store a backup schedule for the virtual machine and a list of snapshots for the virtual machine that are stored using the storage appliance 170.

In some cases, the distributed metadata store 110 may be used to manage one or more versions of a virtual machine. Each version of the virtual machine may correspond with a full image snapshot of the virtual machine stored within the distributed file system 112 or an incremental snapshot of the virtual machine (e.g., a forward incremental or reverse incremental) stored within the distributed file system 112. In one embodiment, the one or more versions of the virtual machine may correspond with a plurality of files. The plurality of files may include a single full image snapshot of the virtual machine and one or more incrementals derived from the single full image snapshot. The single full image snapshot of the virtual machine may be stored using a first storage device of a first type (e.g., a HDD) and the one or more incrementals derived from the single full image snapshot may be stored using a second storage device of a second type (e.g., an SSD). In this case, only a single full image needs to be stored and each version of the virtual machine may be generated from the single full image or the single full image combined with a subset of the one or more incrementals. Furthermore, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incrementals. In some cases, a first version of a virtual machine corresponding with a first snapshot of the virtual machine at a first point in time may be generated by concurrently reading a full image for the virtual machine corresponding with a state of the virtual machine prior to the first point in time from the first storage device while reading one or more incrementals from the second storage device different from the first storage device (e.g., reading the full image from a HDD at the same time as reading 64 incrementals from an SSD).

In some embodiments, versions of a virtual machine may be stored using a full image snapshot stored using a first storage device of a first type (e.g., a first HDD), a first set of reverse incremental files stored using a second storage device of a second type different from the first type (e.g., a first SSD), and a second set of forward incremental files stored using a third storage device of the second type (e.g., a second SSD). As a particular version of the virtual machine may be generated using the full image snapshot stored using the first storage device of the first type and either the first set of reverse incremental files stored using the second storage device or the second set of forward incremental files stored using the third storage device of the second type, the first set of reverse incremental files may not need to be co-located on the same storage device with the second set of forward incremental files.

The distributed job scheduler 108 may be used for scheduling backup jobs that acquire and store virtual machine snapshots for one or more virtual machines over time. The distributed job scheduler 108 may follow a backup schedule to backup an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. Each backup job may be associated with one or more tasks to be performed in a sequence. Each of the one or more tasks associated with a job may be run on a particular node within a cluster. In some cases, the distributed job scheduler 108 may schedule a specific job to be run on a particular node based on data stored on the particular node. For example, the distributed job scheduler 108 may schedule a virtual machine snapshot job to be run on a node in a cluster that is used to store snapshots of the virtual machine in order to reduce network congestion.

The distributed job scheduler 108 may comprise a distributed fault tolerant job scheduler, in which jobs affected by node failures are recovered and rescheduled to be run on available nodes. In one embodiment, the distributed job scheduler 108 may be fully decentralized and implemented without the existence of a master node. The distributed job scheduler 108 may run job scheduling processes on each node in a cluster or on a plurality of nodes in the cluster. Each node may independently determine which tasks to execute. In one example, the distributed job scheduler 108 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 110. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within 3 minutes from being started). In response to detecting jobs that have failed to be updated within the threshold period of time, the distributed job scheduler 108 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one embodiment, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 108 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks were ever performed. The series of tasks may correspond with an ordering of tasks for the series of tasks and the distributed job scheduler 108 may ensure that each task of the series of tasks is executed based on the ordering of tasks. Tasks that do not have dependencies with each other may be executed in parallel.

The virtualization interface 104 may provide an interface for communicating with a virtualized infrastructure manager managing a virtualization infrastructure, such as virtualized infrastructure manager 199 in FIG. 1B, and requesting data associated with virtual machine snapshots from the virtualization infrastructure. The virtualization interface 104 may communicate with the virtualized infrastructure manager using an API for accessing the virtualized infrastructure manager (e.g., to communicate a request for a snapshot of a virtual machine). In one example, a RESTful API may provide access to various features. In this case, storage appliance 170 may request and receive data from a virtualized infrastructure without requiring agent software to be installed or running on virtual machines within the virtualized infrastructure. The virtualization interface 104 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance. However, if the snapshot of the virtual machine is not the first snapshot taken of the virtual machine, then only the data blocks of the virtual machine that have changed since a prior snapshot was taken may be transferred to the storage appliance.

The virtual machine search index 106 may include a list of files that have been stored using a virtual machine and a version history for each of the files in the list. Each version of a file may be mapped to the earliest point in time snapshot of the virtual machine that includes the version of the file or to a snapshot of the virtual machine that includes the version of the file (e.g., the latest point in time snapshot of the virtual machine that includes the version of the file). In one example, the virtual machine search index 106 may be used to identify a version of the virtual machine that includes a particular version of a file (e.g., a particular version of a database, a spreadsheet, or a word processing document). In some cases, each of the virtual machines that are backed up or protected using storage appliance 170 may have a corresponding virtual machine search index.

The data management system 102 may comprise an application running on the storage appliance that manages the capturing, storing, deduplication, compression (e.g., using a lossless data compression algorithm such as LZ4 or LZ77), and encryption (e.g., using a symmetric key algorithm such as Triple DES or AES-256) of data for the storage appliance 170. In one example, the data management system 102 may comprise a highest level layer in an integrated software stack running on the storage appliance. The integrated software stack may include the data management system 102, the virtualization interface 104, the distributed job scheduler 108, the distributed metadata store 110, and the distributed file system 112. In some cases, the integrated software stack may run on other computing devices, such as a server or computing device 154 in FIG. 1A. The data management system 102 may use the virtualization interface 104, the distributed job scheduler 108, the distributed metadata store 110, and the distributed file system 112 to manage and store one or more snapshots of a virtual machine. Each snapshot of the virtual machine may correspond with a point in time version of the virtual machine. The data management system 102 may generate and manage a list of versions for the virtual machine. Each version of the virtual machine may map to or reference one or more chunks and/or one or more files stored within the distributed file system 112. Combined together, the one or more chunks and/or the one or more files stored within the distributed file system 112 may comprise a full image of the version of the virtual machine.

In some embodiments, a plurality of versions of a virtual machine may be stored as a base file associated with a complete image of the virtual machine at a particular point in time and one or more incremental files associated with forward and/or reverse incremental changes derived from the base file. The data management system 102 may patch together the base file and the one or more incremental files in order to generate a particular version of the plurality of versions by adding and/or subtracting data associated with the one or more incremental files from the base file or intermediary files derived from the base file. In some embodiments, each version of the plurality of versions of a virtual machine may correspond with a merged file. A merged file may include pointers or references to one or more files and/or one or more chunks associated with a particular version of a virtual machine. In one example, a merged file may include a first pointer or symbolic link to a base file and a second pointer or symbolic link to an incremental file associated with the particular version of the virtual machine. In some embodiments, the one or more incremental files may correspond with forward incrementals (e.g., positive deltas), reverse incrementals (e.g., negative deltas), or a combination of both forward incrementals and reverse incrementals.

Figure 1D:
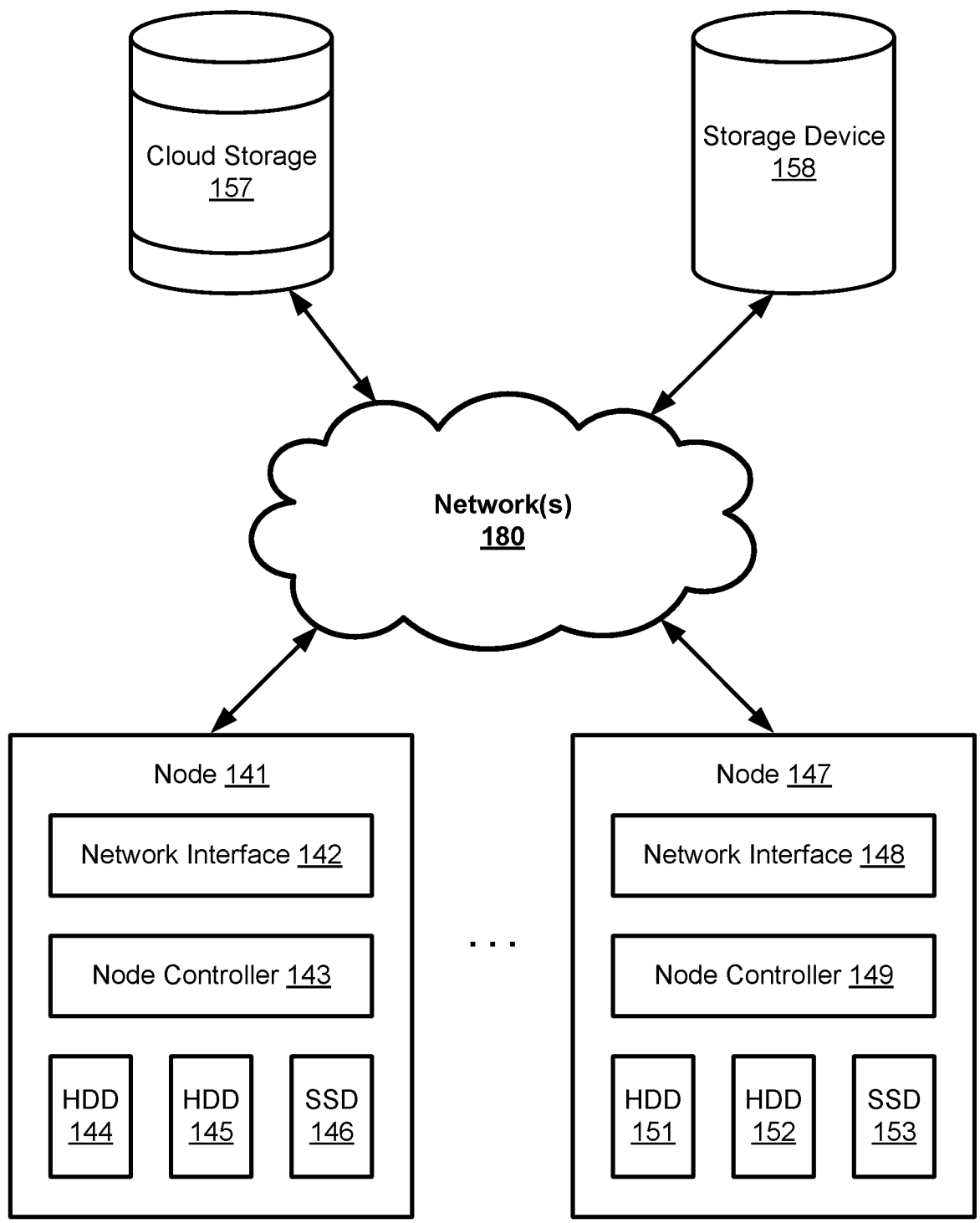
FIG. 1D depicts one embodiment of a portion of an integrated data management and storage system that includes a plurality of nodes in communication with each other and one or more storage devices.

FIG. 1D depicts one embodiment of a portion of an integrated data management and storage system that includes a plurality of nodes in communication with each other and one or more storage devices via one or more networks 180. The plurality of nodes may be networked together and present themselves as a unified storage system. The plurality of nodes includes node 141 and node 147. The one or more storage devices include storage device 157 and storage device 158. Storage device 157 may correspond with a cloud-based storage (e.g., private or public cloud storage). Storage device 158 may comprise a hard disk drive (HDD), a magnetic tape drive, a solid-state drive (SSD), a storage area network (SAN) storage device, or a networked-attached storage (NAS) device. The integrated data management and storage system may comprise a distributed cluster of storage appliances in which each of the storage appliances includes one or more nodes. In one embodiment, node 141 and node 147 may comprise two nodes housed within a first storage appliance, such as storage appliance 170 in FIG. 1C. In another embodiment, node 141 may comprise a first node housed within a first storage appliance and node 147 may comprise a second node housed within a second storage appliance different from the first storage appliance. The first storage appliance and the second storage appliance may be located within a data center, such as data center 150 in FIG. 1A, or located within different data centers. In some cases, node 141 and node 147 may be attached to or supported by a storage rack or a server rack and share a common electrical power connection or a power supply. The storage appliances may include temperature sensors for sensing a temperature of the storage appliance or components therein. The data center or components within the data center may include temperature monitoring circuitry for monitoring temperatures associated with a room, a rack, a server box housing a server, or components of the server (e.g., a semiconductor chip or a processing core used by the server) and detecting when a monitored temperature is above or below a particular threshold (e.g., a temperature associated with a server box is above 85 degrees Celsius).

In one embodiment, node 141 may comprise a first node within a first cluster and node 147 may comprise a second node within a second cluster different from the first cluster. In another embodiment, node 141 may comprise a first node within a first data center and node 147 may comprise a second node within a second data center different from the first data center.

As depicted, node 141 includes a network interface 142, a node controller 143, and a first plurality of storage devices including HDDs 144-145 and SSD 146. The first plurality of storage devices may comprise two or more different types of storage devices. The node controller 143 may comprise one or more processors configured to store, deduplicate, compress, and/or encrypt data stored within the first plurality of storage devices. Node 147 includes a network interface 148, a node controller 149, and a second plurality of storage devices including HDDs 151-152 and SSD 153. The second plurality of storage devices may comprise two or more different types of storage devices. The node controller 149 may comprise one or more processors configured to store, deduplicate, compress, and/or encrypt data stored within the second plurality of storage devices. In some cases, node 141 may correspond with physical machine 120 in FIG. 1C and node 147 may correspond with physical machine 130 in FIG. 1C.

In some embodiments, the plurality of physical machines may be used to implement a cluster-based network file server. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 160 in FIG. 1A, or a hypervisor, such as hypervisor 186 in FIG. 1B, to communicate with the storage appliance 170 may not provide a failover mechanism (e.g., NFS Version 3). In the case that no failover mechanism is provided on the client-side, the hypervisor may not be able to connect to a new node within a cluster in the event that the node connected to the hypervisor fails.

In some embodiments, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 186 in FIG. 1B may be configured with a first floating IP address associated with a first node in the cluster. The hypervisor may connect to the cluster using the first floating IP address. In one example, the hypervisor may communicate with the cluster using the NFS Version 3 protocol. Each node in the cluster may run a Virtual Router Redundancy Protocol (VRRP) daemon. A daemon may comprise a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor for communicating with the cluster.

In order to determine which of the other nodes in the cluster will assume the first floating IP address, a VRRP priority may be established. In one example, given a number (N) of nodes in a cluster from node(0) to node(N−1), or a floating IP address (i), the VRRP priority of node(j) may be (j−i) modulo N. In another example, given a number (N) of nodes in a cluster from node(0) to node(N−1), for a floating IP address (i), the VRRP priority of node(j) may be (i−j) modulo N. In these cases, node(j) will assume floating IP address (i) only if its VRRP priority is higher than that of any other node in the cluster that is alive and announcing itself on the network. Thus, if a node fails, then there may be a clear priority ordering for determining which other node in the cluster will take over the failed node's floating IP address.

In some cases, a cluster may include a plurality of nodes and each node of the plurality of nodes may be assigned a different floating IP address. In this case, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

Figures 2A, 2B, 2C:
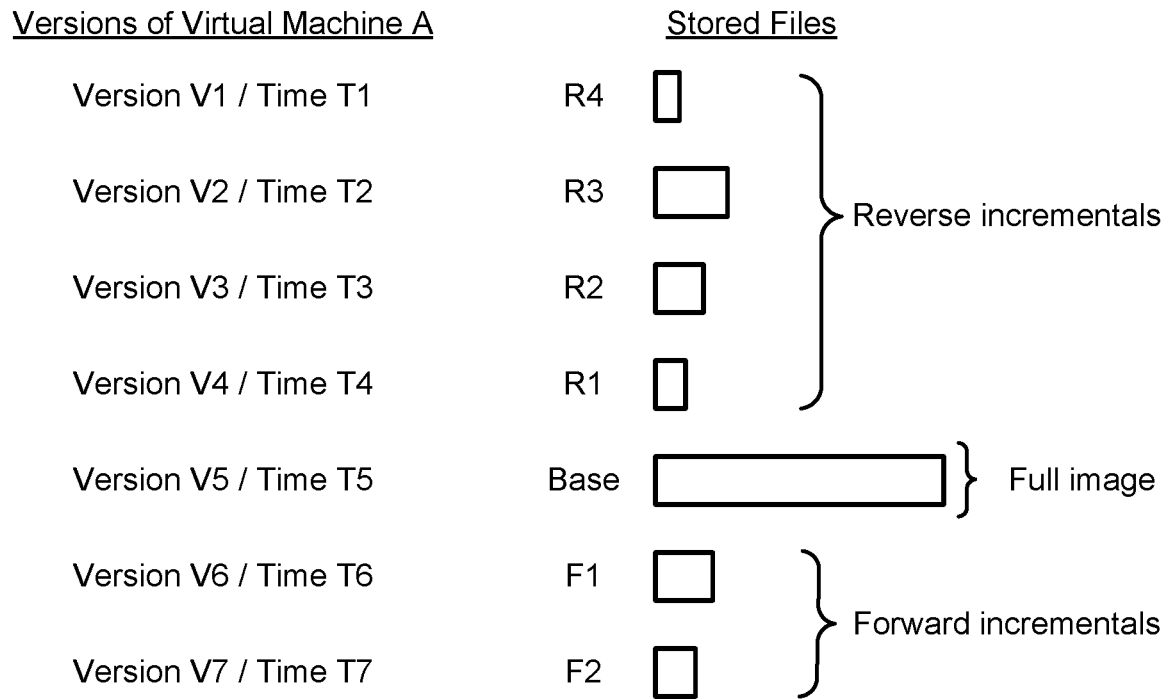
FIGS. 2A-2Q depict various embodiments of sets of files and data structures associated with managing and storing snapshots of virtual machines.
Figures 2D, 2E, 2F:
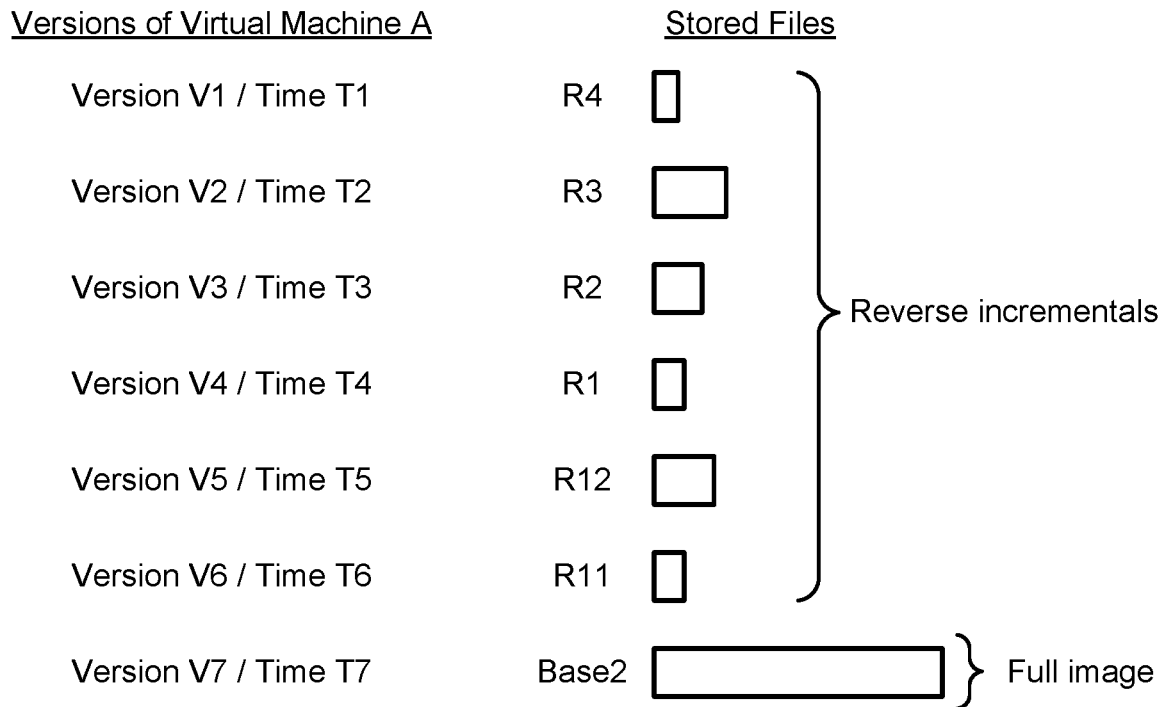
Figure 2G:
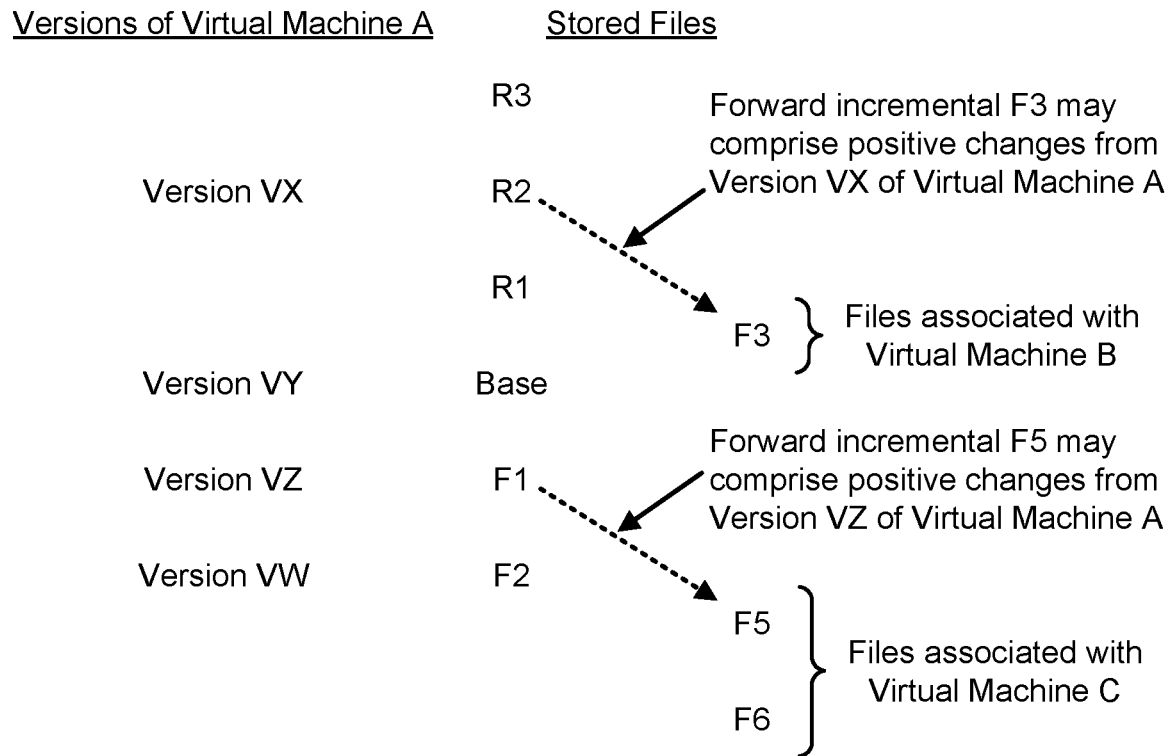
Figures 2J, 2K, 2L:
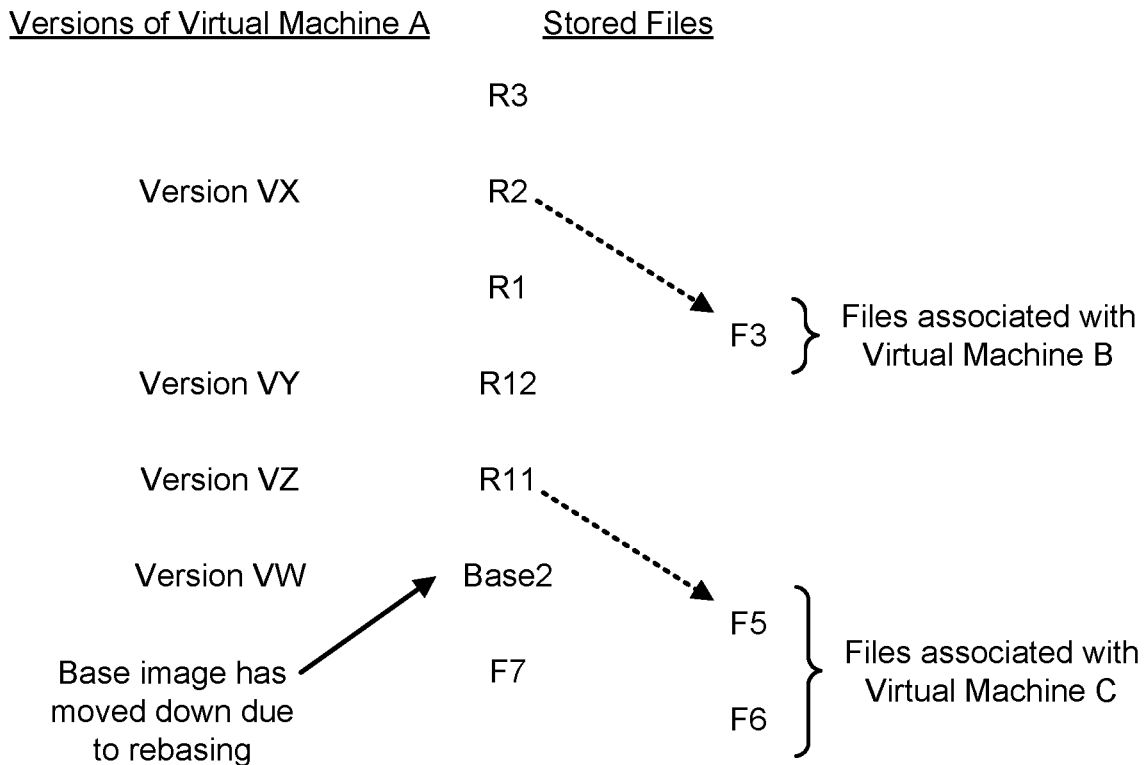
Figures 2M, 2N, 2O:
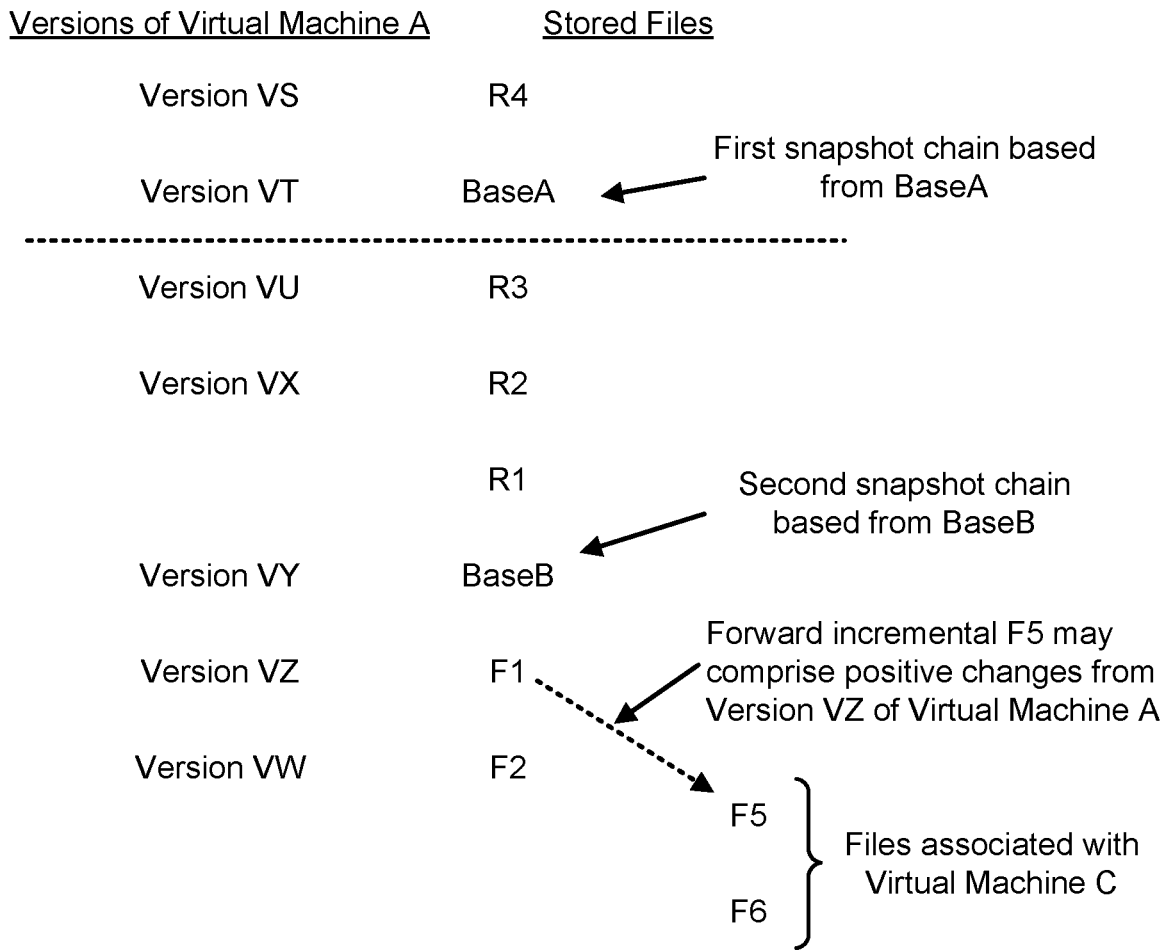
Figures 2P, 2Q:
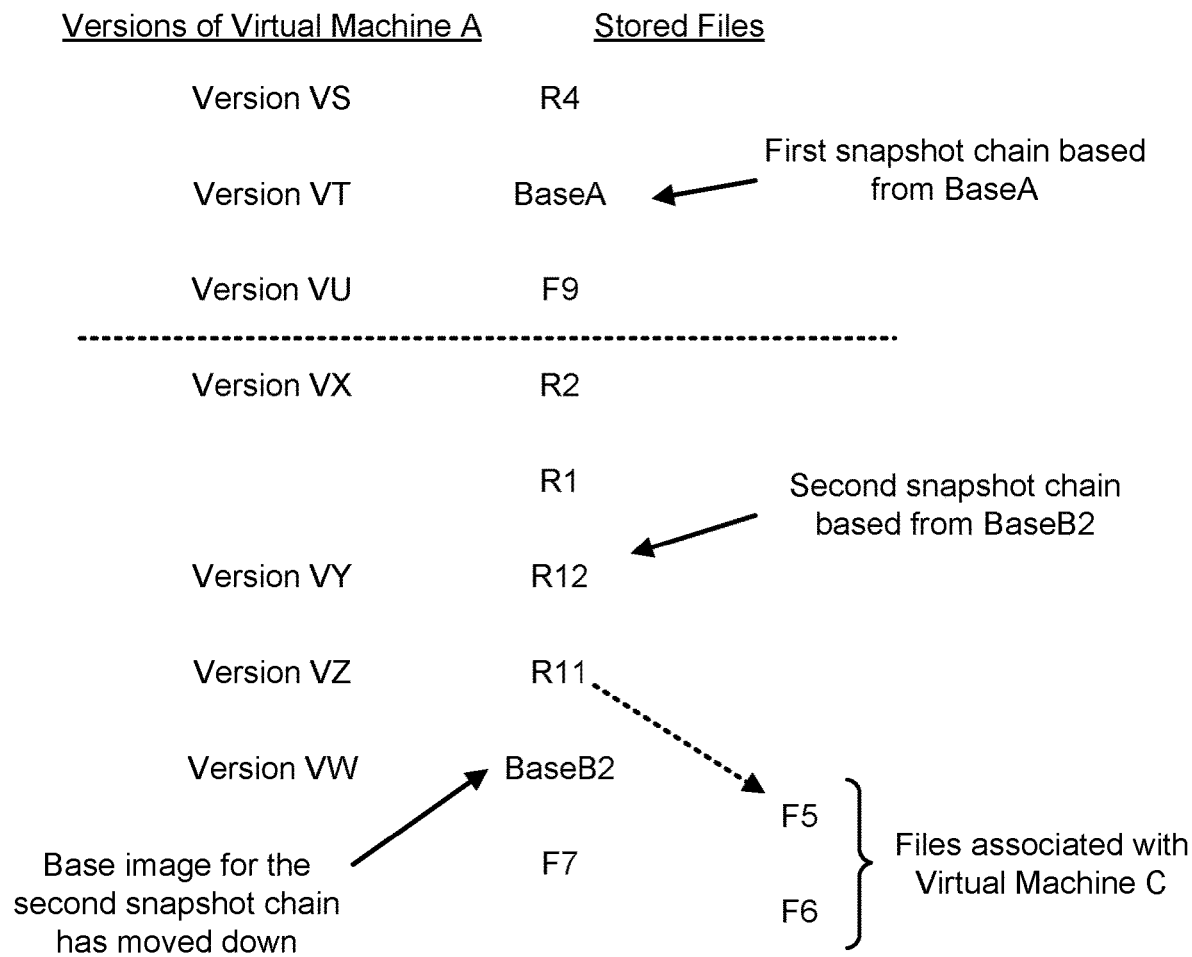

FIGS. 2A-2Q depict various embodiments of sets of files and data structures (e.g., implemented using merged files) associated with managing and storing snapshots of virtual machines.

FIG. 2A depicts one embodiment of a set of virtual machine snapshots stored as a first set of files. The first set of files may be stored using a distributed file system, such as distributed file system 112 in FIG. 1C. As depicted, the first set of files includes a set of reverse incrementals (R1-R4), a full image (Base), and a set of forward incrementals (F1-F2). The set of virtual machine snapshots includes different versions of a virtual machine (versions V1-V7 of Virtual Machine A) captured at different points in time (times T1-T7). In some cases, the file size of the reverse incremental R3 and the file size of the forward incremental F2 may both be less than the file size of the base image corresponding with version V5 of Virtual Machine A. The base image corresponding with version V5 of Virtual Machine A may comprise a full image of Virtual Machine A at point in time T5. The base image may include a virtual disk file for Virtual Machine A at point in time T5. The reverse incremental R3 corresponds with version V2 of Virtual Machine A and the forward incremental F2 corresponds with version V7 of Virtual Machine A.

In some embodiments, each snapshot of the set of virtual machine snapshots may be stored within a storage appliance, such as storage appliance 170 in FIG. 1A. In other embodiments, a first set of the set of virtual machine snapshots may be stored within a first storage appliance and a second set of the set of virtual machine snapshots may be stored within a second storage appliance, such as storage appliance 140 in FIG. 1A. In this case, a data management system may extend across both the first storage appliance and the second storage appliance. In one example, the first set of the set of virtual machine snapshots may be stored within a local cluster repository (e.g., recent snapshots of the file may be located within a first data center) and the second set of the set of virtual machine snapshots may be stored within a remote cluster repository (e.g., older snapshots or archived snapshots of the file may be located within a second data center) or a cloud repository.

FIG. 2B depicts one embodiment of a merged file for generating version V7 Virtual Machine A using the first set of files depicted in FIG. 2A. The merged file includes a first pointer (pBase) that references the base image Base (e.g., via the path /snapshots/VM_A/s5/s5.full), a second pointer (pF1) that references the forward incremental F1 (e.g., via the path /snapshots/VM_A/s6/s6.delta), and a third pointer (pF2) that references the forward incremental F2 (e.g., via the path /snapshots/VM_A/s7/s7.delta). In one embodiment, to generate the full image of version V7 of Virtual Machine A, the base image may be acquired, the data changes associated with forward incremental F1 may be applied to (or patched to) the base image to generate an intermediate image, and then the data changes associated with forward incremental F2 may be applied to the intermediate image to generate the full image of version V7 of Virtual Machine A.

FIG. 2C depicts one embodiment of a merged file for generating version V2 of Virtual Machine A using the first set of files depicted in FIG. 2A. The merged file includes a first pointer (pBase) that references the base image Base (e.g., via the path /snapshots/VM_A/s5/s5.full), a second pointer (pR1) that references the reverse incremental R1 (e.g., via the path /snapshots/VM_A/s4/s4.delta), a third pointer (pR2) that references the reverse incremental R2 (e.g., via the path /snapshots/VM_A/s3/s3.delta), and a fourth pointer (pR3) that references the reverse incremental R3 (e.g., via the path /snapshots/VM_A/s2/s2.delta). In one embodiment, to generate the full image of version V2 of Virtual Machine A, the base image may be acquired, the data changes associated with reverse incremental R1 may be applied to the base image to generate a first intermediate image, the data changes associated with reverse incremental R2 may be applied to the first intermediate image to generate a second intermediate image, and then the data changes associated with reverse incremental R3 may be applied to the second intermediate image to generate the full image of version V2 of Virtual Machine A.

FIG. 2D depicts one embodiment of a set of virtual machine snapshots stored as a second set of files after a rebasing process has been performed using the first set of files in FIG. 2A. The second set of files may be stored using a distributed file system, such as distributed file system 112 in FIG. 1C. The rebasing process may generate new files R12, R11, and Base2 associated with versions V5-V7 of Virtual Machine A in order to move a full image closer to a more recent version of Virtual Machine A and to improve the reconstruction time for the more recent versions of Virtual Machine A. The data associated with the full image Base in FIG. 2A may be equivalent to the new file R12 patched over R11 and the full image Base2. Similarly, the data associated with the full image Base2 may be equivalent to the forward incremental F2 in FIG. 2A patched over F1 and the full image Base in FIG. 2A.

In some cases, the rebasing process may be part of a periodic rebasing process that is applied at a rebasing frequency (e.g., every 24 hours) to each virtual machine of a plurality of protected virtual machines to reduce the number of forward incremental files that need to be patched to a base image in order to restore the most recent version of a virtual machine. Periodically reducing the number of forward incremental files may reduce the time to restore the most recent version of the virtual machine as the number of forward incremental files that need to be applied to a base image to generate the most recent version may be limited. In one example, if a rebasing process is applied to snapshots of a virtual machine every 24 hours and snapshots of the virtual machine are acquired every four hours, then the number of forward incremental files may be limited to at most five forward incremental files.

As depicted, the second set of files includes a set of reverse incrementals (R11-R12 and R1-R4) and a full image (Base2). The set of virtual machine snapshots includes the different versions of the virtual machine (versions V1-V7 of Virtual Machine A) captured at the different points in time (times T1-T7) depicted in FIG. 2A. In some cases, the file size of the reverse incremental R2 may be substantially less than the file size of the base image Base2. The reverse incremental R2 corresponds with version V2 of Virtual Machine A and the base image Base2 corresponds with version V7 of Virtual Machine A. In this case, the most recent version of Virtual Machine A (i.e., the most recent restore point for Virtual Machine A) comprises a full image. To generate earlier versions of Virtual Machine A, reverse incrementals may be applied to (or patched to) the full image Base2. Subsequent versions of Virtual Machine A may be stored as forward incrementals that depend from the full image Base2.

In one embodiment, a rebasing process may be applied to a first set of files associated with a virtual machine in order to generate a second set of files to replace the first set of files. The first set of files may include a first base image from which a first version of the virtual machine may be derived and a first forward incremental file from which a second version of the virtual machine may be derived. The second set of files may include a second reverse incremental file from which the first version of the virtual machine may be derived and a second base image from which the second version of the virtual machine may be derived. During the rebasing process, data integrity checking may be performed to detect and correct data errors in the files stored in a file system, such as distributed file system 112 in FIG. 1C, that are read to generate the second set of files.

FIG. 2E depicts one embodiment of a merged file for generating version V7 of Virtual Machine A using the second set of files depicted in FIG. 2D. The merged file includes a first pointer (pBase2) that references the base image Base2 (e.g., via the path /snapshots/VM_A/s7/s7.full). In this case, the full image of version V7 of Virtual Machine A may be directly acquired without patching forward incrementals or reverse incrementals to the base image Base2 corresponding with version V7 of Virtual Machine A.

FIG. 2F depicts one embodiment of a merged file for generating version V2 of Virtual Machine A using the second set of files depicted in FIG. 2D. The merged file includes a first pointer (pBase2) that references the base image Base2 (e.g., via the path /snapshots/VM_A/s7/s7.full), a second pointer (pR11) that references the reverse incremental R11 (e.g., via the path /snapshots/VM_A/s6/s6.delta), a third pointer (pR12) that references the reverse incremental R12 (e.g., via the path /snapshots/VM_A/s5/s5.delta), a fourth pointer (pR1) that references the reverse incremental R1 (e.g., via the path /snapshots/VM_A/s4/s4.delta), a fifth pointer (pR2) that references the reverse incremental R2 (e.g., via the path /snapshots/VM_A/s3/s3.delta), and a sixth pointer (pR3) that references the reverse incremental R3 (e.g., via the path /snapshots/VM_A/s2/s2.delta). In one embodiment, to generate the full image of version V2 of Virtual Machine A, the base image may be acquired, the data changes associated with reverse incremental R11 may be applied to the base image to generate a first intermediate image, the data changes associated with reverse incremental R12 may be applied to the first intermediate image to generate a second intermediate image, the data changes associated with reverse incremental R1 may be applied to the second intermediate image to generate a third intermediate image, the data changes associated with reverse incremental R2 may be applied to the third intermediate image to generate a fourth intermediate image, and then the data changes associated with reverse incremental R3 may be applied to the fourth intermediate image to generate the full image of version V2 of Virtual Machine A.

FIG. 2G depicts one embodiment of a set of files associated with multiple virtual machine snapshots. The set of files may be stored using a distributed file system, such as distributed file system 112 in FIG. 1C. As depicted, the set of files includes a set of reverse incrementals (R1-R3), a full image (Base), and a set of forward incrementals (F1-F2, F3, and F5-F6). In this case, a first version of Virtual Machine B may be generated using a forward incremental F3 that derives from Version VX of Virtual Machine A and a second version of Virtual Machine C may be generated using forward incrementals F5-F6 that are derived from Version VZ of Virtual Machine A. In one example, Virtual Machine B may have been initially cloned from Version VX of Virtual Machine A and Virtual Machine C may have been initially cloned from Version VZ of Virtual Machine A.

In one embodiment, in response to a failure of a first virtual machine in a production environment (e.g., due to a failure of a physical machine running the first virtual machine), a most recent snapshot of the first virtual machine stored within a storage appliance, such as storage appliance 170 in FIG. 1C, may be mounted and made available to the production environment. In some cases, the storage appliance may allow the most recent snapshot of the first virtual machine to be mounted by a computing device within the production environment, such as server 160 in FIG. 1A. Once the most recent snapshot of the first virtual machine has been mounted, data stored within the most recent snapshot of the first virtual machine may be read and/or modified and new data may be written without the most recent snapshot of the first virtual machine being fully restored and transferred to the production environment. In some cases, the production environment or a server within the production environment may boot up a failed virtual machine directly from a storage appliance, such as storage appliance 170 in FIG. 1C, acting as an NFS datastore to minimize the recovery time to recover the failed virtual machine.

In another embodiment, a secondary workload may request that a particular version of a virtual machine be mounted. In response to the request, a storage appliance, such as storage appliance 170 in FIG. 1C, may clone the particular version of the virtual machine to generate a new virtual machine and then make the new virtual machine available to the secondary workload. Once the new virtual machine has been mounted, data stored within the new virtual machine may be read and/or modified and new data may be written to the new virtual machine without changing data associated with the particular version of the virtual machine stored within the storage appliance.

FIG. 2H depicts one embodiment of a merged file for generating version V1 of Virtual Machine B using the set of files depicted in FIG. 2G. The merged file includes a first pointer (pBase) that references the base image Base, a second pointer (pR1) that references the reverse incremental R1, a third pointer (pR2) that references the reverse incremental R2, and a fourth pointer (pF3) that references the forward incremental F3. In one embodiment, to generate the full image of version V1 of Virtual Machine B, the base image associated with Version VY of Virtual Machine A may be acquired, the data changes associated with reverse incremental R1 may be applied to the base image to generate a first intermediate image, the data changes associated with reverse incremental R2 may be applied to the first intermediate image to generate a second intermediate image, and the data changes associated with forward incremental F3 may be applied to the second intermediate image to generate the full image of version V1 of Virtual Machine B.

FIG. 2I depicts one embodiment of a merged file for generating version V2 of Virtual Machine C using the set of files depicted in FIG. 2G. The merged file includes a first pointer (pBase) that references the base image Base, a second pointer (pF1) that references the forward incremental F1, a third pointer (pF5) that references the forward incremental F5, and a fourth pointer (pF6) that references the forward incremental F6. In one embodiment, to generate the full image of version V2 of Virtual Machine C, a base image (e.g., the base image associated with Version VY of Virtual Machine A) may be acquired, the data changes associated with forward incremental F1 may be applied to the base image to generate a first intermediate image, the data changes associated with forward incremental F5 may be applied to the first intermediate image to generate a second intermediate image, and the data changes associated with forward incremental F6 may be applied to the second intermediate image to generate the full image of version V2 of Virtual Machine C.

In some embodiments, prior to rebasing, the generation of version V2 of Virtual Machine C depicted in FIG. 2G may be performed by concurrently reading a full image (Base) corresponding with Version VY of Virtual Machine A from a first storage device while reading forward incremental F1 corresponding with Version VZ of Virtual Machine A and the forward incrementals F5-F6 corresponding with Virtual Machine C from a second storage device different from the first storage device. In one example, the version V2 of Virtual Machine C may be generated by first concurrently reading the base image for Virtual Machine A from a HDD while reading the forward incremental F1 associated with Virtual Machine A and the forward incrementals F5-F6 associated with Virtual Machine C from an SSD. The version V2 of Virtual Machine C may then be generated by applying the forward incrementals F1 and F5-F6 to the full image corresponding with Version VY of Virtual Machine A.

FIG. 2J depicts one embodiment of a set of files associated with multiple virtual machine snapshots after a rebasing process has been performed using the set of files in FIG. 2G. The set of files may be stored using a distributed file system, such as distributed file system 112 in FIG. 1C. The rebasing process may generate new files R12, R11, and Base2. As depicted, the set of files includes a set of reverse incrementals (R11-R12 and R1-R3), a full image (Base2), and a set of forward incrementals (F3 and F5-F7). In this case, a first version of Virtual Machine B may be generated using a forward incremental F3 that derives from Version VX of Virtual Machine A and a second version of Virtual Machine C may be generated using forward incrementals F5-F6 that are derived from Version VZ of Virtual Machine A. In one example, Virtual Machine B may have been initially cloned from Version VX of Virtual Machine A and Virtual Machine C may have been initially cloned from version VZ of Virtual Machine A. Forward incremental file F7 may include changes to Version VW of Virtual Machine A that occurred subsequent to the generation of the full image file Base2. In some cases, the forward incremental file F7 may comprise a writeable file or have file permissions allowing modification of the file, while all other files associated with earlier versions of Virtual Machine A comprise read only files.

FIG. 2K depicts one embodiment of a merged file for generating version V1 of Virtual Machine B using the set of files depicted in FIG. 2J. The merged file includes a first pointer (pBase2) that references the base image Base2, a second pointer (pR11) that references the reverse incremental R11, a third pointer (pR12) that references the reverse incremental R12, a fourth pointer (pR1) that references the reverse incremental R1, a fifth pointer (pR2) that references the reverse incremental R2, and a sixth pointer (pF3) that references the forward incremental F3. In one embodiment, to generate the full image of version V1 of Virtual Machine B, a base image (e.g., the base image associated with Version VW of Virtual Machine A) may be acquired, the data changes associated with reverse incremental R11 may be applied to the base image to generate a first intermediate image, the data changes associated with reverse incremental R12 may be applied to the first intermediate image to generate a second intermediate image, the data changes associated with reverse incremental R1 may be applied to the second intermediate image to generate a third intermediate image, the data changes associated with reverse incremental R2 may be applied to the third intermediate image to generate a fourth intermediate image, and the data changes associated with forward incremental F3 may be applied to the fourth intermediate image to generate the full image of version V1 of Virtual Machine B.

FIG. 2L depicts one embodiment of a merged file for generating version V2 of Virtual Machine C using the set of files depicted in FIG. 2J. The merged file includes a first pointer (pBase2) that references the base image Base2, a second pointer (pR11) that references the reverse incremental R11, a third pointer (pF5) that references the forward incremental F5, and a fourth pointer (pF6) that references the forward incremental F6. In one embodiment, to generate the full image of version V2 of Virtual Machine C, a base image (e.g., the base image associated with Version VW of Virtual Machine A) may be acquired, the data changes associated with reverse incremental R11 may be applied to the base image to generate a first intermediate image, the data changes associated with forward incremental F5 may be applied to the first intermediate image to generate a second intermediate image, and the data changes associated with forward incremental F6 may be applied to the second intermediate image to generate the full image of version V2 of Virtual Machine C.

In some embodiments, after rebasing, the generation of version V2 of Virtual Machine C depicted in FIG. 2J may be performed by concurrently reading a full image (Base2) corresponding with Version VW of Virtual Machine A from a first storage device while reading reverse incremental R11 corresponding with Version VZ of Virtual Machine A and the forward incrementals F5-F6 corresponding with Virtual Machine C from a second storage device different from the first storage device. In one example, the version V2 of Virtual Machine C may be generated by first concurrently reading a full image for Virtual Machine A from a HDD while reading one or more reverse incrementals associated with Virtual Machine A and one or more forward incrementals associated with Virtual Machine C from an SSD. The version V2 of Virtual Machine C may then be generated by applying the one or more reverse incrementals associated with Virtual Machine A and the one or more forward incrementals associated with Virtual Machine C to the full image corresponding with Version VW of Virtual Machine A.

In some cases, a backed-up version of a first virtual machine may be generated by simultaneously reading a full image of a second virtual machine different from the first virtual machine from a first storage device (e.g., a HDD) while reading one or more incrementals associated with the first virtual machine from a second storage device (e.g., an SSD) different from the first storage device. In some cases, a backed-up version of a first virtual machine may be generated by simultaneously reading a full image of a second virtual machine different from the first virtual machine from a first storage device while reading one or more reverse incrementals associated with the second virtual machine and one or more forward incrementals associated with the first virtual machine from a second storage device different from the first storage device.

FIG. 2M depicts one embodiment of a set of files associated with multiple virtual machine snapshots. The set of files may be stored using a distributed file system, such as distributed file system 112 in FIG. 1C. As depicted, the set of files includes a second full image (BaseB), a set of forward incrementals (F1-F2 and F5-F6) that derive from the second full image (BaseB), and a set of reverse incrementals (R1-R3) that derive from the second full image (BaseB). The set of files also includes a first full image (BaseA) and a reverse incremental (R4) that derives from the first full image (BaseA). In this case, the depicted snapshots for Virtual Machine A include two different full image snapshots (BaseA and BaseB). Each of the full image snapshots may comprise an anchor snapshot for a snapshot chain. The first full image (BaseA) and the reverse incremental (R4) may comprise a first snapshot chain with the first full image acting as the anchor snapshot. A second snapshot chain may comprise the second full image (BaseB), the set of forward incrementals (F1-F2), and the set of reverse incrementals (R1-R3). The first snapshot chain and the second snapshot chain may be independent of each other and independently managed. For example, the base image associated with the second snapshot chain for Virtual Machine A may be repositioned (e.g., via rebasing) without impacting the first snapshot chain for Virtual Machine A.

A third snapshot chain for Virtual Machine C may comprise the second full image (BaseB) and forward incrementals (F1 and F5-F6). The first snapshot chain for Virtual Machine A and the third snapshot chain for Virtual Machine C may be independent of each other and independently managed. However, as Virtual Machine C is a dependent virtual machine that depends from the second snapshot chain for Virtual Machine A, changes to the second snapshot chain may impact the third snapshot chain. For example, repositioning of the base image for the second snapshot chain due to rebasing may require the merged files for the third snapshot chain to be updated.

In some embodiments, each of the snapshot chains for Virtual Machine A may have a maximum incremental chain length (e.g., no more than 100 total incremental files), a maximum reverse incremental chain length (e.g., no more than 50 reverse incremental files), and a maximum forward incremental chain length (e.g., no more than 70 forward incremental files. In the event that a new snapshot will cause one of the snapshot chains to violate the maximum incremental chain length, the maximum reverse incremental chain length, or the maximum forward incremental chain length, then a new snapshot chain may be created for Virtual Machine A and a new full-image base file may be stored for the new snapshot chain.

FIG. 2N depicts one embodiment of a merged file for generating version VS of Virtual Machine A using the set of files depicted in FIG. 2M. The merged file includes a first pointer (pBaseA) that references the first base image BaseA and a second pointer (pR4) that references the reverse incremental R4. In one embodiment, to generate the full image of version V5 of Virtual Machine A, the first base image associated with Version VT of Virtual Machine A may be acquired and the data changes associated with reverse incremental R4 may be applied to the first base image to generate the full image of version VS of Virtual Machine A.

FIG. 2O depicts one embodiment of a merged file for generating version VU of Virtual Machine A using the set of files depicted in FIG. 2M. The merged file includes a first pointer (pBaseB) that references the second base image BaseB, a second pointer (pR1) that references the reverse incremental R1, a third pointer (pR2) that references the reverse incremental R2, and a fourth pointer (pR3) that references the reverse incremental R3. In one embodiment, to generate the full image of version VU of Virtual Machine A, the second base image associated with Version VY of Virtual Machine A may be acquired, the data changes associated with reverse incremental R1 may be applied to the second base image to generate a first intermediate image, the data changes associated with reverse incremental R2 may be applied to the first intermediate image to generate a second intermediate image, and the data changes associated with reverse incremental R3 may be applied to the second intermediate image to generate the full image of version VU of Virtual Machine A.

FIG. 2P depicts one embodiment of a set of files associated with multiple virtual machine snapshots after a rebasing process has been performed to a snapshot chain using the set of files in FIG. 2M. The set of files may be stored using a distributed file system, such as distributed file system 112 in FIG. 1C. The rebasing process may generate new files R12, R11, and BaseB2. As depicted, the set of files includes a set of reverse incrementals (R11-R12 and R1-R2), a full image (BaseB2), and a set of forward incrementals (F5-F7). In this case, a second version of Virtual Machine C may be generated using forward incrementals F5-F6 that are derived from Version VZ of Virtual Machine A. Forward incremental file F7 may include changes to Version VW of Virtual Machine A that occurred subsequent to the generation of the full image file BaseB2. In some cases, the forward incremental file F7 may comprise a writeable file or have file permissions allowing modification of the file, while all other files associated with earlier versions of Virtual Machine A comprise read only files.

FIG. 2Q depicts one embodiment of a merged file for generating version VU of Virtual Machine A using the set of files depicted in FIG. 2P. The merged file includes a first pointer (pBaseA) that references the first base image BaseA and a second pointer (pF9) that references the forward incremental F9. In one embodiment, to generate the full image of version VU of Virtual Machine A, the first base image associated with Version VT of Virtual Machine A may be acquired and the data changes associated with forward incremental F9 may be applied to the first base image to generate the full image of version VU of Virtual Machine A.

In some embodiments, upon detection that a second snapshot chain has reached a maximum incremental chain length (e.g., no more than 500 total incremental files), a maximum reverse incremental chain length (e.g., no more than 400 reverse incremental files), or a maximum forward incremental chain length (e.g., no more than 150 forward incremental files), then an existing snapshot chain (e.g., the first snapshot chain depicted in FIG. 2P) may have its chain length extended or snapshots previously assigned to the second snapshot chain may be moved to the existing snapshot chain. For example, the first snapshot chain depicted in FIG. 2M comprises two total snapshots, while the first snapshot chain depicted in FIG. 2P comprises three total snapshots as the snapshot corresponding with version VU of Virtual Machine A has moved from the second snapshot chain to the first snapshot chain.

In some embodiments, the number of snapshots in a snapshot chain may be reduced over time as older versions of a virtual machine are consolidated, archived, deleted, or moved to a different storage domain (e.g., to cloud storage) depending on the data backup and archiving schedule for the virtual machine.

In some embodiments, the maximum incremental chain length, the maximum reverse incremental chain length, or the maximum forward incremental chain length for a snapshot chain may be adjusted over time as nodes or disks are added to or removed from a cluster or upon an update to a data backup and archiving schedule for a virtual machine due to the assignment of a new backup class or a new backup, replication, and archival policy.

In some embodiments, the maximum incremental chain length for a snapshot chain may be increased over time as the number of allowed snapshots in a snapshot chain may be increased as the backed-up versions of a virtual machine get older. For example, the maximum incremental chain length for a snapshot chain storing versions of a virtual machine that are less than one year old may comprise a maximum incremental chain length of 200 incrementals, while the maximum incremental chain length for a snapshot chain storing versions of a virtual machine that are more than one year old may comprise a maximum incremental chain length of 500 incrementals.

Figure 3A:
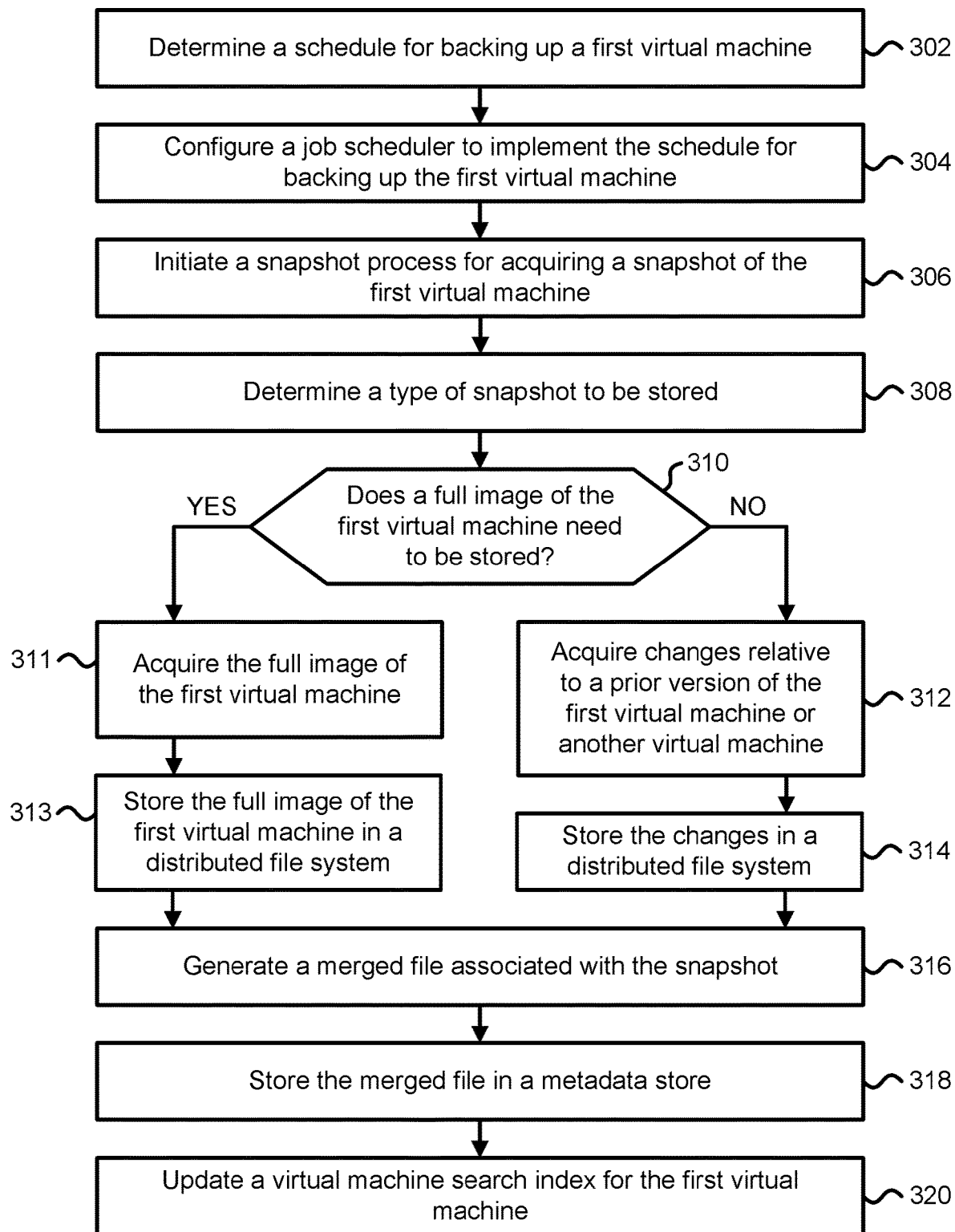
FIG. 3A is a flowchart describing one embodiment of a process for managing and storing virtual machine snapshots using a data storage system.

FIG. 3A is a flowchart describing one embodiment of a process for managing and storing virtual machine snapshots using a data storage system. In one embodiment, the process of FIG. 3A may be performed by a storage appliance, such as storage appliance 170 in FIG. 1A.

In step 302, a schedule for backing up a first virtual machine is determined. In one example, the schedule for backing up the first virtual machine may comprise periodically backing up the first virtual machine every four hours. The schedule for backing up the first virtual machine may be derived from a new backup, replication, and archival policy or backup class assigned to the first virtual machine. In step 304, a job scheduler is configured to implement the schedule for backing up the first virtual machine. In one example, a distributed job scheduler, such as distributed job scheduler 108 in FIG. 1C, may be configured to schedule and run processes for capturing and storing images of the first virtual machine over time according the schedule. In step 306, a snapshot process for acquiring a snapshot of the first virtual machine is initiated. The snapshot process may send an instruction to a virtualized infrastructure manager, such as virtualization manager 169 in FIG. 1A, that requests data associated with the snapshot of the first virtual machine. In step 308, a type of snapshot to be stored is determined. The type of snapshot may comprise a full image snapshot or an incremental snapshot. In some cases, a full image snapshot may be captured and stored in order to serve as an anchor snapshot for a new snapshot chain. Versions of the first virtual machine may be stored using one or more independent snapshot chains, wherein each snapshot chain comprises a full image snapshot and one or more incremental snapshots. One embodiment of a process for determining the type of snapshot to be stored (e.g., storing either a full image snapshot or an incremental snapshot) is described later in reference to FIG. 3B.

In step 310, it is determined whether a full image of the first virtual machine needs to be stored in order to store the snapshot of the first virtual machine. The determination of whether a full image is required may depend on whether a previous full image associated with a prior version of the first virtual machine has been acquired. The determination of whether a full image is required may depend on the determination of the type of snapshot to be stored in step 308. If a full image needs to be stored, then step 311 is performed. Otherwise, if a full image does not need to be stored, then step 312 is performed. In step 311, the full image of the first virtual machine is acquired. The full image of the first virtual machine may correspond with a file or one or more data chunks. In step 312, changes relative to a prior version of the first virtual machine or relative to another virtual machine (e.g., in the case that the first virtual machine comprises a dependent virtual machine whose snapshots derive from a full image snapshot of a second virtual machine different from the first virtual machine) are acquired. The changes relative to the prior version of the first virtual machine or relative to a version of a different virtual machine may correspond with a file or one or more data chunks. In step 313, the full image of the first virtual machine is stored using a distributed file system, such as distributed file system 112 in FIG. 1C. In step 314, the changes relative to the prior version of the first virtual machine or relative to another virtual machine are stored using a distributed file system, such as distributed file system 112 in FIG. 1C. One embodiment of a process for storing files or data chunks associated with files is described later in reference to FIG. 3C. In one embodiment, the full image of the first virtual machine may be stored using a first storage device of a first type (e.g., a HDD) and the changes relative to the prior version of the first virtual machine may be stored using a second storage device of a second type (e.g., an SSD).

In some embodiments, snapshots of the first virtual machine may be ingested at a snapshot capture frequency (e.g., every 30 minutes) by a data storage system. When a snapshot of the first virtual machine is ingested, the snapshot may be compared with other snapshots stored within the data storage system in order to identify a candidate snapshot from which the snapshot may depend. In one example, a scalable approximate matching algorithm may be used to identify the candidate snapshot whose data most closely matches the data associated with the snapshot or to identify the candidate snapshot whose data has the fewest number of data differences with the snapshot. In another example, an approximate matching algorithm may be used to identify the candidate snapshot whose data within a first portion of the candidate snapshot most closely matches data associated with a first portion of the snapshot. In some cases, a majority of the data associated with the snapshot and the candidate snapshot may be identical (e.g., both the snapshot and the candidate snapshot may be associated with virtual machines that use the same operation system and have the same applications installed). Once the candidate snapshot has been identified, then data differences (or the delta) between the snapshot and the candidate snapshot may be determined and the snapshot may be stored based on the data differences. In one example, the snapshot may be stored using a forward incremental file that includes the data differences between the snapshot and the candidate snapshot. The forward incremental file may be compressed prior to being stored within a file system, such as distributed file system 112 in FIG. 1C.

In step 316, a merged file associated with the snapshot is generated. The merged file may reference one or more files or one or more data chunks that have been acquired in either step 311 or step 312. In one example, the merged file may comprise a file or a portion of a file that includes pointers to the one or more files or the one or more data chunks. In step 318, the merged file is stored in a metadata store, such as distributed metadata store 110 in FIG. 1C. In step 320, a virtual machine search index for the first virtual machine is updated. The virtual machine search index for the first virtual machine may include a list of files that have been stored in the first virtual machine and a version history for each of the files in the list. In one example, the virtual machine search index for the first virtual machine may be updated to include new files that have been added to the first virtual machine since a prior snapshot of the first virtual machine was taken and/or to include updated versions of files that were previously stored in the first virtual machine.

Figure 3B:
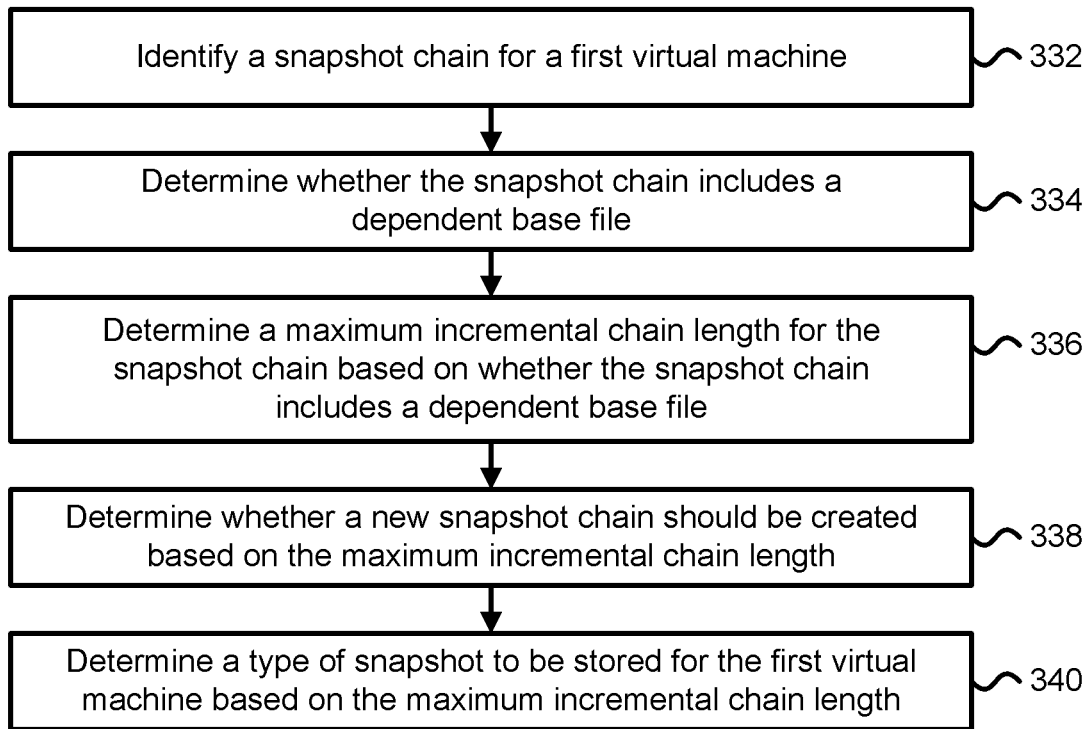
FIG. 3B is a flowchart describing one embodiment of a process for determining the type of snapshot to be stored using a data storage system.

FIG. 3B is a flowchart describing one embodiment of a process for determining the type of snapshot to be stored using a data storage system. The process described in FIG. 3B is one example of a process for implementing step 308 in FIG. 3A. In one embodiment, the process of FIG. 3B may be performed by a storage appliance, such as storage appliance 170 in FIG. 1A.

In step 332, a snapshot chain for a first virtual machine is identified. The snapshot chain may comprise a full image snapshot for the first virtual machine and one or more incremental snapshots that derive from the full image snapshot. Backed-up versions of the first virtual machine may correspond with one or more snapshot chains. Each of the one or more snapshot chains may include a full image snapshot or a base image from which incremental snapshots may derive. One example of backed-up versions of a virtual machine being stored using one or more snapshot chains is depicted in FIG. 2P in which the versions of Virtual Machine A are stored using a first snapshot chain anchored by full image BaseA and a second snapshot chain anchored by full image BaseB2.

In step 334, it is determined whether the snapshot chain includes a dependent base file. In this case, the first virtual machine may comprise a dependent virtual machine that has snapshots that derive from a full image snapshot of a different virtual machine. In one embodiment, the first virtual machine and the different virtual machine from which the first virtual machine depends may each have different virtual machine configuration files for storing configuration settings for the virtual machines. In one example, the first virtual machine may have a first number of virtual processors (e.g., two processors) and the different virtual machine may have a second number of virtual processors different from the first number of virtual processors (e.g., four processors). In another example, the first virtual machine may have a first virtual memory size (e.g., 1 GB) and the different virtual machine may have a second virtual memory size different from the first virtual memory size (e.g., 2 GB). In another example, the first virtual machine may run a first guest operating system and the different virtual machine may run a second guest operating system different from the first guest operating system.

In step 336, a maximum incremental chain length for the snapshot chain is determined based on whether the snapshot chain includes a dependent base file. In one example, if the first virtual machine comprises a dependent virtual machine, then the maximum incremental chain length may be set to a maximum length of 200 snapshots; however if the first virtual machine is independent and is not a dependent virtual machine, then the maximum incremental chain length may be set to a maximum length of 500 snapshots.

In one embodiment, the maximum incremental chain length for the snapshot chain may be determined based on an age of the backed-up versions within the snapshot chain. In one example, the maximum incremental chain length for a snapshot chain storing versions of the first virtual machine that are less than one year old may comprise a maximum incremental chain length of 100 incrementals, while the maximum incremental chain length for a snapshot chain storing versions of the first virtual machine that are more than one year old may comprise a maximum incremental chain length of 200 incrementals.

In step 338, it is determined whether a new snapshot chain should be created based on the maximum incremental chain length. In step 340, a type of snapshot to be stored for the first virtual machine is determined based on the maximum incremental chain length. The type of snapshot may comprise either a full image snapshot or an incremental snapshot. In one embodiment, if the snapshot chain for the first virtual machine exceeds the maximum incremental chain length for the snapshot chain, then the type of snapshot to be stored for the first virtual machine may comprise a full image snapshot. In this case, an additional snapshot chain may be created for the first virtual machine.

Figure 3C:
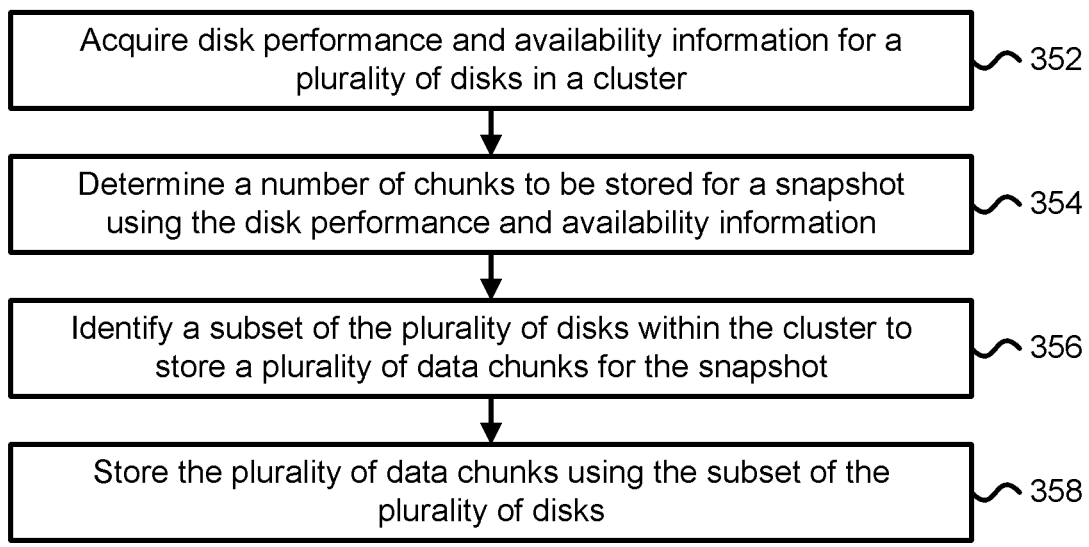
FIG. 3C is a flowchart describing one embodiment of a process for storing files or data chunks associated with files using a data storage system.

FIG. 3C is a flowchart describing one embodiment of a process for storing files or data chunks associated with files using a data storage system. The process described in FIG. 3C is one example of a process for implementing step 313 in FIG. 3A or for implementing step 314 in FIG. 3A. In one embodiment, the process of FIG. 3C may be performed by a storage appliance, such as storage appliance 170 in FIG. 1A.

In step 352, disk performance and availability information for a plurality of disks in a cluster is acquired. The disk information may include information regarding disk fullness, disk performance (e.g., a historical rate of operations), disk age, and disk history or frequency of failures. In step 354, a number of chunks to be stored for a snapshot is determined using the disk performance and availability information. In one example, the number of chunks to be stored for the snapshot or the chunk size may be adjusted over time based on the disk performance and availability information, the number of disks within the cluster, and/or the type of data protection codes required to obtain the desired level of data protection for the data chunks to be stored. In some cases, the number of data chunks to be stored may be determined based on the type of erasure coding applied. Both the chunk size and/or the number of data chunks to be stored for a given file size may vary over time based on disk availability, disk fullness, and disk performance.

In step 356, a subset of the plurality of disks within the cluster to store a plurality of data chunks for the snapshot is identified. In one example, the subset of disks may comprise three disks out of 100 total disks within the cluster. The plurality of chunks may be generated or determined via data replication or application of erasure coding or parity based data protection techniques to the data to be stored for the snapshot. Erasure coding techniques may generate parity information and encode data fragments for the snapshot such that in the event of a disk failure or a node failure, the original data for the snapshot can be reconstructed. The number of data and parity blocks generated may be configured based on the desired number of disk or node failures to withstand. In step 358, the plurality of data chunks is stored using the subset of the plurality of disks. In one example, a snapshot may correspond with a file that is partitioned into ten segments. Each of the ten segments may be replicated three times and stored using three different disks within a cluster.

In some cases, the topology of the cluster and status information for nodes and disks within the cluster (e.g., information regarding disk fullness, disk performance, and disk age) may be used to identify the subset of disks within the cluster in which to store the plurality of data chunks. The identification of the subset may take into consideration the failure domain distance between the disks of the subset (or another failure tolerance metric), the disk fullness of each disk in the subset, the age of each disk in the subset, and the relationship between the plurality of data chunks to be stored and other data chunks residing on the subset (e.g., whether other data chunks corresponding with the snapshot reside on the subset). A failure domain may comprise a grouping of devices or components within the cluster (e.g., disks) that have correlated failures or that are likely to fail together due to a failure event (e.g., due to a power failure or a network connectivity failure).

Figure 3D:
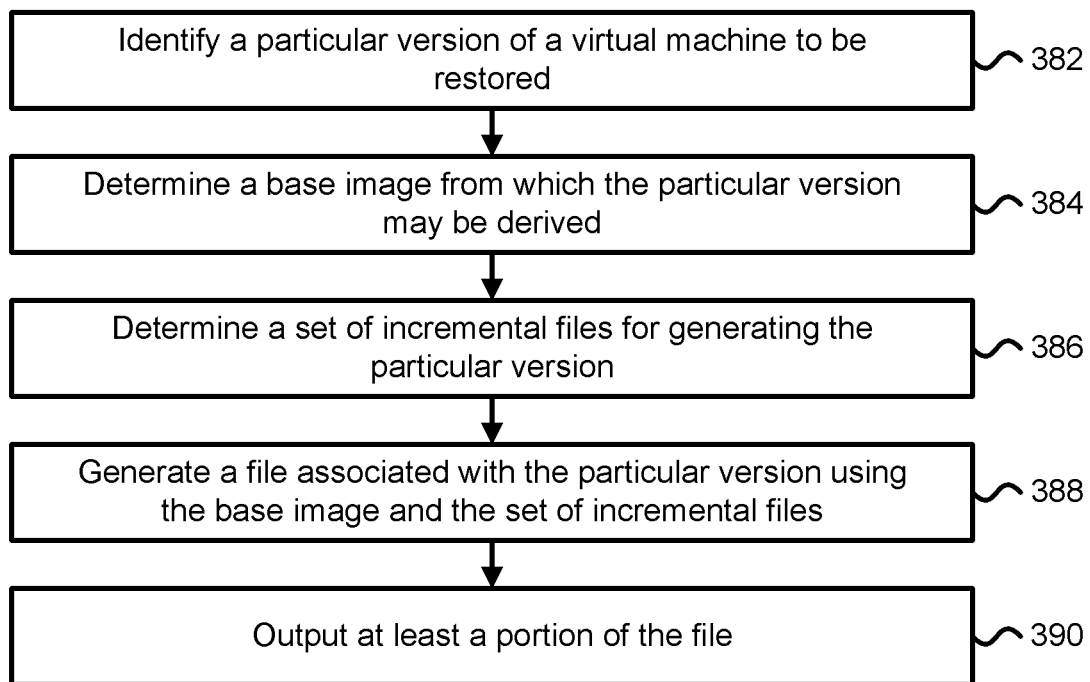
FIG. 3D is a flowchart describing one embodiment of a process for restoring a version of a virtual machine using a data storage system.

FIG. 3D is a flowchart describing one embodiment of a process for restoring a version of a virtual machine using a data storage system. In one embodiment, the process of FIG. 3D may be performed by a storage appliance, such as storage appliance 170 in FIG. 1A.

In step 382, a particular version of a virtual machine to be restored is identified. In step 384, a base image from which the particular version may be derived is determined. In step 386, a set of incremental files for generating the particular version is determined. In one embodiment, the base image and the set of incremental files may be determined from a merged file associated with the particular version of the virtual machine. In some cases, the set of incremental files may include one or more forward incremental files and one or more reverse incremental files. In step 388, a file associated with the particular version is generated using the base image and the set of incremental files. The file may be generated by patching the set of incremental files onto the base image.

In one example, referring to FIG. 2G, if the particular version corresponds with Version V2 of Virtual Machine C, then the base image may correspond with the file Base in FIG. 2G and the set of incremental files may correspond with files F1, F5, and F6 of FIG. 2G. In another example, referring to FIG. 2G, if the particular version corresponds with Version V1 of Virtual Machine B, then the base image may correspond with the file Base in FIG. 2G and the set of incremental files may correspond with files R1, R2, and F3 of FIG. 2G. In step 390, at least a portion of the file is outputted. The at least a portion of the file may be transferred to a computing device, such as computing device 154 in FIG. 1A, or to a virtualization manager, such as virtualization manager 169 in FIG. 1A.

In some embodiments, the base image and a subset of the set of incremental files may correspond with a second virtual machine different from the virtual machine (e.g., the second virtual machine may have been backed up prior to snapshots of the virtual machine being acquired and used to generate a dependent base file for the virtual machine). In this case, the base image may comprise the base image for the second virtual machine and the set of incremental files may include a dependent base file that comprises data differences between the base image for the second virtual machine and a previously acquired base image for the virtual machine. Data deduplication techniques may be applied to identify a candidate base image from which a dependent base file may depend and to generate the dependent base file.

FIG. 3E depicts one embodiment of a virtual machine search index, such as virtual machine search index 106 in FIG. 1C. A virtual machine search index for a virtual machine may include a list, table, or other data structure that stores mappings or pointers from different versions of files stored on the virtual machine to different versions of the virtual machine. As depicted, the virtual machine search index includes a list of file versions for File X that are stored on Virtual Machine A. The list of file versions for File X includes Versions X1-X4. Each of the file versions includes a pointer to a particular version of Virtual Machine A that corresponds with the earliest point in time snapshot of Virtual Machine A that includes the file version. For example, version A23 of Virtual Machine A comprises the earliest point in time snapshot of Virtual Machine A that includes version X1 of File X and version A45 of Virtual Machine A comprises the earliest point in time snapshot of Virtual Machine A that includes version X2 of File X. The virtual machine search index also includes a list of file versions for File Y that are stored on Virtual Machine A. The list of file versions for File Y includes a mapping of version Y1 of File Y (saved at time T2) to version A45 of Virtual Machine A and a mapping of version Y2 of File Y (saved at time T8 subsequent to time T2) to version A95 of Virtual Machine A. Version A45 of Virtual Machine A may comprise the $45^{th}$ version of Virtual Machine A.

FIG. 3F depicts one embodiment of a merged file for the version A45 of Virtual Machine A referred to in FIG. 3E. The merged file includes a first pointer (pBase) that references a base image (e.g., via the path /snapshots/VM_A/s100/s100.full) and other pointers to reverse incremental files (e.g., a pointer to reverse incremental file R55 via the path /snapshots/VM_A/s45/s45.delta). In this case, version A45 of Virtual Machine A may be generated by patching 55 reverse incremental files onto the base image. However, rather than patching the reverse incremental files onto the entire base image, only a portion of the base image associated with a file to be restored (e.g., version X2 of File X) may be acquired from a file system and patched.

FIG. 3G depicts one embodiment of a first portion 362 of the base image referenced by the first pointer (pBase) in FIG. 3F and a second portion 364 of the base image referenced by the first pointer (pBase) in FIG. 3F. In some cases, rather than restoring an entire base image in order to restore a particular version of a file, the first portion 362 of the base image may be restored in order to identify a location of the file within the base image or to identify one or more regions within the base image that store the file. In one example, the first portion 362 of the base image may correspond with one or more file system metadata files. The one or more file system metadata files may store information regarding the type of file system used and information regarding every file and directory on a virtual volume or disk. In some cases, the one or more file system metadata files may be located near the beginning or the end of the base image or near the beginning or the end of a virtual disk partition within the base image. The one or more file system metadata files may include NTFS metadata files, such as an NTFS Master File Table. The NTFS Master File Table may include information for retrieving files from an NTFS partition. The one or more file system metadata files may include a File Allocation Table. The one or more file system metadata files may include information for locating and retrieving files from a virtual disk within the base image (even if due to fragmentation, a file is located in multiple regions within the virtual disk).

Once the first portion 362 of the base image has been acquired and one or more regions within the base image are identified that store the file to be restored, the one or more regions of the base image including the second portion 364 of the base image may be read and patched with data from one or more reverse incremental files in order to generate a portion of a particular version of a virtual machine from which the particular version of the file may be extracted. Thus, a particular version of a file may be quickly extracted by using the virtual machine search index of FIG. 3E to identify a version of a virtual machine that includes the particular version of the file and then restoring only a portion of the version of the virtual machine that includes the particular version of the file. One benefit of extracting the particular version of the file from a small portion of the version of the virtual machine (e.g., 2 MB) rather than from an entire image of the version of the virtual machine (e.g., 20 GB) is that the particular version of the file may be restored in a shorter amount of time.

Figure 3H:
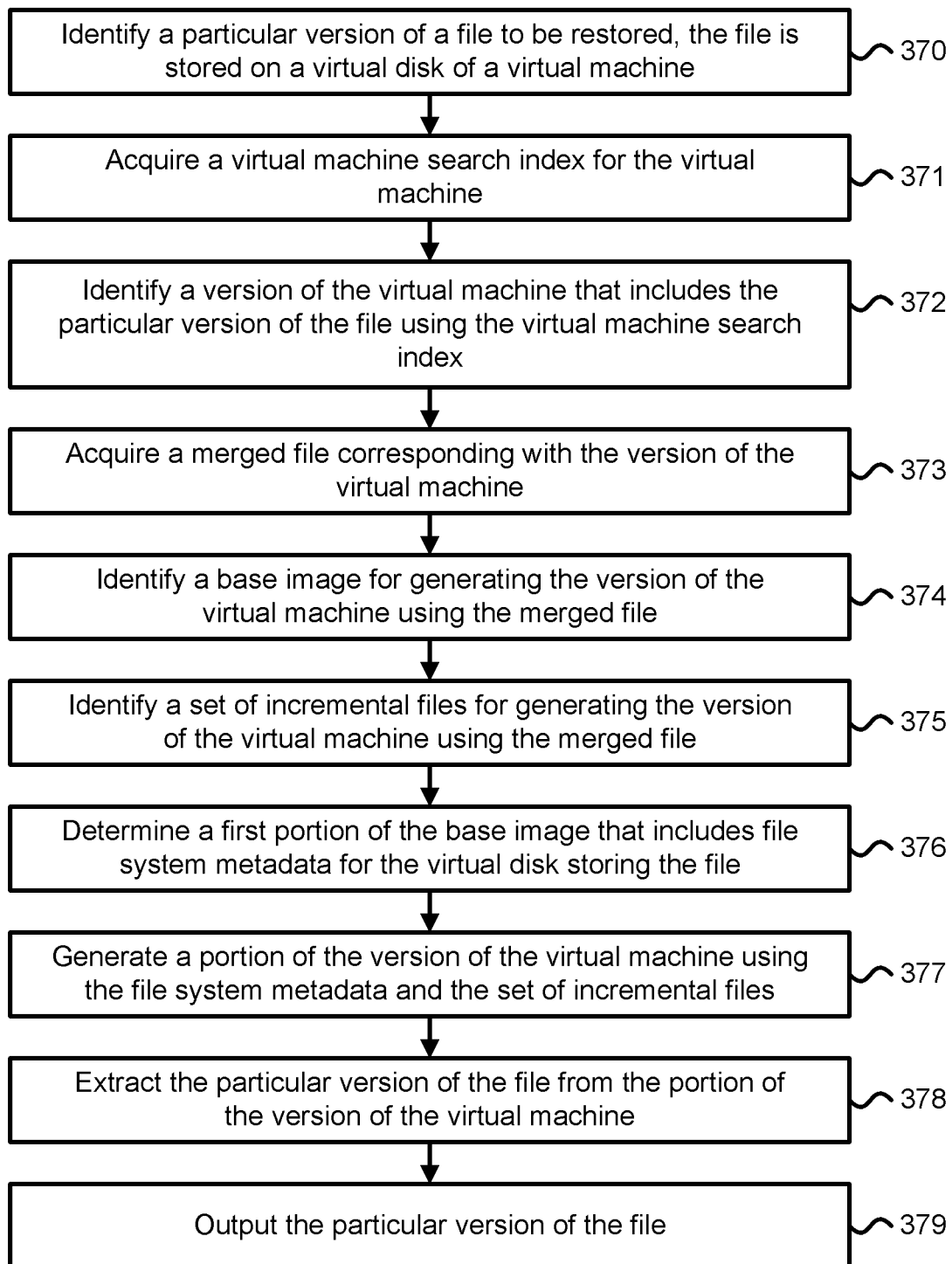
FIG. 3H is a flowchart describing one embodiment of a process for extracting a particular version of a file from one or more snapshots of a virtual machine.

FIG. 3H is a flowchart describing one embodiment of a process for extracting a particular version of a file from one or more snapshots of a virtual machine. In one embodiment, the process of FIG. 3H may be performed by a storage appliance, such as storage appliance 170 in FIG. 1A.

In step 370, a particular version of a file to be restored is identified. The file may be stored on a virtual disk of a virtual machine. The file may comprise or correspond with a database, a spreadsheet, a word processing document, an image file, a video file, a text file, an executable file, an audio file, an electronic message, or an email. The particular version of the file may be selected by an end user of a storage appliance, such as storage appliance 170 in FIG. 1A, using a user interface provided by the storage appliance. In step 371, a virtual machine search index, such as virtual machine search index 106 in FIG. 1C, for the virtual machine is acquired. In step 372, a version of the virtual machine that includes the particular version of the file is identified using the virtual machine search index. In step 373, a merged file corresponding with the version of the virtual machine is acquired. In step 374, a base image for generating the version of the virtual machine is identified using the merged file. In step 375, a set of incremental files for generating the version of the virtual machine is identified using the merged file. In step 376, a first portion of the base image that includes file system metadata for the virtual disk storing the file is determined. In one embodiment, the file system metadata may include information for location and retrieving the file from the virtual disk. In one example, the file system metadata includes NTFS metadata.

In step 377, a portion of the version of the virtual machine is generated using the file system metadata and the set of incremental files. In one embodiment, the portion of the version of the virtual machine is generated by patching the set of incremental files to a second portion of the base image. In another embodiment, the portion of the version of the virtual machine is generated by applying each of the set of incremental files to one or more chunks of data located within the base image. In step 378, the particular version of the file is extracted from the portion of the version of the virtual machine. In step 379, the particular version of the file is outputted. The particular version of the file may be transferred to a computing device, such as computing device 154 in FIG. 1A, or to a virtualization manager, such as virtualization manager 169 in FIG. 1A. In one example, the outputted file may correspond with a database that has been restored to a particular version of the database without having to perform a full restoration of an entire image of a virtual machine.

In some embodiments, a particular version of a data object to be restored may be identified. The particular version of the data object may correspond with a particular point in time instance of the data object (e.g., a third snapshot of an electronic document captured at a third point in time). The data object may be stored on a virtual disk of a virtual machine. The data object may comprise a database, a spreadsheet, a word processing document, an electronic document, an image, a video, a text file, an executable file, an audio recording, an electronic message, or an email. A version of the virtual machine that includes the particular version of the data object may be identified using a virtual machine search index. Once the version of the virtual machine has been identified, metadata associated with the virtual machine (e.g., file system metadata) may be read in order to identify one or more regions within the virtual disk that store the data object. A portion of the version of the virtual machine may then be generated by reading and/or patching only the one or more regions within the virtual disk that store the data object. The particular version of the data object may then be extracted using only the portion of the version of the virtual machine without having to extract or restore an entire image of the version of the virtual machine.

Figure 4A:
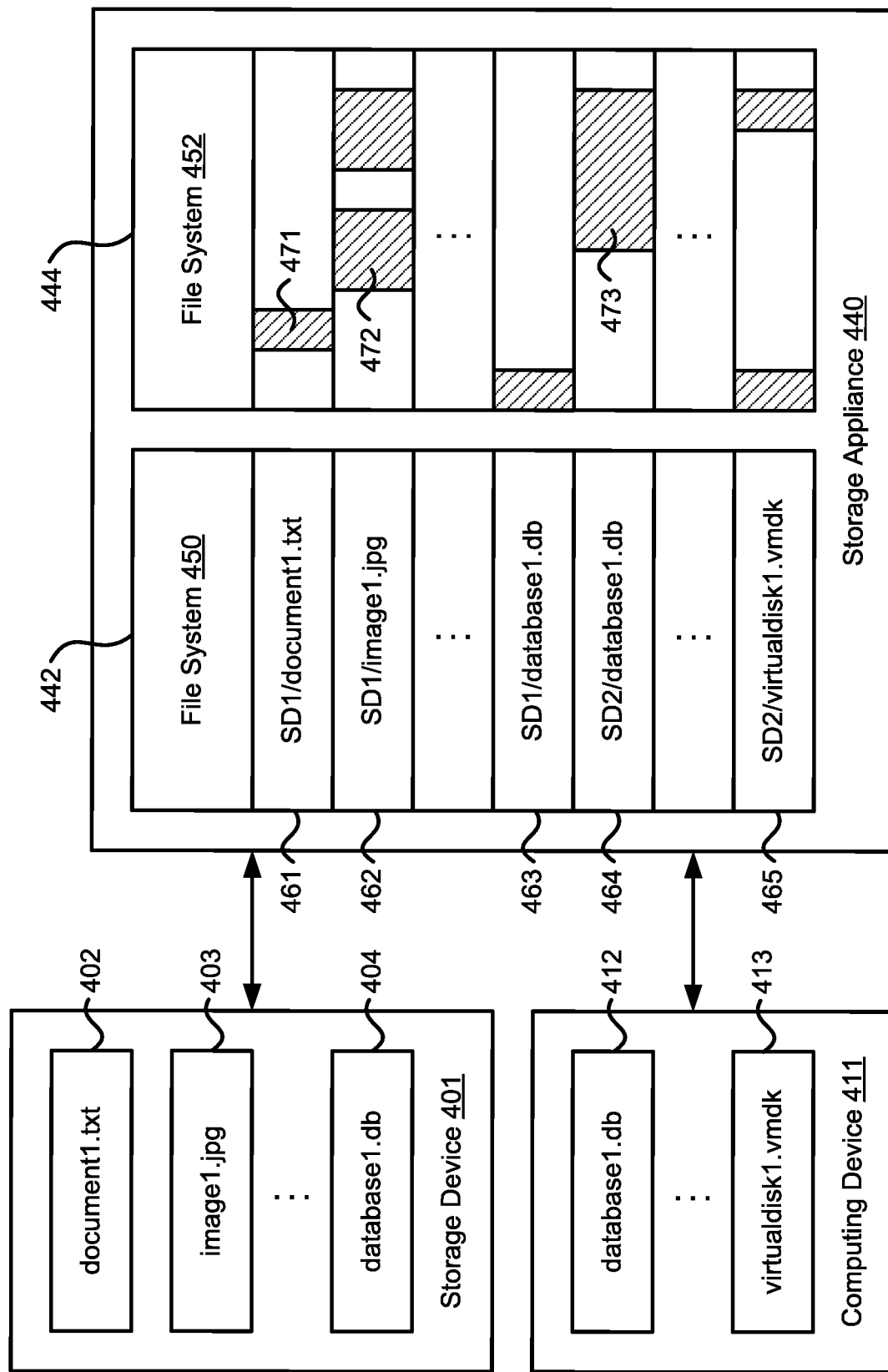
FIG. 4A depicts one embodiment of a storage appliance for backing up and restoring sets of electronic files using sets of pseudo-virtual disks.

FIG. 4A depicts one embodiment of a storage appliance for backing up and restoring sets of electronic files using sets of pseudo-virtual disks. As depicted, the storage appliance 440, such as storage appliance 170 in FIG. 1A, is in communication with a storage device 401, such as storage device 156 in FIG. 1A, and a computing device 411, such as computing device 154 in FIG. 1A. Storage device 401 stores a first set of electronic files 402-404 including a text file 402, an image file 403, and a database file 404. Computing device 411 stores a second set of electronic files 412-413 including a second database file 412 and a virtual disk file 413 (e.g., associated with a virtual machine). An agent or application not depicted running on either the storage device 401 or the computing device 411 may be used to facilitate communication with the storage appliance 440, to compute signatures for comparing data chunks corresponding with two different versions of an electronic file, or to determine and transmit data changes that occur between the two different versions of the electronic file. The storage appliance 440 may store a first pseudo-virtual disk 442 and a second pseudo-virtual disk 444. The first pseudo-virtual disk 442 may utilize a file system 450 to locate and manage files stored on the first pseudo-virtual disk 442. In one example, the file system 450 may comprise an ext4 file system. In another example, the file system 450 may comprise an NTFS file system.

As depicted in FIG. 4A, a first snapshot of the state of electronic files stored on the storage device 401 and the computing device 411 at a first point in time has been captured and stored using the first pseudo-virtual disk 442. The first snapshot (e.g., the initial snapshot) may correspond with copies 461-465 of the electronic files 402-404 and 412-413 at the first point in time. The file name used by the file system 450 may include a data source designation to uniquely identify the electronic files within the first pseudo-virtual disk 442. For example, the database file 404 stored using storage device 401 has been given the file name "SD1/databasel.db" and the database file 412 stored using computing device 411 has been given the file name "SD2/databasel.db."

Incremental files corresponding with subsequent versions of the electronic files may be stored using the first pseudo-virtual disk 442 or the second pseudo-virtual disk 444. The determination of whether to store a particular incremental file using the first pseudo-virtual disk 442 or the second pseudo-virtual disk 444 may depend on the amount of disk space available on the first pseudo-virtual disk 442, the number of other incremental files stored on the first pseudo-virtual disk 442 for a particular electronic file, or the total number of files stored using the first pseudo-virtual disk 442. In one example, if the number of incremental files stored on the first pseudo-virtual disk 442 for the database file 404 is greater than a threshold number of incremental files, then a subsequent increment file may be stored using the second pseudo-virtual disk 452 instead of the first pseudo-virtual disk 442.

The second pseudo-virtual disk 444 may utilize a second file system 452 to locate and manage files stored on the second pseudo-virtual disk 452. In one embodiment, the file system 450 and the second file system 452 may comprise ext4 file systems. In another embodiment, the file system 450 may comprise an ext4 file system and the second file system 452 may comprise a file system different from the one used by the first pseudo-virtual disk 442, such as an NTFS file system or a FAT file system.

In one embodiment, once the first pseudo-virtual disk 442 has run out of available disk space or has been used to store a threshold number of electronic files, then further incremental files may be stored using the second pseudo-virtual disk 444. As depicted in FIG. 4A, incremental file 471 corresponding with data changes to the electronic file 461, incremental file 472 corresponding with data changes to the electronic file 462, and incremental file 473 corresponding with data changes to the electronic file 464 have been stored using the second-virtual disk 444. In some cases, the sizes of the incremental files may correspond with data chunk sizes used for comparing and identifying data changes between two different versions of a portion of an electronic file. In one example, the incremental file 471 may correspond with a first data chunk size used for identifying data changes within text files and the incremental file 473 may correspond with a second data chunk size greater than the first data chunk size used for identifying data changes within database files.

Figure 4B:
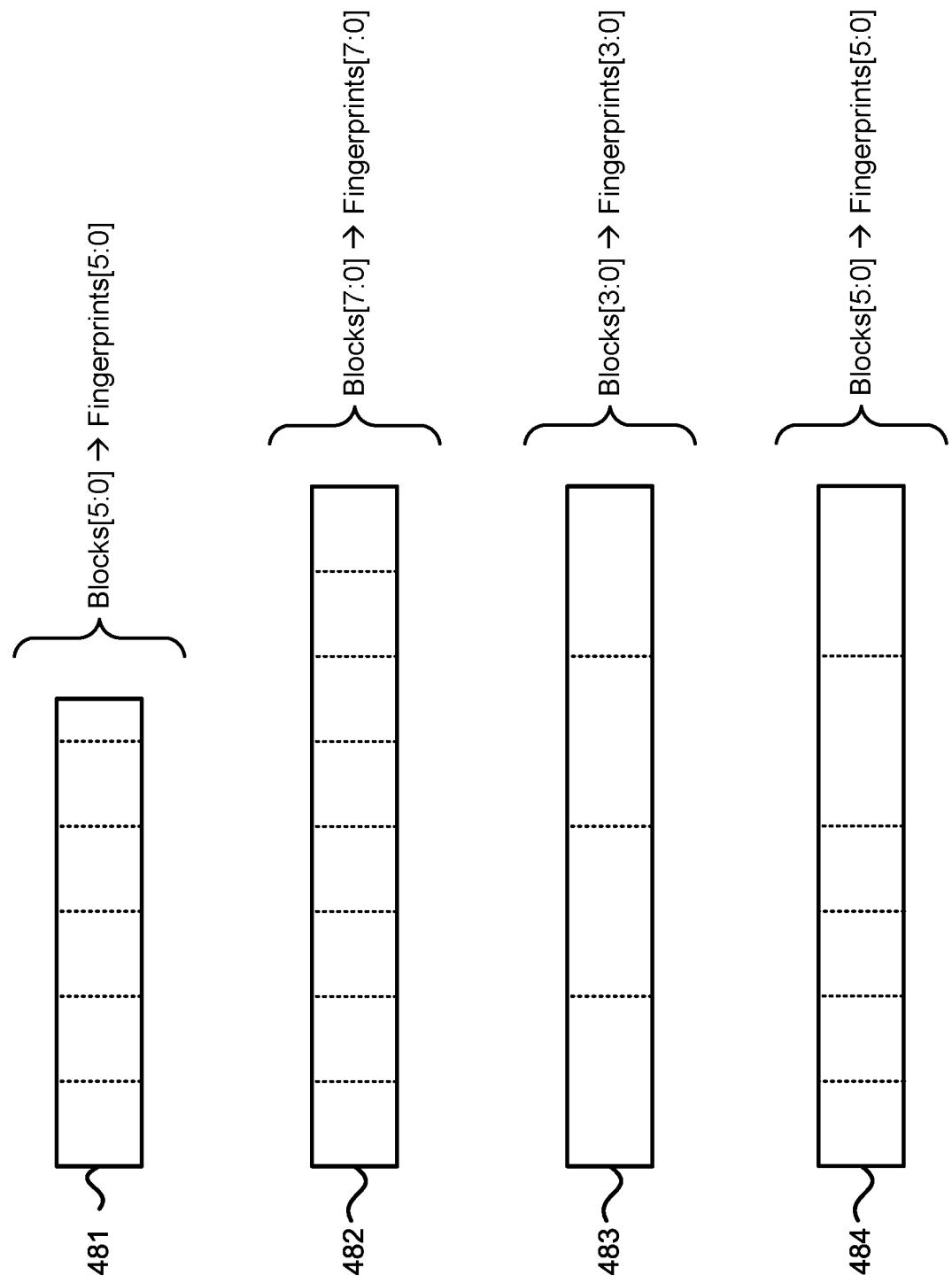
FIG. 4B depicts various embodiments of partitioned electronic files.

FIG. 4B depicts various embodiments of partitioned electronic files. As depicted, the electronic file 481 has been partitioned into six data chunks or six data blocks. Each of the data chunks may map to a signature or fingerprint that uniquely identifies the contents of the data chunk. The electronic file 482 has been partitioned into eight data chunks or eight data blocks. In some cases, the size of each data chunk may be a fixed number of bits (e.g., 256 bits or 10 KB) or a variable number of bits (e.g., in the case that each electronic file is partitioned into a fixed number of data chunks). The electronic file 483 has been partitioned into four data chunks or four data blocks. Although the file size for the electronic file 482 and the electronic file 483 are the same size, the data chunk sizes are different. The data chunk size may be determined or set based on the type of file. In one example, a database file may use a first data chunk size and a virtual disk file may use a second data chunk size different from the first data chunk size (e.g., a larger data chunk size). The electronic file 484 has been partitioned into six data chunks or six data blocks. The data chunk sizes corresponding with the six data chunks use two different sizes of data chunks. For example, the first four data chunks of the electronic file 484 may comprise data chunks of a first data chunk size and the other two data chunks of the electronic file 484 may comprise data chunks of a second data chunk size different from the first data chunk size. In one example, a database file may use uniformly sized data chunks while a virtual disk file may use two or more different sizes of data chunks.

In one embodiment, fingerprints for the first four data chunks of the electronic file 484 comprising data chunks of the first data chunk size may be generated using a first type of fingerprinting algorithm and fingerprints for the other two data chunks of the electronic file 484 comprising data chunks of the second data chunk size may be generated using a second type of fingerprinting algorithm different from the first type of fingerprinting algorithm. In another embodiment, regions of an electronic file that have had a history of frequent data changes may be partitioned into smaller data chunk sizes relative to other regions of the electronic file that have not had data changes. In one example, if a particular data chunk associated with an electronic file has been updated or contained data changes for three consecutive snapshots, then that particular data chunk may be subsequently divided or further partitioned into two or more data chunks. In another example, an electronic file may initially be partitioned into four different data chunks (e.g., similar to the partitioning of the electronic file 483), but subsequently be partitioned into six different data chunks of different data chunk sizes (e.g., similar to the partitioning of the electronic file 484) depending on the rate of data changes occurring within incremental files for different versions of the electronic file.

Figure 4C:
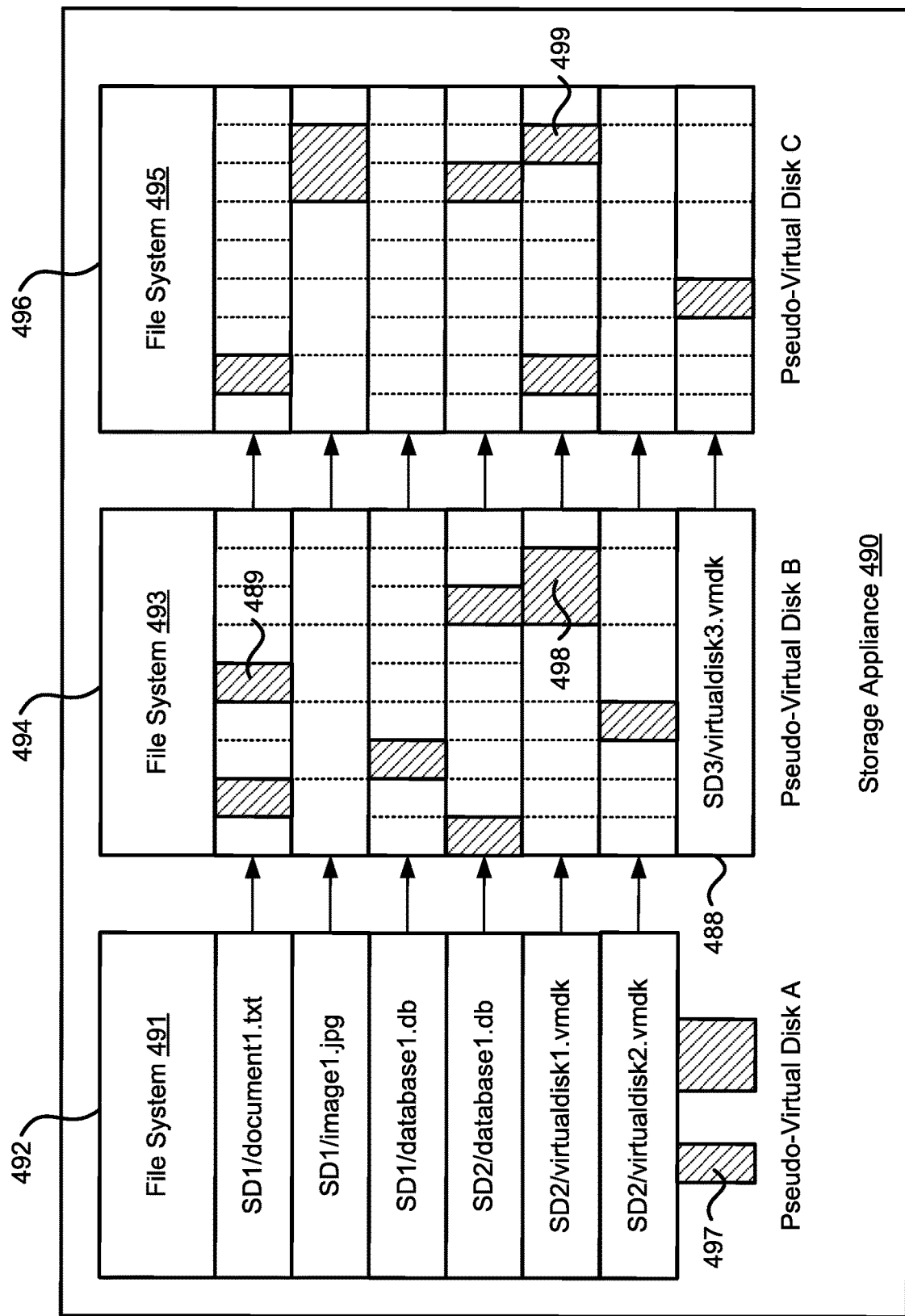
FIG. 4C depicts one embodiment of a storage appliance for backing up and restoring sets of electronic files using sets of pseudo-virtual disks.

FIG. 4C depicts one embodiment of a storage appliance for backing up and restoring sets of electronic files using sets of pseudo-virtual disks. As depicted, the storage appliance 490, such as storage appliance 170 in FIG. 1A, includes three pseudo-virtual disks Pseudo-Virtual Disk A 492, Pseudo-Virtual Disk B 494, and Pseudo-Virtual Disk C 496. The Pseudo-Virtual Disk A 492 uses a file system 491 to locate and manage files within the Pseudo-Virtual Disk A 492. The Pseudo-Virtual Disk B 494 uses a file system 493 to locate and manage files within the Pseudo-Virtual Disk B 494. The Pseudo-Virtual Disk C 496 uses a file system 495 to locate and manage files within the Pseudo-Virtual Disk C 496.

The Pseudo-Virtual Disk A 492 may store full copies of files, such as a full electronic copy for the electronic file SD2/virtualdisk1.vmdk, and one or more incremental files including incremental file 497, which may comprise a forward incremental file for the electronic file SD2/virtualdisk1.vmdk. The Pseudo-Virtual Disk B 494 may store incremental files for the electronic file SD1/document1.txt, such as incremental file 489, and incremental files for the electronic file SD2/virtualdisk1.vmdk, such as incremental file 498. The Pseudo-Virtual Disk B 494 may also store a full copy of a newly added electronic file 488 with the file name SD3/virtualdisk3.vmdk. The Pseudo-Virtual Disk C 496 may store additional incremental files for the electronic file SD2/virtualdisk1.vmdk, such as incremental file 499.

In one embodiment, a first version of the electronic file SD2/virtualdisk1.vmdk may be stored as a full copy using the Pseudo-Virtual Disk A 492, a second version of electronic file SD2/virtualdisk1.vmdk may be stored as the incremental file 497 using the Pseudo-Virtual Disk A 492, a third version of the electronic file SD2/virtualdisk1.vmdk may be stored as the incremental file 498 using the Pseudo-Virtual Disk B, and a fourth version of the electronic file SD2/virtualdisk1.vmdk may be stored as the incremental file 499 using the Pseudo-Virtual Disk C 496. The first version of the electronic file SD2/virtualdisk1.vmdk may correspond with a first snapshot of the electronic file, the second version may correspond with a second snapshot of the electronic file, the third version may correspond with a third snapshot of the electronic file, and the fourth version may correspond with a fourth snapshot of the electronic file. The size of the incremental file 498 may be larger than the size of the incremental file 499. In one example, the incremental file 498 may correspond with a first number of data chunks and the incremental file 499 may correspond with a second number of data chunks. In some cases, the size of the data chunks or the size of the partitions used for identifying data changes within an electronic file may be adjusted based on a number of data changes that have occurred to the electronic file or a number of data changes that have occurred within particular regions of the electronic file. In one example, the data chunk size used for generating the incremental file 499 may be smaller than the data chunk size used for generating the incremental file 498.

In one embodiment, the file systems 491, 493, and 495 may each comprise an ext4 file system. In another embodiment, the file system 491 may comprise an NTFS file system and the file system 493 may comprise an ext4 file system. In one embodiment, the size of a first pseudo-virtual disk, such as Pseudo-Virtual Disk A 492, may be set to a first disk size (e.g., 10 TB) and the size of a second pseudo-virtual disk, such as Pseudo-Virtual Disk B 494, may be set to a second disk size different from the first disk size (e.g., 1 TB). The first disk size may be determined based on the initial aggregation of electronic files to be stored (e.g., based on the combined file size of all the electronic files plus an additional 100 MBs for incremental updates). The second disk size may be determined based on the total number of files that have been aggregated and stored using the first pseudo-virtual disk or the rate at which the incremental files have been added to the first pseudo-virtual disk.

FIG. 4D depicts one embodiment of a file version index for mapping versions of electronic files to locations within one or more pseudo-virtual disks. As depicted, the three versions of the electronic file SD1/document1.txt are stored using three different pseudo-virtual disks. The two versions of the electronic file SD1/image1.jpg are stored using two different pseudo-virtual disks. The four versions of the electronic file SD2/virtualdisk1.vmdk are stored using three different pseudo-virtual disks. In this case, the first version (e.g., corresponding with a first snapshot of the electronic file) is stored using a full copy of the electronic file (e.g., an exact copy of the electronic file at the point in time associated with the first version) within a first pseudo-virtual disk (e.g., Pseudo-Virtual Disk A), the second version is stored using a first incremental file within the first pseudo-virtual disk, the third version is stored using a second incremental file within the second pseudo-virtual disk (e.g., Pseudo-Virtual Disk B), and the fourth version is stored using a fourth incremental file within the third pseudo-virtual disk (e.g., Pseudo-Virtual Disk C). The three versions of the electronic file SD2/virtualdisk2.vmdk are stored using three different pseudo-virtual disks. The two versions of the electronic file SD3/virtualdisk3.vmdk are stored using two different pseudo-virtual disks. In this case, the first version (e.g., corresponding with a first snapshot of the electronic file) is stored using a full copy of the electronic file within the second pseudo-virtual disk (e.g., Pseudo-Virtual Disk B) and the second version is stored using a first incremental file within the third pseudo-virtual disk (e.g., Pseudo-Virtual Disk C).

Figure 5A:
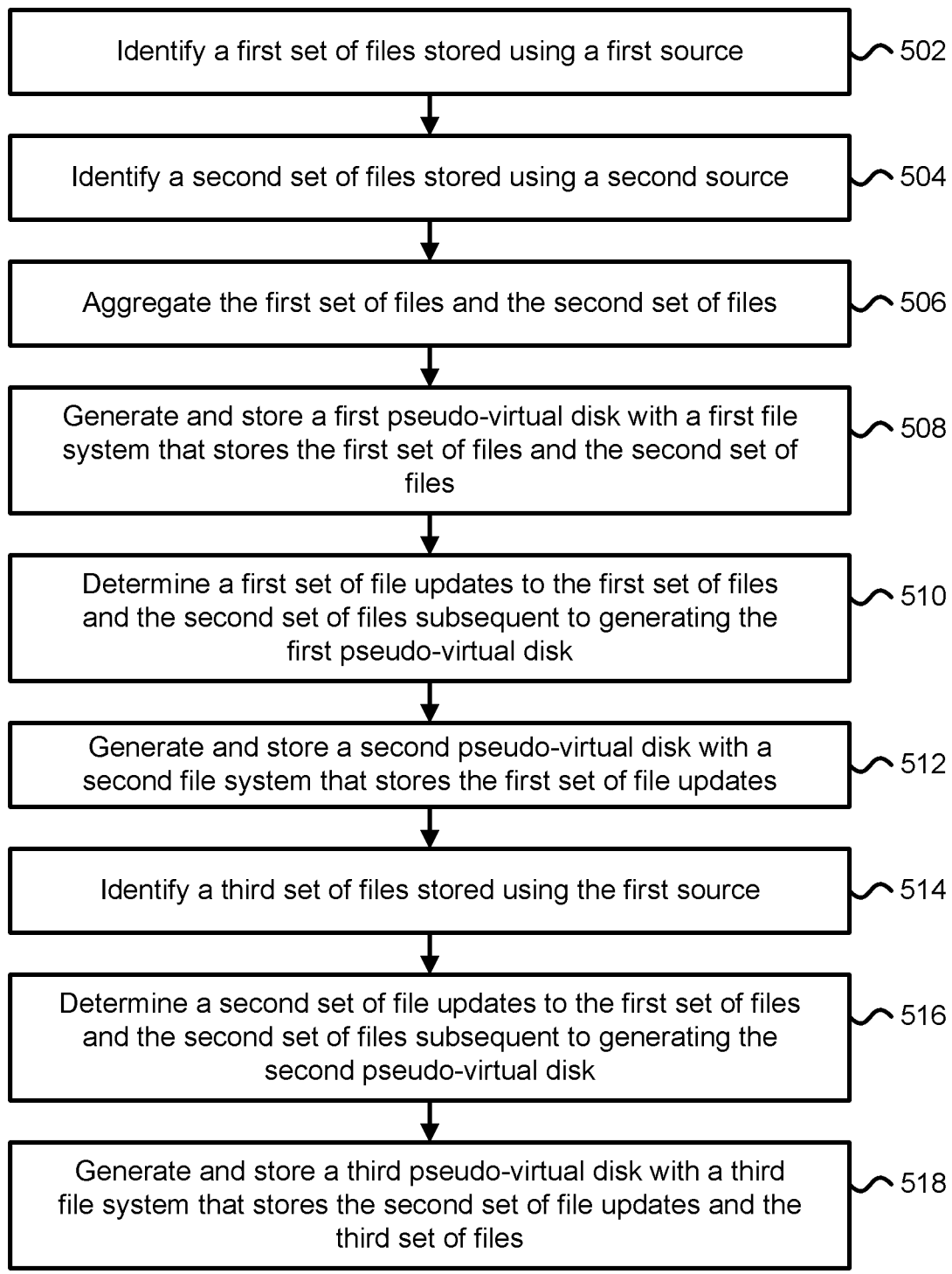
FIG. 5A is a flowchart describing one embodiment of a process for backing up versions of electronic files over time using sets of pseudo-virtual disks.

FIG. 5A is a flowchart describing one embodiment of a process for backing up versions of electronic files over time using sets of pseudo-virtual disks. In one embodiment, the process of FIG. 5A may be performed by a storage appliance, such as storage appliance 170 in FIG. 1A. In another embodiment, the process of FIG. 5A may be performed by an agent running on a computing device that is in communication with a storage appliance storing the sets of pseudo-virtual disks.

In step 502, a first set of files stored using a first source is identified. The first source may comprise a data source, such as a hardware server, a smart phone, a remote storage device, a HDD, an SSD, a computing device, or a virtual machine. In step 504, a second set of files stored using a second source different from the first source is identified. In step 506, the first set of files and the second set of files are aggregated or combined. In step 508, a first pseudo-virtual disk is generated and stored. The first pseudo-virtual disk may be stored using a storage appliance. The first pseudo-virtual disk may use a first file system (e.g., an ext4 file system) to locate and manage the first set of files and the second set of files within the first pseudo-virtual disk. The first file system may include a directory structure or mapping table that maps filenames for files stored within the first pseudo-virtual disk to locations within the first pseudo-virtual disk.

In one embodiment, a storage appliance may acquire the first set of files from the first source and the second set of files from the second source, concatenate the first set of files and the second set of files, create a virtual disk for storing the first set of files and the second set of files, build a first file system for the virtual disk, and store the first set of files and the second set of files using the virtual disk. In one example, the first set of files and the second set of files may correspond with initial snapshots of the electronic files. The initial snapshots may be stored as full copies of the electronic files. In some cases, the first pseudo-virtual disk may correspond with the pseudo-virtual disk 492 in FIG. 4C or the pseudo-virtual disk 442 in FIG. 4A.

In step 510, a first set of file updates to the first set of files and the second set of files is determined subsequent to generating the first pseudo-virtual disk. The first set of file updates may include a first update to a first file of the first set of files and a second update to a second file of the second set of files. The first update to the first file may comprise a first incremental file and the second update to the second file may comprise a second incremental file. The first incremental file may comprise one or more data chunks corresponding with one or more regions of the first file in which data changes have occurred. The first file may correspond with a first snapshot of an electronic file and the first incremental file may correspond with a second snapshot of the electronic file. Various embodiments of processes for determining a first set of file updates are described later in reference to FIGS. 6A-6B.

In step 512, a second pseudo-virtual disk is generated and stored. The second pseudo-virtual disk may be stored using the storage appliance. The second pseudo-virtual disk may use a second file system (e.g., an NTFS file system or an ext4 file system) to locate and manage files within the second pseudo-virtual disk. The second pseudo-virtual disk may store the first set of file updates. In step 514, a third set of files stored using the first source is identified. The third set of files may comprise electronic files added to the first source subsequent to the generation of the first pseudo-virtual disk or additional files added to a search query for backing up electronic files stored using the first source. In step 516, a second set of file updates to the first set of files and the second set of files is determined subsequent to generating the second pseudo-virtual disk. The second set of file updates may comprise incremental files associated with data changes occurring to the first set of files and/or the second set of files that occurred subsequent to generation of the second pseudo-virtual disk. In step 518, a third pseudo-virtual disk is generated and stored. The third pseudo-virtual disk may be stored using the storage appliance. The third pseudo-virtual disk may use a third file system the same as or different from the second file system to locate and manage files within the third pseudo-virtual disk. In some cases, the disk size or maximum data storage capacity of the first pseudo-virtual disk may be greater than the disk size or the maximum data storage capacity of the second pseudo-virtual disk.

In one embodiment, an initial snapshot of a first set of electronic files stored using a first source and a second set of electronic files stored using a second source may be aggregated and stored using a first pseudo-virtual disk. Subsequent snapshots of the first set of electronic files and the second set of electronic files may be stored as incremental files on the first pseudo-virtual disk. Upon detection that the first pseudo-virtual disk has less than a threshold amount of disk space available, a second pseudo-virtual disk may be generated in order to store additional snapshots of the first set of electronic files and the second set of electronic files. In one example, the first set of electronic files may include a first electronic file. A first version of the first electronic file may be stored as a full copy of the state of the first electronic file at a first point in time using the first pseudo-virtual disk. A second version of the first electronic file may be stored as a first incremental file associated with the state of the first electronic file at a second point in time subsequent to the first point in time using the first pseudo-virtual disk. A third version of the first electronic file may be stored as a second incremental file associated with the state of the first electronic file at a third point in time subsequent to the second point in time using the second pseudo-virtual disk.

Figure 5B:
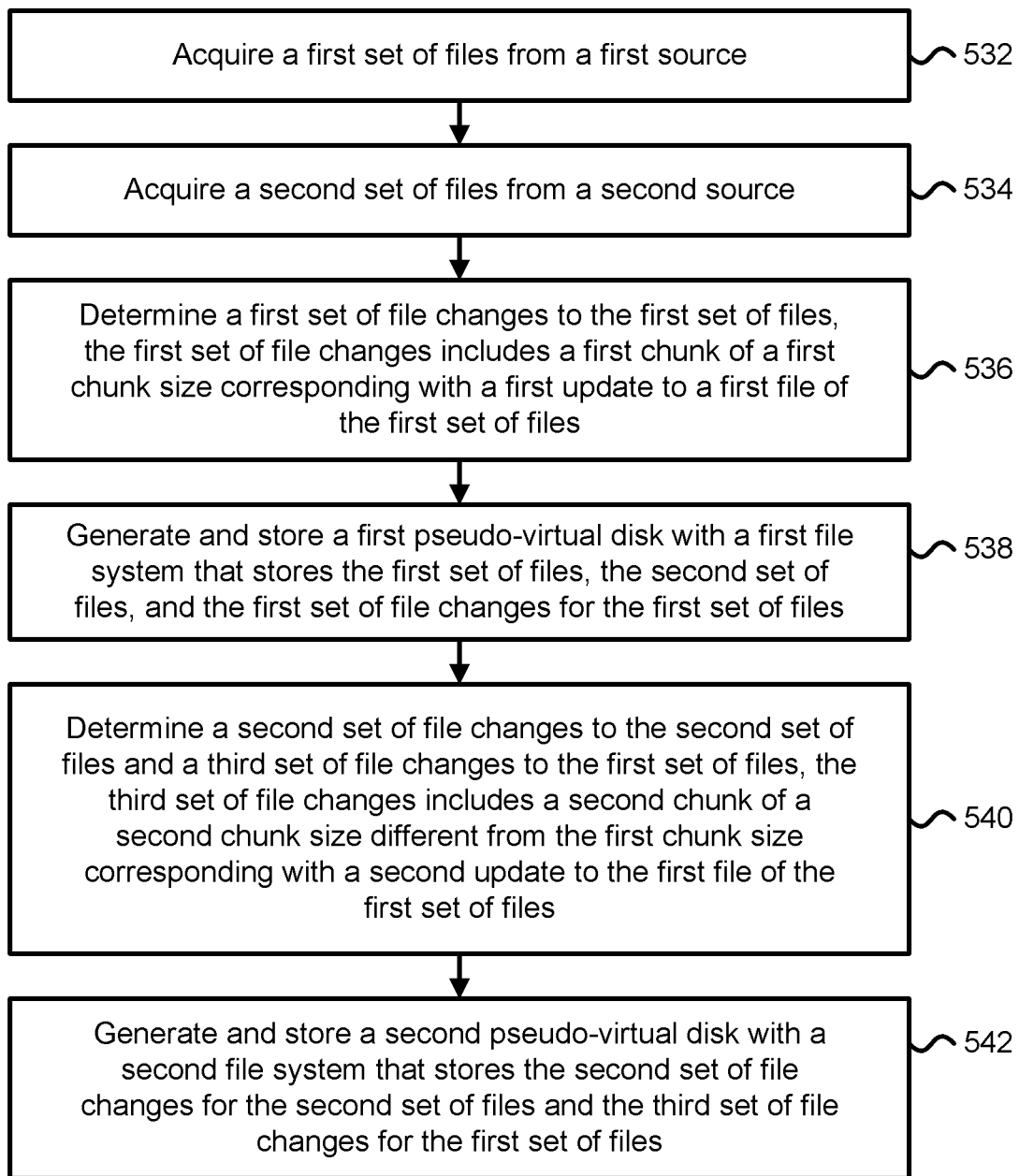
FIG. 5B is a flowchart describing another embodiment of a process for backing up versions of electronic files over time using sets of pseudo-virtual disks.

FIG. 5B is a flowchart describing another embodiment of a process for backing up versions of electronic files over time using sets of pseudo-virtual disks. In one embodiment, the process of FIG. 5B may be performed by a storage appliance, such as storage appliance 170 in FIG. 1A. In another embodiment, the process of FIG. 5B may be performed by an agent running on a computing device that is in communication with a storage appliance in the cloud.

In step 532, a first set of files is acquired from a first source. In step 534, a second set of files is acquired from a second source. In step 536, a first set of file changes to the first set of files is determined. The first set of file changes may include a first chunk of a first chunk size corresponding with a first update to a first file of the first set of files. In one example, the first file may comprise a database file and the first chunk may comprise a portion of the first file (e.g., 50

MB of the first file) in which data changes have occurred (e.g., due to data updates occurring to a database associated with the database file). Various embodiments of processes for determining a first set of file changes are described later in reference to FIGS. 6A-6B. In step 538, a first pseudo-virtual disk is generated and stored. The first pseudo-virtual disk may use a first file system to manage or store the first set of files, the second set of files, and the first set of file changes to the first set of files within the first pseudo-virtual disk.

In step 540, a second set of file changes to the second set of files and a third set of file changes to the first set of files is determined. The third set of file changes may include a second chunk of a second chunk size different from the first chunk size corresponding with a second update to the first file of the first set of files. In step 542, a second pseudo-virtual disk is generated and stored. The second pseudo-virtual disk may use a second file system to store or manage the second set of file changes for the second set of files and the third set of file changes for the first set of files within the second pseudo-virtual disk.

Figure 5C:
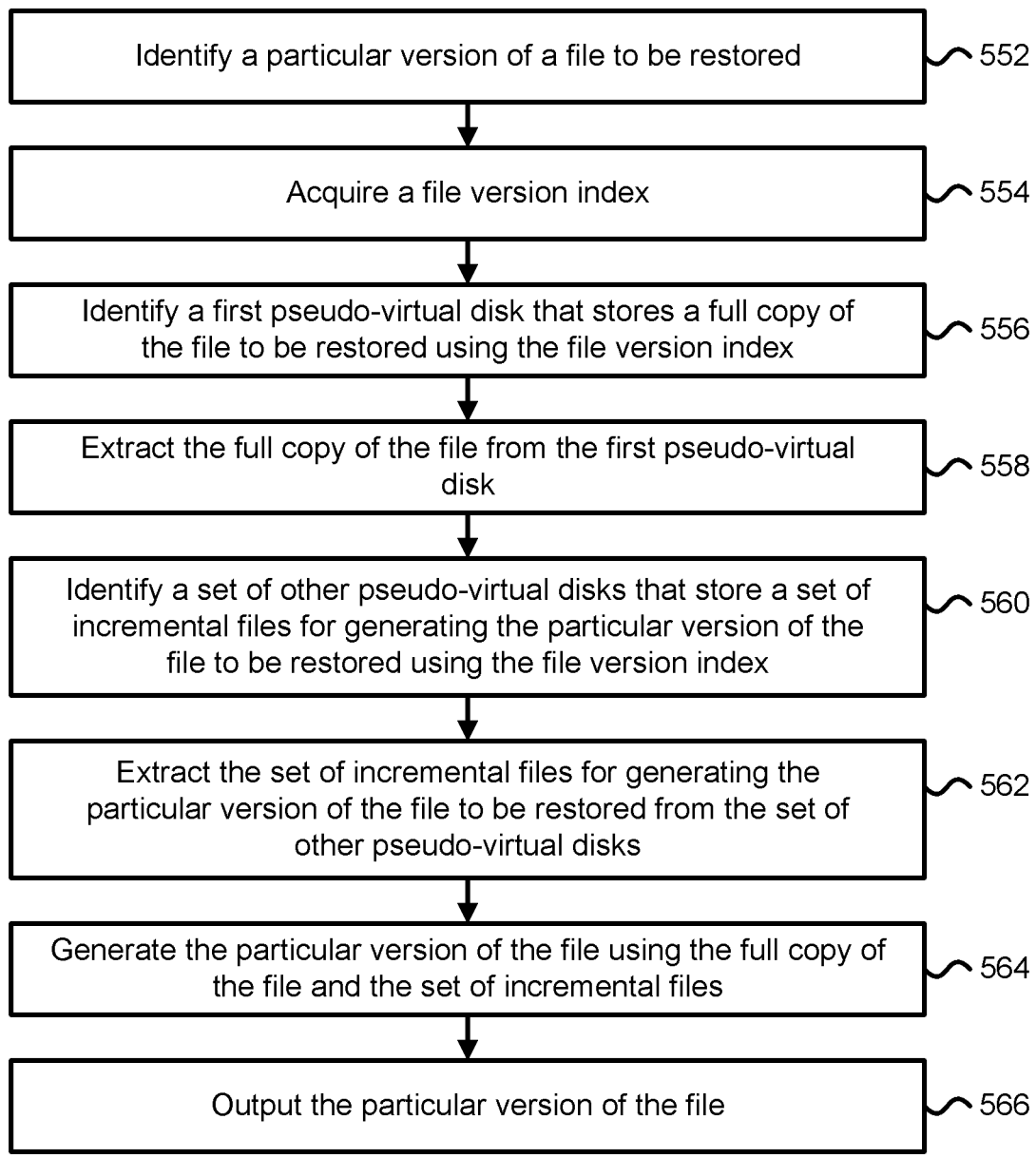
FIG. 5C is a flowchart describing one embodiment of a process for restoring a particular version of a file from one or more pseudo-virtual disks.

FIG. 5C is a flowchart describing one embodiment of a process for restoring a particular version of a file from one or more pseudo-virtual disks. In one embodiment, the process of FIG. 5C may be performed by a storage appliance, such as storage appliance 170 in FIG. 1A. In another embodiment, the process of FIG. 5C may be performed by an agent running on a computing device that is in communication with a storage appliance in the cloud.

In step 552, a particular version of a file to be restored is identified. In one example, the particular version of the file may be identified via a search query or by an end user of a storage appliance. In step 554, a file version index is acquired. One example of a file version index is depicted in FIG. 4D. The file version index may comprise a table or mapping of versions of electronic files to file locations within the one or more pseudo-virtual disks. In step 556, a first pseudo-virtual disk that stores a full copy of the file to be restored is identified using the file version index. In step 558, the full copy of the file is extracted from the first pseudo-virtual disk. The full copy of the file may be extracted from the first pseudo-virtual disk via a file system for the first pseudo-virtual disk. In step 560, a set of other pseudo-virtual disks that store a set of incremental files for generating the particular version of the file to be restored is identified using the file version index. In step 562, the set of incremental files for generating the particular version of the file to be restored is extracted from the set of other pseudo-virtual disks. In step 564, the particular version of the file is generated using the full copy and the set of incremental files. In one example, the set of incremental files may be patched to the full copy of the file. In step 566, the particular version of the file is outputted (e.g., transmitted to a computing device or a storage device).

Figure 6A:
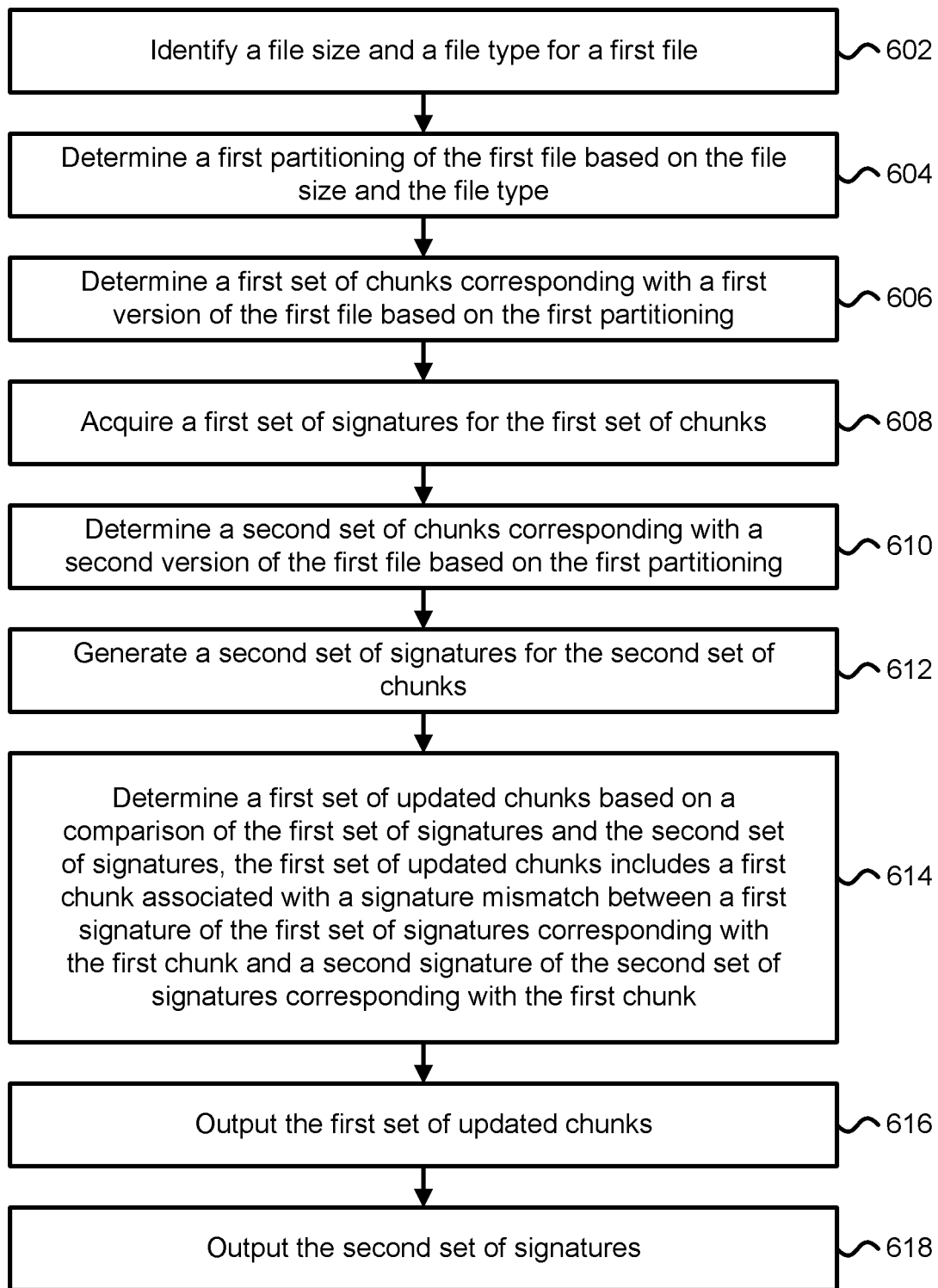
FIG. 6A is a flowchart describing one embodiment of a process for identifying a set of file updates.

FIG. 6A is a flowchart describing one embodiment of a process for identifying a set of file updates. The process described in FIG. 6A is one example of a process for implementing step 510 in FIG. 5A or for implementing step 536 in FIG. 5B. In one embodiment, the process of FIG. 6A may be performed by a storage appliance, such as storage appliance 170 in FIG. 1A. In another embodiment, the process of FIG. 6A may be performed by an agent running on a computing device that is in communication with a storage appliance that stores one or more pseudo-virtual disks.

In step 602, the file size and file type for a first file are identified. In step 604, a first partitioning of the first file is determined based on the file size and the file type. In step 606, a first set of chunks corresponding with a first version of the first file is determined based on the first partitioning. In one example, if the file size is greater than a threshold file size, then each data chunk of the first set of chunks may comprise a first chunk size; however if the file size is not greater than the threshold file size, then each data chunk of the first set of data chunks may comprise a second chunk size less than the first chunk size.

In step 608, a first set of signatures is acquired for the first set of chunks. In one embodiment, the first set of signatures may be acquired from a storage appliance used for storing pseudo-virtual disks. In step 610, a second set of chunks corresponding with a second version of the first file is determined based on the first partitioning. In step 612, a second set of signatures for the second set of chunks is generated. In one embodiment, the second set of signatures may be generated via application of the Rabin fingerprint algorithm or a cryptographic hashing algorithm.

In step 614, a first set of updated chunks is determined based on a comparison of the first set of signatures and the second set of signatures. The first set of updated chunks may include a first chunk associated with a signature mismatch between a first signature of the first set of signatures corresponding with the first chunk and a second signature of the second set of signatures corresponding with the first chunk. In step 616, the first set of updated chunks is outputted. In step 618, the second set of signatures outputted. In some cases, the first set of updated chunks may be transmitted to a storage appliance and stored as an incremental file within a pseudo-virtual disk. The second set of signatures may be stored as metadata corresponding with the second version of the first file. In this case, the fingerprints for the second version of the file need not be regenerated or recalculated as the second set of signatures have been stored as metadata. In some embodiments, a storage appliance may transmit a file name for the first file and the first set of signatures to an agent (e.g., an application running on a hardware server with access to files stored on the hardware server) running on a data source storing the first file and subsequently receive the first set of updated chunks and the second set of signatures from the agent.

Figure 6B:
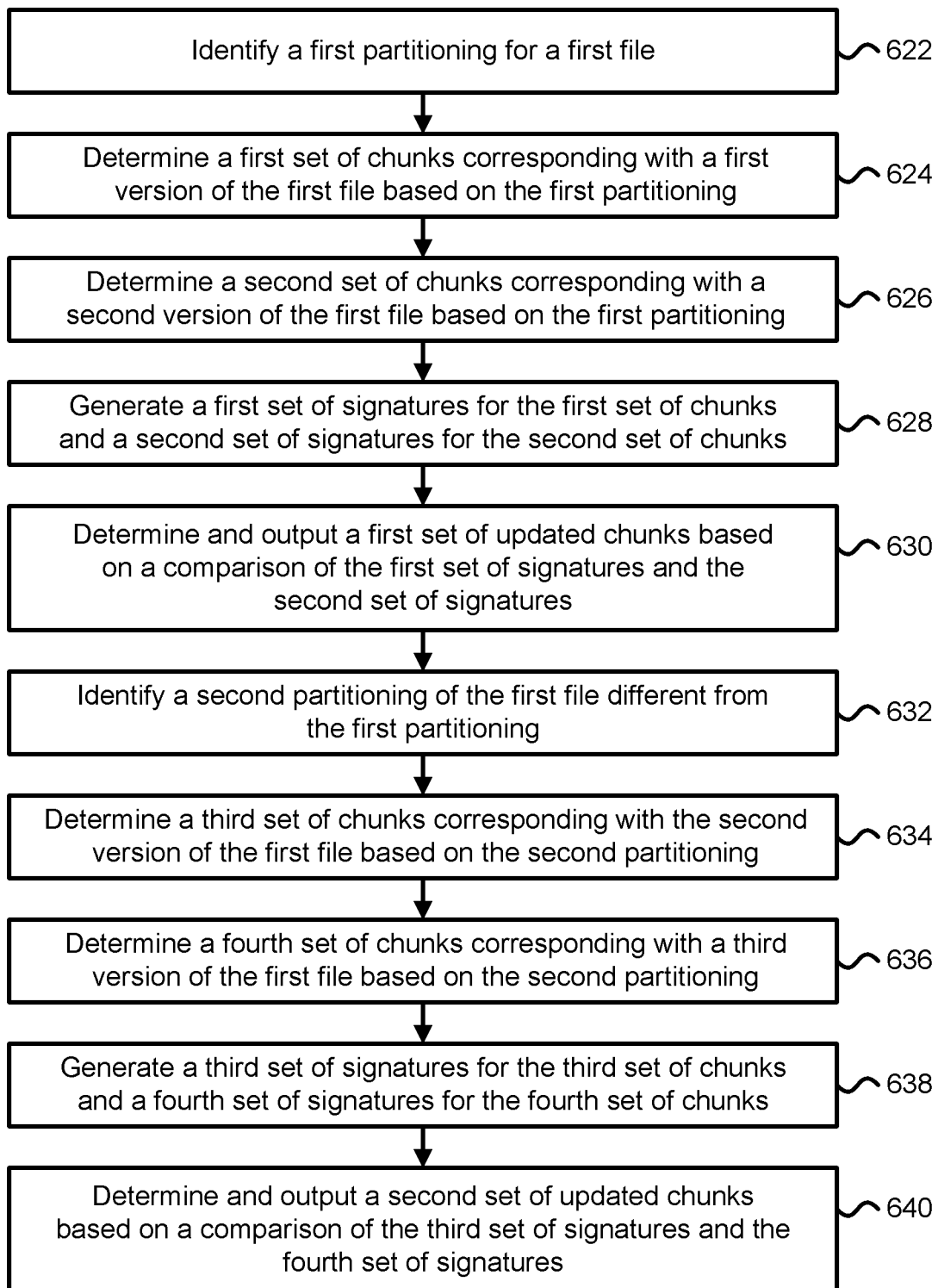
FIG. 6B is a flowchart describing various embodiments of processes for identifying data changes within an electronic file.

FIG. 6B is a flowchart describing various embodiments of processes for identifying data changes within an electronic file. The process described in FIG. 6B is one example of processes for implementing step 510 in FIG. 5A or for implementing step 536 in FIG. 5B. In one embodiment, portions of the process of FIG. 6B may be performed by a storage appliance, such as storage appliance 170 in FIG. 1A. In another embodiment, portions of the process of FIG. 6B may be performed by an agent running on a computing device that is in communication with a storage appliance.

In step 622, a first partitioning for a first file is identified. The first partitioning may correspond with breaking the first file into a number of data partitions or data chunks. In step 624, a first set of chunks (or data chunks) corresponding with a first version of the first file is determined based on the first partitioning. In one example, the first file may be partitioned into six data chunks, such as the partitioning used for electronic file 484 in FIG. 4B. In some cases, the data chunk size for each of the partitions may be uniform or the same size for each data chunk of the first set of chunks. The first set of chunks may also comprise data chunks of at least two different data chunks sizes (e.g., 50 MB chunks and 500 MB chunks). In step 626, a second set of chunks corresponding with a second version of the first file is determined based on the first partitioning. In step 628, a first set of signatures (or a first set of fingerprints) for the first set of chunks is generated and a second set of signatures (or a second set of fingerprints) for the second set of chunks is generated.

In one embodiment, the first set of chunks may include a first data chunk of 50 MB of data and a second data chunk of 100 MB of data; the second set of chunks may include a third data chunk of 50 MB of data corresponding with a location of the first data chunk within the first version of the first file and a fourth data chunk of 100 MB of data corresponding with a location of the second data chunk within the first version of the first file. In some cases, a first signature may be generated for the first data chunk using a first fingerprinting algorithm and a third signature may be generated for the third data chunk using the first fingerprinting algorithm; the first signature may be compared with the third signature in order to determine if the data within the first data chunk matches the data within the third data chunk. A second signature may be generated for the second data chunk using a second fingerprinting algorithm different from the first fingerprinting algorithm and a fourth signature may be generated for the fourth data chunk using the second fingerprinting algorithm; the second signature may be compared with the fourth signature in order to determine if the data within the second data chunk matches the data within the fourth data chunk. In some cases, the determination of whether to apply the first fingerprinting algorithm or the second fingerprinting algorithm may depend on the size of a data chunk and/or a file type of the first file. In one example, if the data chunk size is greater than a size threshold or greater than a threshold number of bits (e.g., is greater than 10 MB), then the second fingerprinting algorithm (e.g., MD5) may be applied instead of the first fingerprinting algorithm (e.g., SHA1). In another example, if the first file comprises a virtual disk file or a database file, then the second fingerprinting algorithm may be applied instead of the first fingerprinting algorithm.

In step 630, a first set of updated chunks is determined based on a comparison of the first set of signatures and the second set of signatures. The first set of updated chunks may be outputted or transmitted to a storage appliance or to the cloud from an agent running on a hardware server storing the first file. The first set of updated chunks may be stored within a first pseudo-virtual disk, such as the pseudo-virtual disk 444 in FIG. 4A.

In step 632, a second partitioning of the first file different from the first partitioning is identified. In one embodiment, the first partitioning of the first file may create a first number of data chunks (e.g., 16 data chunks) and the second partitioning of the first file may create a second number of data chunks (e.g., 64 data chunks) different from the first number. In step 634, a third set of chunks corresponding with the second version of the first file is determined based on the second partitioning. In step 636, a fourth set of chunks corresponding with a third version of the first file is determined based on the second partitioning. In step 638, a third set of signatures for the third set of chunks and a fourth set of signatures for the fourth set of chunks are generated. In step 640, a second set of updated chunks is determined based on a comparison of the third set of signatures and the fourth set of signatures. The second set of updated chunks may be outputted or transmitted to a storage appliance or to the cloud from an agent running on a data source or storage device storing the first file. The second set of updated chunks may be stored within a pseudo-virtual disk that also stores the first set of updated chunks.

Figure 6C:
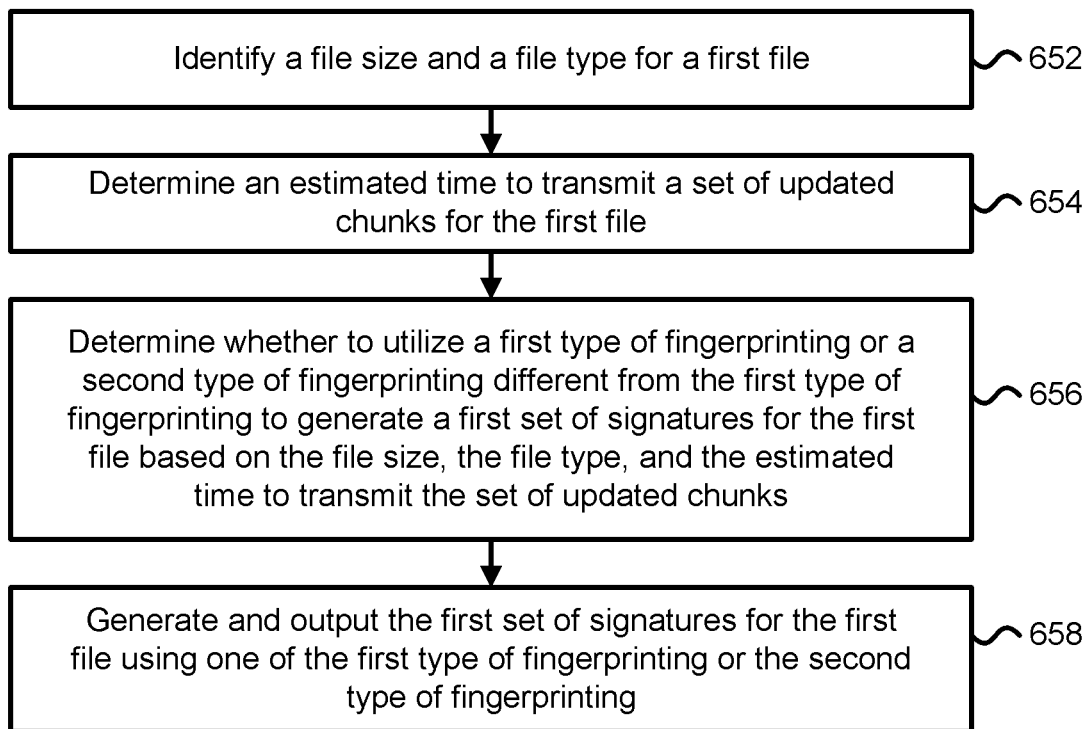
FIG. 6C is a flowchart describing one embodiment of a process for generating a set of signatures or fingerprints.

FIG. 6C is a flowchart describing one embodiment of a process for generating a set of signatures. The process described in FIG. 6C is one example of processes for implementing step 612 in FIG. 6A or for implementing step 638 in FIG. 6B. In one embodiment, the process of FIG. 6C may be performed by a storage appliance, such as storage appliance 170 in FIG. 1A. In another embodiment, the process of FIG. 6C may be performed by an agent running on a computing device that is in communication with a storage appliance.

In step 652, a file size and a file type for a first file are identified. The file type for the first file may be identified via metadata for the first file or a filename extension for the first file (e.g., a .vmdk or .jpg file extension). In step 654, an estimated time to transmit a set of updated chunks for the first file is determined. The estimated time to transmit the set of updated chunks may be determined based on a network bandwidth or a history of previous file transfers to a storage appliance. In step 656, it is determined whether to utilize a first type of fingerprinting or a second type of fingerprinting different from the first type of fingerprinting in order to generate a first set of signatures for the first file based on the file size, the file type, and the estimated time to transmit the set of updated chunks. In step 658, the first set of signatures for the first file is generated using one of the first type of fingerprinting or the second type of fingerprinting. The first set of signatures may be outputted or transmitted to a storage appliance. In one embodiment, the first type of fingerprinting may be used to generate the first set of signatures for the first file if the file size is greater than a threshold file size and the second type of fingerprinting may be used to generate the first set of signatures for the first file if the file size is not greater than the threshold file size. In another embodiment, the first type of fingerprinting may be used to generate the first set of signatures for the first file if the estimated time to transmit the set of updated chunks is greater than a threshold time and the second type of fingerprinting may be used to generate the first set of signatures for the first file if the estimated time to transmit the set of updated chunks is not greater than the threshold time.

Figure 6D:
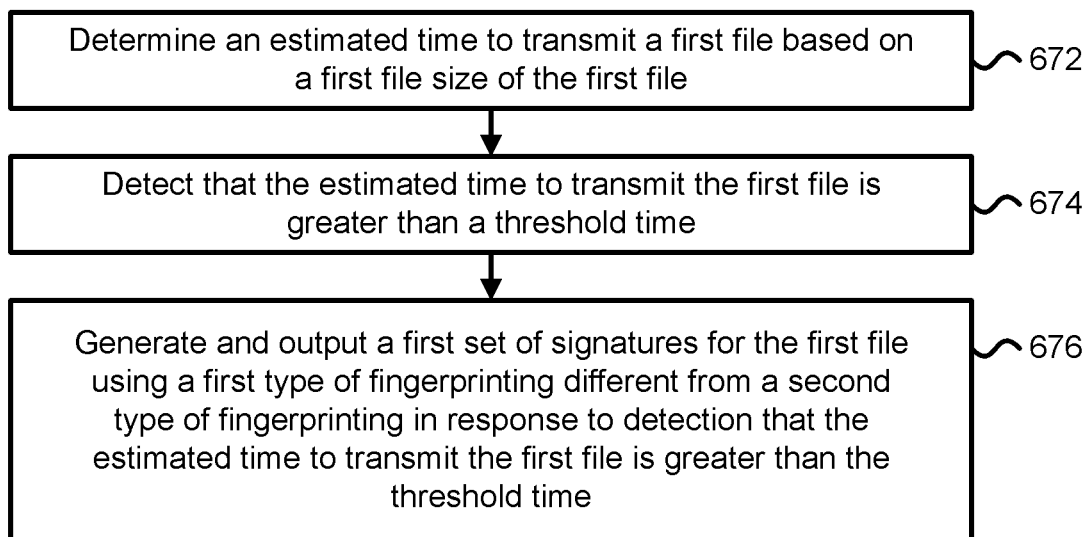
FIG. 6D is a flowchart describing another embodiment of a process for generating a set of signatures or fingerprints.

FIG. 6D is a flowchart describing another embodiment of a process for generating a set of signatures. The process described in FIG. 6D is one example of processes for implementing step 612 in FIG. 6A or for implementing step 638 in FIG. 6B. In one embodiment, the process of FIG. 6D may be performed by a storage appliance, such as storage appliance 170 in FIG. 1A. In another embodiment, the process of FIG. 6D may be performed by an agent running on a computing device that is in communication with a storage appliance.

In step 672, an estimated time to transmit a first file is determined based on a first file size of the first file. The estimated time to transmit the first file may be determined based on a network bandwidth or a history of previous file transfers to a storage appliance or other computing device to which the first file may be transmitted. In step 674, is detected that the estimated time to transmit the first file is greater than a threshold time. In step 676, a first set of signatures for the first file is generated using a first type of fingerprinting different from a second type of fingerprinting in response to detection that the estimated time to transmit the first file is greater than the threshold time. The first set of signatures may be outputted or transmitted to a storage appliance or a storage device for storing pseudo-virtual disks.

In one embodiment, the first file may be partitioned into ten data chunks and ten signatures may be generated corresponding with the ten data chunks. The first type of fingerprinting may be used to generate the first set of signatures for the first file if the estimated time to transmit the first file is greater than a threshold time and the second type of fingerprinting may be used to generate the first set of signatures for the first file if the estimated time to transmit the first file is not greater than the threshold time (e.g., is less than 200 ms).

Figure 6E:
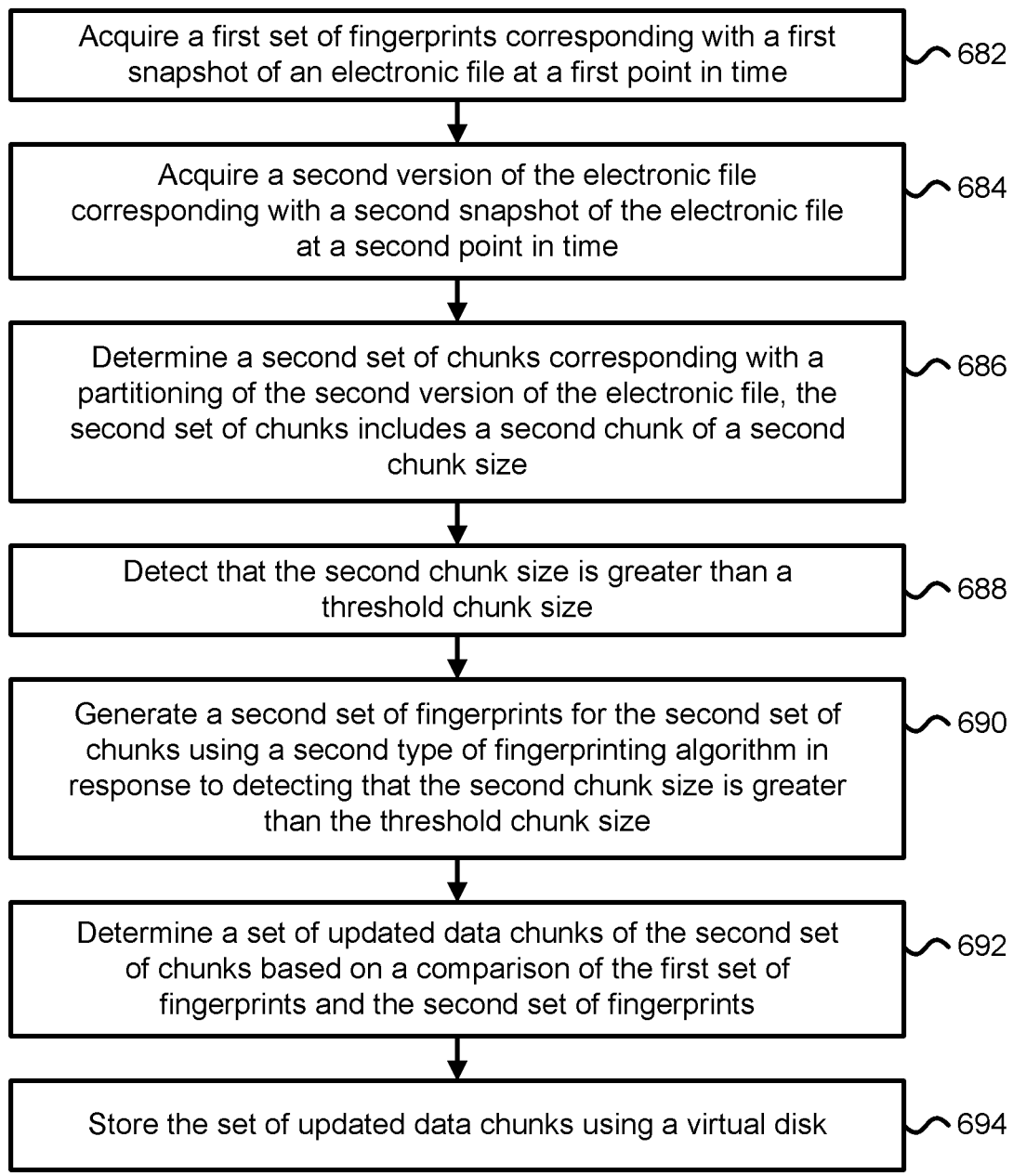
FIG. 6E is a flowchart describing an alternative embodiment of a process for identifying data changes between different versions of an electronic file.

FIG. 6E is a flowchart describing one embodiment of a process for identifying data changes between different versions of an electronic file. For example, identifying data change within portions of a database file that occur between a first point in time and a second point in time. The process described in FIG. 6E is one example of a process for implementing step 510 in FIG. 5A or for implementing step 536 in FIG. 5B. In one embodiment, the process of FIG. 6E may be performed by a storage appliance, such as storage appliance 170 in FIG. 1A. In another embodiment, the process of FIG. 6E may be performed by an agent running on a computing device that is in communication with a storage appliance that stores one or more pseudo-virtual disks.

In step 682, a first set of fingerprints corresponding with a first snapshot of an electronic file at a first point in time is acquired. In one example, the first set of fingerprints may be acquired from a storage appliance (e.g., the first set of fingerprints may have been previously generated and stored using the storage appliance). The first set of fingerprints may be generated via application of a cryptographic hashing algorithm to a first set of chunks corresponding with a partitioning of a first version of the electronic file. In step 684, a second version of the electronic file corresponding with a second snapshot of the electronic file at a second point in time subsequent to the first point in time is acquired. The second version of the electronic file may be acquired using an agent running on a storage device or a computing device that stores the electronic file.

In step 686, a second set of chunks corresponding with a partitioning of the second version of the electronic file is determined. The partitioning of the second version of the electronic file may depend upon the file size or the file type of the electronic file. In some cases, the number of data chunks may depend upon the file size of the electronic file. In one example, the second version of the electronic file may be partitioned into ten data chunks of equal chunk size. The second set of chunks may include a second chunk of a second chunk size (e.g., 50 MB). In step 688, it is detected that the second chunk size is greater than a threshold chunk size (e.g., 40 MB). In step 690, a second set of fingerprints for the second set of chunks is generated. The second set of fingerprints may be generated using a second type of fingerprinting in response to detecting that the second chunk size is greater than the threshold chunk size. The second set of fingerprints may be generated using the same cryptographic hashing algorithm (e.g., MD5) that generated the first set of fingerprints. In step 692, a set of updated data chunks of the second set of chunks is determined based on a comparison of the first set of fingerprints and the second set of fingerprints. The set of updated data chunks may include data chunks of the second set of chunks that have been updated since the first point in time. The set of updated data chunks may correspond with portions of the electronic file that have had data changes or modifications between the first point in time and the second point in time. In step 694, the set of updated data chunks may be transmitted to a storage appliance and stored using a pseudo-virtual disk, such as pseudo-virtual disk 444 in FIG. 4A.

One embodiment of the disclosed technology includes acquiring a first set of electronic files from a first data source. The first set of electronic files includes a first file corresponding with a first version of an electronic file. The method further comprises acquiring a second set of electronic files from a second data source different from the first data source, generating a first virtual disk of a first disk size, storing the first set of electronic files and the second set of electronic files using the first virtual disk, and acquiring a first set of file updates to the first set of electronic files subsequent to generating the first virtual disk. The first set of file updates includes a second file corresponding with data changes that occurred between the first version of the electronic file and a second version of the electronic file. The method further comprises generating a second virtual disk of a second disk size and storing the first set of file updates using the second virtual disk.

One embodiment of the disclosed technology includes a memory (e.g., a volatile or non-volatile memory) in communication with one or more processors. The memory configured to store a first virtual disk of a first disk size and a second virtual disk of a second disk size. The one or more processors configured to acquire a first set of electronic files from a first data source and acquire a second set of electronic files from a second data source different from the first data source. The first set of electronic files includes a first file corresponding with a first version of an electronic file. The one or more processors configured to generate the first virtual disk and store the first set of electronic files and the second set of electronic files using the first virtual disk. The one or more processors configured to acquire a first set of file updates to the first set of electronic files subsequent to generation of the first virtual disk. The first set of file updates includes a second file corresponding with data changes that occurred between the first version of the electronic file and a second version of the electronic file. The one or more processors configured to generate the second virtual disk and store the first set of file updates using the second virtual disk.

One embodiment of the disclosed technology comprises one or more non-transitory storage devices containing processor readable code for programming one or more processors to perform a method for operating a data management system. The processor readable code comprising processor readable code configured to acquire a first set of electronic files from a first data source. The first set of electronic files includes a first file corresponding with a first version of an electronic file. The processor readable code configured to acquire a second set of electronic files from a second data source different from the first data source. The processor readable code configured to generate a first virtual disk of a first disk size. The processor readable code configured to store the first set of electronic files and the second set of electronic files using the first virtual disk. The processor readable code configured to acquire a first set of file updates to the first set of electronic files subsequent to generation of the first virtual disk. The first set of file updates includes a forward incremental file corresponding with a second version of the electronic file. The processor readable code configured to detect that an amount of available disk space on the first virtual disk is less than a threshold amount of disk space. The processor readable code configured to generate a second virtual disk of a second disk size different from the first disk size in response to detection that the amount of available disk space on the first virtual disk is less than the threshold amount of disk space. The processor readable code configured to store the first set of file updates using the second virtual disk.

One embodiment of the disclosed technology includes acquiring a first set of fingerprints corresponding with a first snapshot of an electronic file at a first point in time, acquiring a second version of the electronic file corresponding with a second snapshot of the electronic file at a second point in time subsequent to the first point in time, and determining a second set of chunks corresponding with a partitioning of the second version of the electronic file. The second set of chunks includes a second chunk of a second chunk size. The method further comprises detecting that the second chunk size is greater than a threshold chunk size and generating a second set of fingerprints for the second set of chunks. The generating the second set of fingerprints for the second set of chunks includes generating a second fingerprint of the second set of fingerprints using a second type of fingerprinting in response to detecting that the second chunk size is greater than the threshold chunk size. The method further comprises determining a set of updated data chunks of the second set of chunks using the first set of fingerprints and the second set of fingerprints and outputting the set of updated data chunks.

One embodiment of the disclosed technology includes a memory (e.g., a volatile or non-volatile memory) in communication with one or more processors. The memory configured to store a first set of fingerprints corresponding with a first snapshot of an electronic file at a first point in time. The one or more processors configured to acquire a second version of the electronic file corresponding with a second snapshot of the electronic file at a second point in time subsequent to the first point in time. The one or more processors configured to determine a second set of chunks corresponding with a partitioning of the second version of the electronic file. The second set of chunks includes a second chunk of a second chunk size. The one or more processors configured to detect that the second chunk size is greater than a threshold chunk size and generate a second set of fingerprints for the second set of chunks. A second fingerprint of the second set of fingerprints is generated using a second type of fingerprinting in response to detecting that the second chunk size is greater than the threshold chunk size. The one or more processors configured to determine a set of updated data chunks of the second set of chunks using the first set of fingerprints and the second set of fingerprints and output the set of updated data chunks.

One embodiment of the disclosed technology includes acquiring a first set of fingerprints corresponding with a first snapshot of an electronic file at a first point in time, acquiring a second version of the electronic file corresponding with a second snapshot of the electronic file at a second point in time subsequent to the first point in time, partitioning the second version of the electronic file into a second set of chunks, generating a second set of fingerprints for the second set of chunks using a second type of fingerprinting, determining a first set of updated data chunks of the second set of chunks using the first set of fingerprints and the second set of fingerprints, storing the first set of updated data chunks using a virtual disk, acquiring a third version of the electronic file corresponding with a third snapshot of the electronic file at a third point in time subsequent to the second point in time, partitioning the second version of the electronic file into a third set of chunks, generating a third set of fingerprints for the third set of chunks using a third type of fingerprinting different from the second type of fingerprinting, partitioning the third version of the electronic file into a fourth set of chunks, generating a fourth set of fingerprints for the fourth set of chunks using the third type of fingerprinting, determining a second set of updated data chunks of the fourth set of chunks using the third set of fingerprints and the fourth set of fingerprints, and storing the second set of updated data chunks using the virtual disk.

The disclosed technology may be described in the context of computer-executable instructions, such as software or program modules, being executed by a computer or processor. The computer-executable instructions may comprise portions of computer program code, routines, programs, objects, software components, data structures, or other types of computer-related structures that may be used to perform processes using a computer. In some cases, hardware or combinations of hardware and software may be substituted for software or used in place of software.

Computer program code used for implementing various operations or aspects of the disclosed technology may be developed using one or more programming languages, including an object oriented programming language such as Java or C++, a procedural programming language such as the "C" programming language or Visual Basic, or a dynamic programming language such as Python or JavaScript. In some cases, computer program code or machine-level instructions derived from the computer program code may execute entirely on an end user's computer, partly on an end user's computer, partly on an end user's computer and partly on a remote computer, or entirely on a remote computer or server.

For purposes of this document, it should be noted that the dimensions of the various features depicted in the Figures may not necessarily be drawn to scale.

For purposes of this document, reference in the specification to "an embodiment," "one embodiment," "some embodiments," or "another embodiment" may be used to describe different embodiments and do not necessarily refer to the same embodiment.

For purposes of this document, a connection may be a direct connection or an indirect connection (e.g., via another part). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for operating a data management system; comprising:
   acquiring a first set of electronic files from a first data source, the first set of electronic files includes a first file corresponding with a first version of an electronic file;
   acquiring a second set of electronic files from a second data source different from the first data source;

generating a first virtual disk of a first disk size with a first file system storing the first set of electronic files and the second set of electronic files in the first virtual disk;

acquiring a first set of file updates to the first set of electronic files subsequent to generating the first virtual disk, the first set of file updates includes a second file corresponding with data changes that occurred between the first version of the electronic file and a second version of the electronic file;

generating a second virtual disk of a second disk size with a second file system different from the first file system, the second file system using a different protocol than the first file system; and storing the first set of file updates using the second virtual disk.

2. The method of claim 1, further comprising:

detecting that an amount of free disk space on the first virtual disk is less than a threshold amount of disk space and generating the second virtual disk in response to detecting that the amount of free disk space on the first virtual disk is less than the threshold amount of disk space.

3. The method of claim 1; further comprising:

acquiring a second set of file updates to the first set of electronic files subsequent to generating the second virtual disk; the second set of file updates includes a third file corresponding with a third version of the electronic file;

acquiring a third set of fingerprints for the third version of the electronic file; and storing the second set of file updates and the third set of fingerprints using the second virtual disk.

4. The method of claim 3, wherein:

the first version of the electronic file corresponds with a first snapshot of the electronic file at a first point in time;

the second version of the electronic file corresponds with a second snapshot of the electronic file at a second point in time subsequent to the first point in time; and the third version of the electronic file corresponds with a third snapshot of the electronic file at a third point in time subsequent to the second point in time.

5. The method of claim 3, wherein:

the second file comprises a second forward incremental file, the second forward incremental file includes a second data chunk of a second chunk size; and the third file comprises a third forward incremental file, the third forward incremental file includes a third data chunk of a third chunk size different from the second chunk size.

6. The method of claim 1, wherein:

the first virtual disk uses the first file system to access the first set of electronic files and the second set of electronic files; and the second virtual disk uses the second file system different from the first file system to access the first set of file updates.

7. The method of claim 1, wherein:

the first disk size is different from the second disk size.

8. The method of claim 1, wherein:

the first disk size is greater than the second disk size.

9. The method of claim 1, further comprising:

determining the first disk size for the first virtual disk based on a combined disk space for storing the first set of electronic files and the second set of electronic files.

10. The method of claim 1, wherein:

the first data source comprises a hardware server; and the second data source comprises a virtual machine.

11. A data management system, comprising:

a memory configured to store a first virtual disk of a first disk size and a second virtual disk of a second disk size; and one or more processors configured to acquire a first set of electronic files from a first data source and acquire a second set of electronic files from a second data source different from the first data source, the first set of electronic files includes a first file corresponding with a first version of an electronic file, the one or more processors configured to generate the first virtual disk of the first disk size with a first file system; and store the first set of electronic files and the second set of electronic files in the first virtual disk, the one or more processors configured to acquire a first set of file updates to the first set of electronic files subsequent to generation of the first virtual disk, the first set of file updates includes a second file corresponding with data changes that occurred between the first version of the electronic file and a second version of the electronic file, the one or more processors configured to generate the second virtual disk with a second file system, the second file system using a different protocol than the first file system, and store the first set of file updates on the second virtual disk while the first set of electronic files is stored on the first virtual disk.

12. The data management system of claim 11, wherein:

the one or more processors configured to detect that an amount of free disk space on the first virtual disk is less than a threshold amount of disk space and generate the second virtual disk in response to detection that the amount of free disk space on the first virtual disk is less than the threshold amount of disk space.

13. The data management system of claim 11, wherein:

the one or more processors configured to acquire a second set of file updates to the first set of electronic files subsequent to generation of the second virtual disk, the second set of file updates includes a third file corresponding with a third version of the electronic file, the one or more processors configured to store the second set of file updates using the second virtual disk.

14. The data management system of claim 13, wherein:

the first version of the electronic file corresponds with a first snapshot of the electronic file at a first point in time;

the second version of the electronic file corresponds with a second snapshot of the electronic file at a second point in time subsequent to the first point in time; and the third version of the electronic file corresponds with a third snapshot of the electronic file at a third point in time subsequent to the second point in time.

15. The data management system of claim 13, wherein:

the second file comprises a second forward incremental file, the second forward incremental file includes a second data chunk of a second chunk size; and the third file comprises a third forward incremental file, the third forward incremental file includes a third data chunk of a third chunk size different from the second chunk size.

16. The data management system of claim 11, wherein:

the first virtual disk uses the first file system to access the first set of electronic files and the second set of electronic files; and the second virtual disk uses the second file system different from the first file system to access the first set of file updates.

17. The data management system of claim 11, wherein: the first disk size is different from the second disk size.

18. The data management system of claim 11, wherein: the first disk size is greater than the second disk size.

19. The data management system of claim 11, wherein: the one or more processors configured to determine the first disk size for the first virtual disk based on a combined disk space for storing the first set of electronic files and the second set of electronic files.

20. One or more storage devices containing processor readable code for programming one or more processors to perform a method for operating a data management system, the processor readable code comprising:

processor readable code configured to acquire a first set of electronic files from a first data source, the first set of electronic files includes a first file corresponding with a first version of an electronic file;

processor readable code configured to acquire a second set of electronic files from a second data source different from the first data source;

processor readable code configured to generate a first virtual disk of a first disk size with a first file system;

processor readable code configured to store the first set of electronic files and the second set of electronic files in the first virtual disk;

processor readable code configured to acquire a first set of file updates to the first set of electronic files subsequent to generation of the first virtual disk, the first set of file updates includes a forward incremental file corresponding with a second version of the electronic file;

processor readable code configured to generate a second virtual disk of a second disk size having a second file system, the second file system using a different protocol than the first file system; and processor readable code configured to store the first set of file updates using the second virtual disk.

* * * * *